(12) United States Patent
Doerfel et al.

(10) Patent No.: US 7,046,271 B2
(45) Date of Patent: *May 16, 2006

(54) METHOD AND SYSTEM FOR THE THREE-DIMENSIONAL REPRESENTATION

(75) Inventors: Falk Doerfel, Ann Arbor, MI (US); Armin Grasnick, Jena (DE); Andreas Holz, Jena (DE); Markus Klippstein, Jena (DE); Ingo Relke, Jena (DE); Sven-Martin Scherzberg-Naujokat, Camburg (DE); Wolfgang Tzschoppe, Rothenstein (DE); Rudyard Isaac Urtecho Valverde, Jena (DE)

(73) Assignee: X3D Technologies GmbH, Jena (DE)

( * ) Notice: Subject to any disclaimer, the term of this patent is extended or adjusted under 35 U.S.C. 154(b) by 650 days.

This patent is subject to a terminal disclaimer.

(21) Appl. No.: 10/182,228

(22) PCT Filed: Jan. 24, 2001

(86) PCT No.: PCT/EP01/00756

§ 371 (c)(1),
(2), (4) Date: Jul. 24, 2002

(87) PCT Pub. No.: WO01/56265

PCT Pub. Date: Aug. 2, 2001

(65) Prior Publication Data

US 2003/0067539 A1 Apr. 10, 2003

(30) Foreign Application Priority Data

| Jan. 25, 2000 | (DE) | 100 03 326 |
| Mar. 15, 2000 | (DE) | 100 13 390 |
| Jun. 16, 2000 | (DE) | 100 29 531 |
| Jun. 16, 2000 | (DE) | 100 29 584 |
| Aug. 4, 2000 | (DE) | 100 39 321 |
| Aug. 23, 2000 | (DE) | 100 43 305 |
| Aug. 23, 2000 | (DE) | 100 43 346 |
| Oct. 27, 2000 | (DE) | 100 53 868 |

(51) Int. Cl.
*H04N 13/04* (2006.01)
(52) U.S. Cl. .................... 348/51; 359/464
(58) Field of Classification Search ............ 348/51, 348/54, 42; 250/226; 356/330; 700/90; 385/14; 365/119; 359/464
See application file for complete search history.

(56) References Cited

U.S. PATENT DOCUMENTS

| 4,594,662 A * | 6/1986 | Devaney ............... 700/90 |
| 4,829,365 A | 5/1989 | Eichenlaub |
| 4,872,750 A | 10/1989 | Morishita |
| 5,083,199 A | 1/1992 | Börner |
| 5,113,213 A | 5/1992 | Sandor et al. |
| 5,132,839 A | 7/1992 | Travis |
| 5,264,964 A | 11/1993 | Faris |
| 5,519,533 A | 5/1996 | Nomura et al. |
| 5,550,676 A | 8/1996 | Ohe et al. |
| 5,584,556 A | 12/1996 | Yokoyama et al. |
| 5,703,717 A | 12/1997 | Ezra et al. |
| 5,717,522 A | 2/1998 | Hattori et al. |
| 5,751,479 A * | 5/1998 | Hamagishi et al. ......... 359/464 |
| 5,831,765 A | 11/1998 | Nakayama et al. |
| 5,858,624 A | 1/1999 | Chou et al. |
| 5,897,184 A | 4/1999 | Eichenlaub et al. |
| 5,917,562 A | 6/1999 | Woodgate et al. |
| 5,936,774 A | 8/1999 | Street |
| 5,938,774 A | 8/1999 | Hsu |
| 5,945,965 A | 8/1999 | Inoguchi et al. |
| 5,949,390 A | 9/1999 | Nomura et al. |
| 5,949,391 A | 9/1999 | Saishu et al. |
| 6,040,807 A | 3/2000 | Hamagishi et al. |
| 6,046,849 A | 4/2000 | Moseley et al. |
| 6,055,013 A | 4/2000 | Woodgate et al. |
| 6,061,083 A | 5/2000 | Aritake et al. |
| 6,078,423 A | 6/2000 | Orr et al. |
| 6,087,766 A | 7/2000 | Janning |
| 6,094,216 A | 7/2000 | Taniguchi et al. |
| 6,118,584 A | 9/2000 | Van Berkel et al. |
| 6,169,629 B1 | 1/2001 | Otsubo |
| 6,219,184 B1 | 4/2001 | Nagatani |
| 6,266,187 B1 | 7/2001 | Dunn et al. |

| | | | |
|---|---|---|---|
| 6,337,721 B1 | 1/2002 | Hamagishi et al. | |
| 6,483,735 B1 * | 11/2002 | Rentzepis | 365/119 |
| 6,519,088 B1 | 2/2003 | Lipton | |
| 6,519,379 B1 * | 2/2003 | Izawa et al. | 385/14 |
| 6,859,275 B1 * | 2/2005 | Fateley et al. | 356/330 |
| 2002/0101658 A1 | 8/2002 | Hoppenstein | |
| 2004/0245440 A1 * | 12/2004 | Klippstein et al. | 250/226 |

FOREIGN PATENT DOCUMENTS

| | | |
|---|---|---|
| DE | 755 039 | 6/1954 |
| DE | 195 02 643 | 8/1996 |
| DE | 200 02 149 | 4/2000 |
| EP | 0316465 | 5/1989 |
| EP | 0 708 431 | 4/1996 |
| EP | 0 744 872 | 11/1996 |
| EP | 0 773 707 | 5/1997 |
| EP | 0 791 847 | 8/1997 |
| EP | 0 860 728 | 8/1998 |
| EP | 0977445 | 2/2000 |
| EP | 1069454 | 1/2001 |
| EP | 1122957 | 8/2001 |
| GB | 514426 | 11/1939 |
| JP | 8036145 | 2/1996 |
| JP | 08-146347 | 6/1996 |
| JP | 08-163605 | 6/1996 |
| JP | 08-194190 | 7/1996 |
| JP | 08-331605 | 12/1996 |
| JP | 8327945 | 12/1996 |
| JP | 09015549 | 1/1997 |
| JP | 09138370 | 5/1997 |
| JP | 09281440 | 10/1997 |
| JP | 09304739 | 11/1997 |
| JP | 10026740 | 1/1998 |
| JP | 10-186272 | 7/1998 |
| JP | 10-268230 | 10/1998 |
| JP | 10-333090 | 12/1998 |
| JP | 2000201360 | 7/2000 |
| JP | 2001033731 | 2/2001 |
| JP | 2001042258 | 2/2001 |
| JP | 2001073162 | 3/2001 |
| JP | 2002040956 | 2/2002 |
| JP | 2002072135 | 3/2002 |
| JP | 2002202477 | 7/2002 |
| JP | 2002287087 | 10/2002 |
| JP | 2002287088 | 10/2002 |
| JP | 2002287089 | 10/2002 |
| WO | 94/06049 | 3/1994 |
| WO | 97/02709 | 1/1997 |
| WO | WO 97/22033 | 6/1997 |
| WO | 99/49349 | 9/1999 |
| WO | WO 00/28517 | 5/2000 |
| WO | WO 01/11894 | 2/2001 |
| WO | WO 01/31384 | 5/2001 |
| WO | WO 01/37579 | 10/2002 |
| WO | WO 02/19012 | 7/2003 |
| WO | WO 98/27451 | 9/2004 |

OTHER PUBLICATIONS

Fernseh- Und Kino-Technik, 46, May 1992, pp. 343-345 "Juengste NHK-Arbeiten zum Thema 3D".

Funkschau, 15/98, pp. 64-65, "Adaptiver 3D-Flachbild-Monitor".

Heft, Nov. 1999, p. 14 "Papierlose Zeitung aus organischen Leuchtdioden".

Journal of the SMPTE, Jul. 1952, vol. 59, pp. 11-21, "Theory of Parallax Barriers" Sam H. Kaplan.

* cited by examiner

*Primary Examiner*—Gims Philippe
(74) *Attorney, Agent, or Firm*—Reed Smith LLP

(57) ABSTRACT

A method for three-dimensional display in which a plurality of individual image elements $\alpha_{ij}$ are made visible simultaneously in a raster of columns i and lines j, wherein the image elements $\alpha_{ij}$ reproduce partial information from a plurality of views $A_k$ (k1 . . . n) of a scene/object, and adjacent image elements $\alpha_{ij}$ radiate light of different wavelengths or wavelength regions is provided. In a method of the type described above, wavelength-dependent propagation directions are predetermined for the light radiated from the image elements $\alpha_{ij}$. The propagation directions within an observation space in which an observer is situated intersect in a plurality of intersection points which correspond to observation positions. From each observation position, one eye of an observer perceives predominantly partial information of a first selection and the other eye perceives predominantly partial information of a second selection from views $A_k$ (k=1 . . . n).

48 Claims, 45 Drawing Sheets

| R | G | B | R | G | B | R | G | B | R | G | B | R | G | B | R | G | B | R | G | B |
|---|---|---|---|---|---|---|---|---|---|---|---|---|---|---|---|---|---|---|---|---|
| 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 |
| 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 |
| 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 |
| 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 |
| 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 |
| 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 |
| 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 |
| 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 |
| 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 |
| 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 |
| 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 |
| 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 |
| 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |

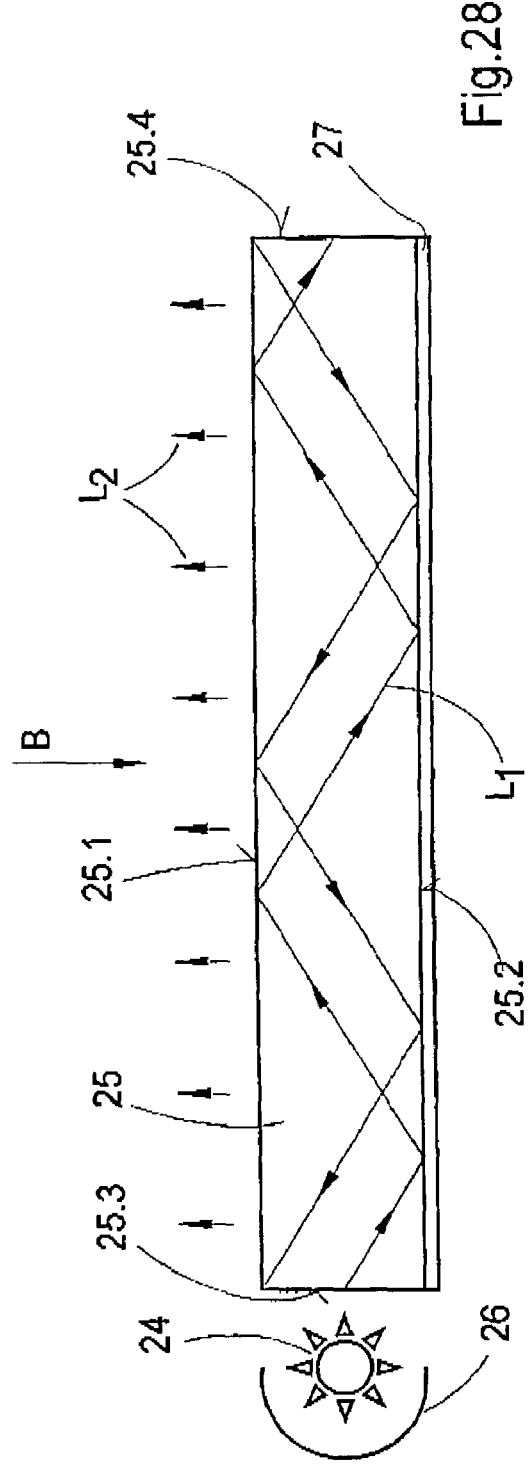
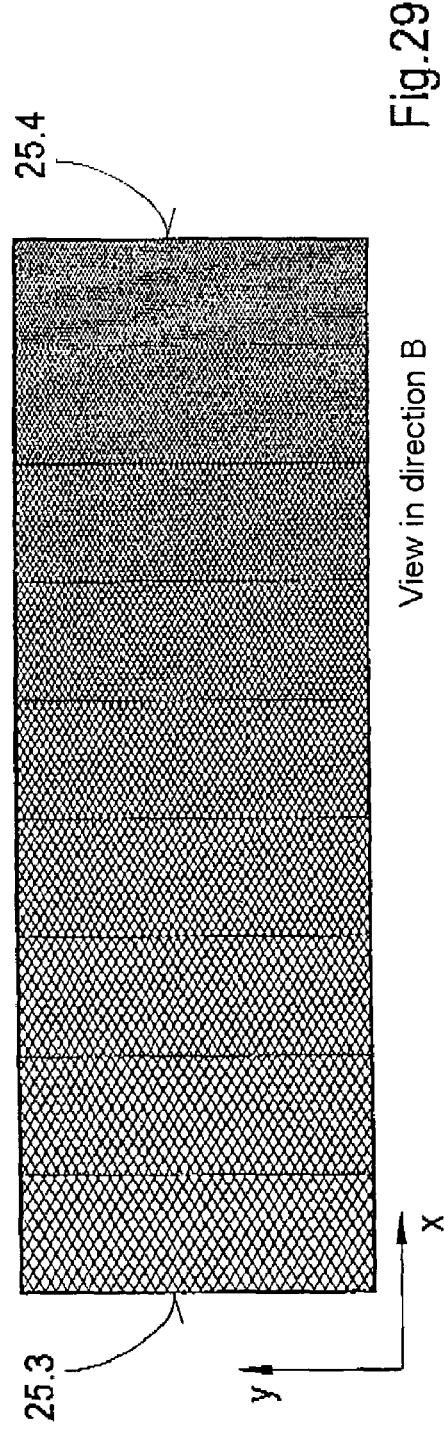
Fig.28
Fig.29
View in direction B

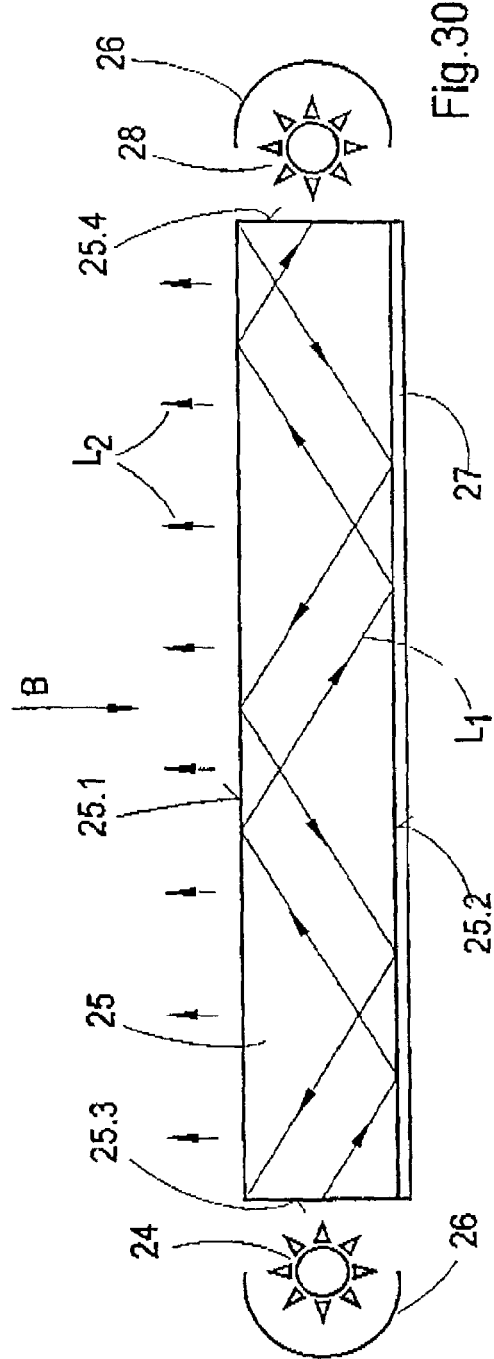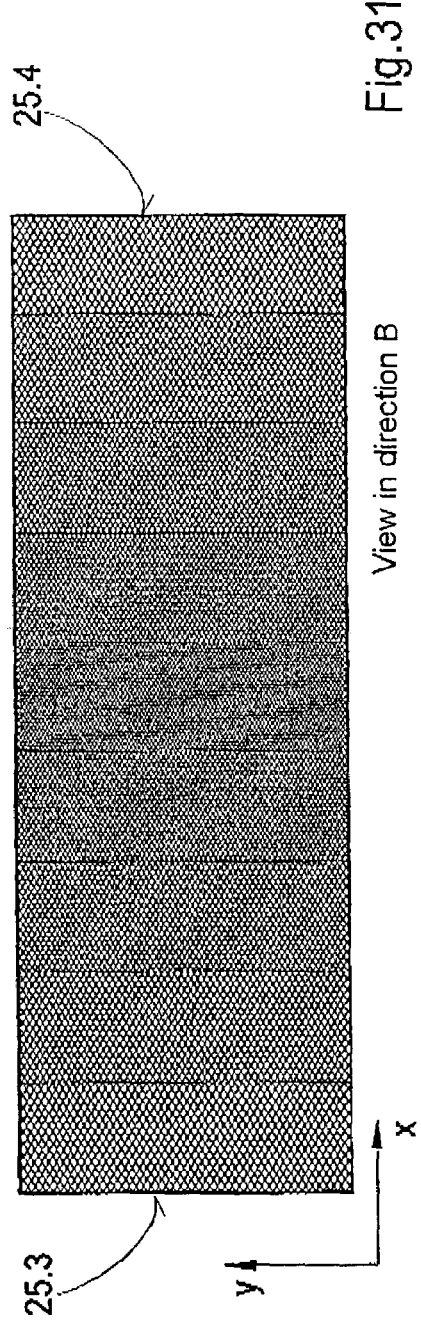

p →

| q | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | L2 | L0 | L0 | L0 | L0 | L0 | L2 | L4 | L2 | L0 | L0 | L0 | L0 | L0 | L2 | L4 |
| 2 | L0 | L0 | L0 | L0 | L0 | L2 | L4 | L2 | L0 | L0 | L0 | L0 | L0 | L2 | L4 | L2 |
| 3 | L0 | L0 | L0 | L0 | L2 | L4 | L2 | L0 | L0 | L0 | L0 | L0 | L2 | L4 | L2 | L0 |
| 4 | L0 | L0 | L0 | L2 | L4 | L2 | L0 | L0 | L0 | L0 | L0 | L2 | L4 | L2 | L0 | L0 |
| 5 | L0 | L0 | L2 | L4 | L2 | L0 | L0 | L0 | L0 | L0 | L2 | L4 | L2 | L0 | L0 | L0 |
| 6 | L0 | L2 | L4 | L2 | L0 | L0 | L0 | L0 | L0 | L2 | L4 | L2 | L0 | L0 | L0 | L0 |
| 7 | L2 | L4 | L2 | L0 | L0 | L0 | L0 | L0 | L2 | L4 | L2 | L0 | L0 | L0 | L0 | L0 |
| 8 | L4 | L2 | L0 | L0 | L0 | L0 | L0 | L2 | L4 | L2 | L0 | L0 | L0 | L0 | L0 | L2 |
| 9 | L2 | L0 | L0 | L0 | L0 | L0 | L2 | L4 | L2 | L0 | L0 | L0 | L0 | L0 | L2 | L4 |
| 10 | L0 | L0 | L0 | L0 | L0 | L2 | L4 | L2 | L0 | L0 | L0 | L0 | L0 | L2 | L4 | L2 |
| 11 | L0 | L0 | L0 | L0 | L2 | L4 | L2 | L0 | L0 | L0 | L0 | L0 | L2 | L4 | L2 | L0 |
| 12 | L0 | L0 | L0 | L2 | L4 | L2 | L0 | L0 | L0 | L0 | L0 | L2 | L4 | L2 | L0 | L0 |
| 13 | L0 | L0 | L2 | L4 | L2 | L0 | L0 | L0 | L0 | L0 | L2 | L4 | L2 | L0 | L0 | L0 |
| 14 | L0 | L2 | L4 | L2 | L0 | L0 | L0 | L0 | L0 | L2 | L4 | L2 | L0 | L0 | L0 | L0 |
| 15 | L2 | L4 | L2 | L0 | L0 | L0 | L0 | L0 | L2 | L4 | L2 | L0 | L0 | L0 | L0 | L0 |
| 16 | L4 | L2 | L0 | L0 | L0 | L0 | L0 | L2 | L4 | L2 | L0 | L0 | L0 | L0 | L0 | L2 |

Fig.39

| q\p | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | L2 | L0 | L0 | L0 | L0 | L0 | L2 | G' | L2 | L0 | L0 | L0 | L0 | L0 | L2 | R' |
| 2 | L0 | L0 | L0 | L0 | L0 | L2 | R' | L2 | L0 | L0 | L0 | L0 | L0 | L2 | B' | L2 |
| 3 | L0 | L0 | L0 | L0 | L2 | B' | L2 | L0 | L0 | L0 | L0 | L0 | L2 | G' | L2 | L0 |
| 4 | L0 | L0 | L0 | L2 | G' | L2 | L0 | L0 | L0 | L0 | L0 | L2 | R' | L2 | L0 | L0 |
| 5 | L0 | L0 | L2 | R' | L2 | L0 | L0 | L0 | L0 | L0 | L2 | B' | L2 | L0 | L0 | L0 |
| 6 | L0 | L2 | B' | L2 | L0 | L0 | L0 | L0 | L0 | L2 | G' | L2 | L0 | L0 | L0 | L0 |
| 7 | L2 | G' | L2 | L0 | L0 | L0 | L0 | L0 | L2 | R' | L2 | L0 | L0 | L0 | L0 | L0 |
| 8 | R' | L2 | L0 | L0 | L0 | L0 | L0 | L2 | B' | L2 | L0 | L0 | L0 | L0 | L0 | L2 |
| 9 | L2 | L0 | L0 | L0 | L0 | L0 | L2 | G' | L2 | L0 | L0 | L0 | L0 | L0 | L2 | R' |
| 10 | L0 | L0 | L0 | L0 | L0 | L2 | R' | L2 | L0 | L0 | L0 | L0 | L0 | L2 | B' | L2 |
| 11 | L0 | L0 | L0 | L0 | L2 | B' | L2 | L0 | L0 | L0 | L0 | L0 | L2 | G' | L2 | L0 |
| 12 | L0 | L0 | L0 | L2 | G' | L2 | L0 | L0 | L0 | L0 | L0 | L2 | R' | L2 | L0 | L0 |
| 13 | L0 | L0 | L2 | R' | L2 | L0 | L0 | L0 | L0 | L0 | L2 | B' | L2 | L0 | L0 | L0 |
| 14 | L0 | L2 | B' | L2 | L0 | L0 | L0 | L0 | L0 | L2 | G' | L2 | L0 | L0 | L0 | L0 |
| 15 | L2 | G' | L2 | L0 | L0 | L0 | L0 | L0 | L2 | R' | L2 | L0 | L0 | L0 | L0 | L0 |
| 16 | R' | L2 | L0 | L0 | L0 | L0 | L0 | L2 | B' | L2 | L0 | L0 | L0 | L0 | L0 | L2 |

Fig.40

|   | R | G | B | R | G | B | R | G | B | R | G | B | R | G |
|---|---|---|---|---|---|---|---|---|---|---|---|---|---|---|
| i→ | 1 | 2 | 3 | 4 | 5 | 6 | 7 | 8 | 9 | 10 | 11 | 12 | 13 | 14 |
| j 1 | 7 | 11 | 15 | 19 | 23 | 27 | 31 | 35 | 39 | 3 | 7 | 11 | 15 | 19 |
| 2 | 10 | 14 | 18 | 22 | 26 | 30 | 34 | 38 | 2 | 6 | 10 | 14 | 18 | 22 |
| 3 | 13 | 17 | 21 | 25 | 29 | 33 | 37 | 1 | 5 | 9 | 13 | 17 | 21 | 25 |
| 4 | 16 | 20 | 24 | 28 | 32 | 36 | 40 | 4 | 8 | 12 | 16 | 20 | 24 | 28 |
| 5 | 19 | 23 | 27 | 31 | 35 | 39 | 3 | 7 | 11 | 15 | 19 | 23 | 27 | 31 |
| 6 | 22 | 26 | 30 | 34 | 38 | 2 | 6 | 10 | 14 | 18 | 22 | 26 | 30 | 34 |
| 7 | 25 | 29 | 33 | 37 | 1 | 5 | 9 | 13 | 17 | 21 | 25 | 29 | 33 | 37 |
| 8 | 28 | 32 | 36 | 40 | 4 | 8 | 12 | 16 | 20 | 24 | 28 | 32 | 36 | 40 |
| 9 | 31 | 35 | 39 | 3 | 7 | 11 | 15 | 19 | 23 | 27 | 31 | 35 | 39 | 3 |
| 10 | 34 | 38 | 2 | 6 | 10 | 14 | 18 | 22 | 26 | 30 | 34 | 38 | 2 | 6 |
| 11 | 37 | 1 | 5 | 9 | 13 | 17 | 21 | 25 | 29 | 33 | 37 | 1 | 5 | 9 |
| 12 | 40 | 4 | 8 | 12 | 16 | 20 | 24 | 28 | 32 | 36 | 40 | 4 | 8 | 12 |
| 13 | 3 | 7 | 11 | 15 | 19 | 23 | 27 | 31 | 35 | 39 | 3 | 7 | 11 | 15 |
| 14 | 6 | 10 | 14 | 18 | 22 | 26 | 30 | 34 | 38 | 2 | 6 | 10 | 14 | 18 |
| 15 | 9 | 13 | 17 | 21 | 25 | 29 | 33 | 37 | 1 | 5 | 9 | 13 | 17 | 21 |
| 16 | 12 | 16 | 20 | 24 | 28 | 32 | 36 | 40 | 4 | 8 | 12 | 16 | 20 | 24 |
| 17 | 15 | 19 | 23 | 27 | 31 | 35 | 39 | 3 | 7 | 11 | 15 | 19 | 23 | 27 |
| 18 | 18 | 22 | 26 | 30 | 34 | 38 | 2 | 6 | 10 | 14 | 18 | 22 | 26 | 30 |
| 19 | 21 | 25 | 29 | 33 | 37 | 1 | 5 | 9 | 13 | 17 | 21 | 25 | 29 | 33 |
| 20 | 24 | 28 | 32 | 36 | 40 | 4 | 8 | 12 | 16 | 20 | 24 | 28 | 32 | 36 |
| 21 | 27 | 31 | 35 | 39 | 3 | 7 | 11 | 15 | 19 | 23 | 27 | 31 | 35 | 39 |
| 22 | 30 | 34 | 38 | 2 | 6 | 10 | 14 | 18 | 22 | 26 | 30 | 34 | 38 | 2 |
| 23 | 33 | 37 | 1 | 5 | 9 | 13 | 17 | 21 | 25 | 29 | 33 | 37 | 1 | 5 |
| 24 | 36 | 40 | 4 | 8 | 12 | 16 | 20 | 24 | 28 | 32 | 36 | 40 | 4 | 8 |
| 25 | 39 | 3 | 7 | 11 | 15 | 19 | 23 | 27 | 31 | 35 | 39 | 3 | 7 | 11 |
| 26 | 2 | 6 | 10 | 14 | 18 | 22 | 26 | 30 | 34 | 38 | 2 | 6 | 10 | 14 |
| 27 | 5 | 9 | 13 | 17 | 21 | 25 | 29 | 33 | 37 | 1 | 5 | 9 | 13 | 17 |
| 28 | 8 | 12 | 16 | 20 | 24 | 28 | 32 | 36 | 40 | 4 | 8 | 12 | 16 | 20 |

|   | R | G | B | R | G | B | R | G | B | R | G | B | R | G |
|---|---|---|---|---|---|---|---|---|---|---|---|---|---|---|
| 16 | 29 | 34 | 39 | 4 | 9 | 14 | 19 | 24 | 29 | 34 | 39 | 4 | 9 | 14 |
| 15 | 25 | 30 | 35 | 40 | 5 | 10 | 15 | 20 | 25 | 30 | 35 | 40 | 5 | 10 |
| 14 | 21 | 26 | 31 | 36 | 1 | 6 | 11 | 16 | 21 | 26 | 31 | 36 | 1 | 6 |
| 13 | 17 | 22 | 27 | 32 | 37 | 2 | 7 | 12 | 17 | 22 | 27 | 32 | 37 | 2 |
| 12 | 13 | 18 | 23 | 28 | 33 | 38 | 3 | 8 | 13 | 18 | 23 | 28 | 33 | 38 |
| 11 | 9 | 14 | 19 | 24 | 29 | 34 | 39 | 4 | 9 | 14 | 19 | 24 | 29 | 34 |
| 10 | 5 | 10 | 15 | 20 | 25 | 30 | 35 | 40 | 5 | 10 | 15 | 20 | 25 | 30 |
| 9 | 1 | 6 | 11 | 16 | 21 | 26 | 31 | 36 | 1 | 6 | 11 | 16 | 21 | 26 |
| 8 | 37 | 2 | 7 | 12 | 17 | 22 | 27 | 32 | 37 | 2 | 7 | 12 | 17 | 22 |
| 7 | 33 | 38 | 3 | 8 | 13 | 18 | 23 | 28 | 33 | 38 | 3 | 8 | 13 | 18 |
| 6 | 29 | 34 | 39 | 4 | 9 | 14 | 19 | 24 | 29 | 34 | 39 | 4 | 9 | 14 |
| 5 | 25 | 30 | 35 | 40 | 5 | 10 | 15 | 20 | 25 | 30 | 35 | 40 | 5 | 10 |
| 4 | 21 | 26 | 31 | 36 | 1 | 6 | 11 | 16 | 21 | 26 | 31 | 36 | 1 | 6 |
| 3 | 17 | 22 | 27 | 32 | 37 | 2 | 7 | 12 | 17 | 22 | 27 | 32 | 37 | 2 |
| 2 | 13 | 18 | 23 | 28 | 33 | 38 | 3 | 8 | 13 | 18 | 23 | 28 | 33 | 38 |
| 1 | 9 | 14 | 19 | 24 | 29 | 34 | 39 | 4 | 9 | 14 | 19 | 24 | 29 | 34 |
| i → | 1 | 2 | 3 | 4 | 5 | 6 | 7 | 8 | 9 | 10 | 11 | 12 | 13 | 14 |

Fig. 43

Fig.46 (Sequence 1)

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | T | T | T | T | T | G' | G' | G' | G' | G' | S | S | S | S | S |
| | B' | B' | B' | B' | T | T | T | T | T | B' | B' | B' | B' | B' | S |
| | S | S | S | R' | R' | R' | R' | R' | T | T | T | T | T | R' | R' |
| | S | S | S | S | S | S | S | G' | G' | G' | G' | G' | T | T | T |
| | S | S | S | S | S | S | S | S | S | S | S | B' | B' | B' | B' |
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |

Fig.46 (Sequence 2)

| | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| | S | S | S | S | S | S | S | S | S | S | S | S | S | S | S |
| | S | S | S | S | S | S | S | S | S | S | S | S | S | S | S |
| | R' | R' | R' | S | S | S | S | S | S | S | S | S | S | S | S |
| | T | T | G' | G' | G' | G' | G' | S | S | S | S | S | S | S | S |
| | B' | T | T | T | T | T | B' | B' | B' | B' | B' | S | S | S | S |
| | B' | B' | B' | B' | B' | T | T | T | T | T | B' | B' | B' | B' | B' |
| | S | S | S | S | R' | R' | R' | R' | R' | T | T | T | T | T | R' |
| | S | S | S | S | S | S | S | S | G' | G' | G' | G' | G' | T | T |
| | S | S | S | S | S | S | S | S | S | S | S | B' | B' | B' | B' |
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |

| 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|
| S | S | S | S | S | R' | R' | R' | R' | R' | T | T | T | T | T |
| S | S | S | S | S | S | S | S | S | G' | G' | G' | G' | G' | T |
| S | S | S | S | S | S | S | S | S | S | S | S | S | B' | B' |
| S | S | S | S | S | S | S | S | S | S | S | S | S | S | S |
| S | S | S | S | S | S | S | S | S | S | S | S | S | S | S |
| S | S | S | S | S | S | S | S | S | S | S | S | S | S | S |
| R' | R' | R' | R' | S | S | S | S | S | S | S | S | S | S | S |
| T | T | T | G' | G' | G' | G' | G' | S | S | S | S | S | S | S |
| B' | B' | T | T | T | T | T | B' | B' | B' | B' | B' | S | S | S |
| S | R' | R' | R' | R' | R' | T | T | T | T | T | R' | R' | R' | R' |
| S | S | S | S | S | R' | R' | R' | R' | R' | T | T | T | T | T |
| S | S | S | S | S | S | S | S | S | G' | G' | G' | G' | G' | T |

Fig.46 (Sequence 3)

| 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|
| R' | R' | R' | R' | R' | S | S | S | S | S | S | S | S | S | S |
| T | T | T | T | G' | G' | G' | G' | G' | S | S | S | S | S | S |
| B' | B' | B' | T | T | T | T | T | B' | B' | B' | B' | B' | S | S |
| S | S | R' | R' | R' | R' | R' | T | T | T | T | T | R' | R' | R' |
| S | S | S | S | S | S | G' | G' | G' | G' | G' | T | T | T | T |
| S | S | S | S | S | S | S | S | S | S | G' | G' | G' | G' | G' |
| S | S | S | S | S | S | S | S | S | S | S | S | S | S | B' |
| S | S | S | S | S | S | S | S | S | S | S | S | S | S | S |
| S | S | S | S | S | S | S | S | S | S | S | S | S | S | S |
| R' | S | S | S | S | S | S | S | S | S | S | S | S | S | S |
| R' | R' | R' | R' | R' | S | S | S | S | S | S | S | S | S | S |
| T | T | T | T | G' | G' | G' | G' | G' | S | S | S | S | S | S |

Fig.46 (Sequence 4)

| | 61 | 62 | 63 | 64 | 65 | 66 | 67 | 68 | 69 | 70 | 71 | 72 | 73 | 74 | 75 |
|---|---|---|---|---|---|---|---|---|---|---|---|---|---|---|---|
| | S | S | S | S | S | S | S | S | S | S | S | S | S | S | S |
| | S | S | S | S | S | S | S | S | S | S | S | S | S | S | S |
| | S | S | S | S | S | S | S | S | S | S | S | S | S | S | S |
| | R' | R' | S | S | S | S | S | S | S | S | S | S | S | S | S |
| | T | G' | G' | G' | G' | G' | S | S | S | S | S | S | S | S | S |
| | T | T | T | T | T | G' | G' | G' | G' | G' | S | S | S | S | S |
| | B' | B' | B' | B' | T | T | T | T | T | B' | B' | B' | B' | B' | S |
| | S | S | S | R' | R' | R' | R' | R' | T | T | T | T | T | R' | R' |
| | S | S | S | S | S | S | S | G' | G' | G' | G' | G' | T | T | T |
| | S | S | S | S | S | S | S | S | S | S | S | B' | B' | B' | B' |
| | S | S | S | S | S | S | S | S | S | S | S | S | S | S | S |
| | S | S | S | S | S | S | S | S | S | S | S | S | S | S | S |

Fig.46 (Sequence 5)

| | 76 | 77 | 78 | 79 | 80 | 81 | 82 | 83 | 84 | 85 | 86 | 87 | 88 | 89 | 90 |
|---|---|---|---|---|---|---|---|---|---|---|---|---|---|---|---|
| | B' | B' | B' | B' | T | T | T | T | T | B' | B' | B' | B' | B' |
| | S | S | S | S | R' | R' | R' | R' | T | T | T | T | T | R' |
| | S | S | S | S | S | S | S | S | G' | G' | G' | G' | T | T |
| | S | S | S | S | S | S | S | S | S | S | S | B' | B' | B' |
| | S | S | S | S | S | S | S | S | S | S | S | S | S | S |
| | S | S | S | S | S | S | S | S | S | S | S | S | S | S |
| | S | S | S | S | S | S | S | S | S | S | S | S | S | S |
| | R' | R' | R' | S | S | S | S | S | S | S | S | S | S | S |
| | T | T | G' | G' | G' | G' | G' | S | S | S | S | S | S | S |
| | B' | T | T | T | T | T | B' | B' | B' | B' | B' | S | S | S |
| | B' | B' | B' | B' | B' | T | T | T | T | B' | B' | B' | B' | B' |
| | S | S | S | S | R' | R' | R' | R' | T | T | T | T | T | R' |

Fig.46 (Sequence 6)

| 91 | 92 | 93 | 94 | 95 | 96 | 97 | 98 | 99 | 100 | 101 | 102 | 103 | 104 | 105 |
|---|---|---|---|---|---|---|---|---|---|---|---|---|---|---|
| S | S | S | S | S | S | S | S | S | S | S | S | S | S | S |
| R' | R' | R' | R' | S | S | S | S | S | S | S | S | S | S | S |
| T | T | T | G' | G' | G' | G' | G' | S | S | S | S | S | S | S |
| B' | B' | T | T | T | T | T | B' | B' | B' | B' | B' | S | S | S |
| S | R' | R' | R' | R' | R' | T | T | T | T | T | R' | R' | R' | R' |
| S | S | S | S | S | R' | R' | R' | R' | R' | T | T | T | T | T |
| S | S | S | S | S | S | S | S | S | G' | G' | G' | G' | G' | T |
| S | S | S | S | S | S | S | S | S | S | S | S | S | B' | 0 |
| S | S | S | S | S | S | S | S | S | S | S | S | S | S | S |
| S | S | S | S | S | S | S | S | S | S | S | S | S | S | S |
| S | S | S | S | S | S | S | S | S | S | S | S | S | S | S |
| R' | R' | R' | R' | S | S | S | S | S | S | S | S | S | S | S |

Fig.46 (Sequence 7)

| 106 | 107 | 108 | 109 | 110 | 111 | 112 | 113 | 114 | 115 | 116 | 117 | 118 | 119 | 120 |
|---|---|---|---|---|---|---|---|---|---|---|---|---|---|---|
| S | S | S | S | S | S | S | S | S | S | G' | G' | G' | G' | G' |
| S | S | S | S | S | S | S | S | S | S | S | S | S | S | B' |
| S | S | S | S | S | S | S | S | S | S | S | S | S | S | S |
| S | S | S | S | S | S | S | S | S | S | S | S | S | S | S |
| R' | S | S | S | S | S | S | S | S | S | S | S | S | S | S |
| R' | R' | R' | R' | R' | S | S | S | S | S | S | S | S | S | S |
| T | T | T | T | G' | G' | G' | G' | S | S | S | S | S | S | S |
| B' | B' | B' | T | T | T | T | T | B' | B' | B' | B' | B' | S | S |
| S | S | R' | R' | R' | R' | R' | T | T | T | T | T | R' | R' | R' |
| S | S | S | S | S | S | G' | G' | G' | G' | G' | T | T | T | T |
| S | S | S | S | S | S | S | S | S | B' | B' | B' | B' | B' | B' |
| S | S | S | S | S | S | S | S | S | S | S | S | S | S | B' |

Fig.46 (Sequence 8)

| j\i | 1 R | 2 G | 3 B | 4 R | 5 G | 6 B | 7 R | 8 G | 9 B | 10 R | 11 G | 12 B | 13 R | 14 G | 15 B | 16 R | 17 G | 18 B | 19 R | 20 G | 21 B |
|---|---|---|---|---|---|---|---|---|---|---|---|---|---|---|---|---|---|---|---|---|---|
| 1 | 1 | 1 | 2 | 3 | 3 | 4 | 5 | 5 | 6 | 7 | 7 | 8 | 1 | 1 | 2 | 3 | 3 | 4 | 5 | 5 | 6 |
| 2 | 1 | 2 | 3 | 3 | 4 | 5 | 5 | 6 | 7 | 7 | 8 | 1 | 1 | 2 | 3 | 3 | 4 | 5 | 5 | 6 | 7 |
| 3 | 2 | 3 | 3 | 4 | 5 | 5 | 6 | 7 | 7 | 8 | 1 | 1 | 2 | 3 | 3 | 4 | 5 | 5 | 6 | 7 | 7 |
| 4 | 3 | 3 | 4 | 5 | 5 | 6 | 7 | 7 | 8 | 1 | 1 | 2 | 3 | 3 | 4 | 5 | 5 | 6 | 7 | 7 | 8 |
| 5 | 3 | 4 | 5 | 5 | 6 | 7 | 7 | 8 | 1 | 1 | 2 | 3 | 3 | 4 | 5 | 5 | 6 | 7 | 7 | 8 | 1 |
| 6 | 4 | 5 | 5 | 6 | 7 | 7 | 8 | 1 | 1 | 2 | 3 | 3 | 4 | 5 | 5 | 6 | 7 | 7 | 8 | 1 | 1 |
| 7 | 5 | 5 | 6 | 7 | 7 | 8 | 1 | 1 | 2 | 3 | 3 | 4 | 5 | 5 | 6 | 7 | 7 | 8 | 1 | 1 | 2 |
| 8 | 5 | 6 | 7 | 7 | 8 | 1 | 1 | 2 | 3 | 3 | 4 | 5 | 5 | 6 | 7 | 7 | 8 | 1 | 1 | 2 | 3 |
| 9 | 6 | 7 | 7 | 8 | 1 | 1 | 2 | 3 | 3 | 4 | 5 | 5 | 6 | 7 | 7 | 8 | 1 | 1 | 2 | 3 | 3 |
| 10 | 7 | 7 | 8 | 1 | 1 | 2 | 3 | 3 | 4 | 5 | 5 | 6 | 7 | 7 | 8 | 1 | 1 | 2 | 3 | 3 | 4 |
| 11 | 7 | 8 | 1 | 1 | 2 | 3 | 3 | 4 | 5 | 5 | 6 | 7 | 7 | 8 | 1 | 1 | 2 | 3 | 3 | 4 | 5 |
| 12 | 8 | 1 | 1 | 2 | 3 | 3 | 4 | 5 | 5 | 6 | 7 | 7 | 8 | 1 | 1 | 2 | 3 | 3 | 4 | 5 | 5 |
| 13 | 1 | 1 | 2 | 3 | 3 | 4 | 5 | 5 | 6 | 7 | 7 | 8 | 1 | 1 | 2 | 3 | 3 | 4 | 5 | 5 | 6 |
| 14 | 1 | 2 | 3 | 3 | 4 | 5 | 5 | 6 | 7 | 7 | 8 | 1 | 1 | 2 | 3 | 3 | 4 | 5 | 5 | 6 | 7 |
| 15 | 2 | 3 | 3 | 4 | 5 | 5 | 6 | 7 | 7 | 8 | 1 | 1 | 2 | 3 | 3 | 4 | 5 | 5 | 6 | 7 | 7 |
| 16 | 3 | 3 | 4 | 5 | 5 | 6 | 7 | 7 | 8 | 1 | 1 | 2 | 3 | 3 | 4 | 5 | 5 | 6 | 7 | 7 | 8 |

METHOD AND SYSTEM FOR THE THREE-DIMENSIONAL REPRESENTATION

FIELD OF THE INVENTION

The invention is directed to a method for three-dimensional display of a scene/object in which a plurality of individual image elements $\alpha_{ij}$ are made visible simultaneously in a grid or raster of columns i and lines j, wherein the image elements $\alpha_{ij}$ reproduce partial information from a plurality of views $A_k$ (k-1 . . . n) of the scene/object, and wherein adjacent image elements $\alpha_{ij}$ radiate light of different wavelengths $\Delta$ or wavelength regions $\Delta\lambda$. The invention is further directed to arrangements for carrying out the method.

PRIOR ART

As a result of the efforts made to display objects, landscapes, interior views of bodies and other things based on imaging so that they are perceivable three-dimensionally by the observer, a large number of autostereoscopic methods have arisen in the course of development which can be roughly distinguished as lenticular methods, prism raster methods and barrier methods.

These methods are based on the principle of optically showing a plurality of different perspectives simultaneously, but, through suitable steps, making only one or a plurality of these perspective views visible separately for each eye of an observer, resulting in a parallactic effect enabling the observer to perceive three-dimensionally.

It is well known that as a result of pseudoscopic effects occurring as an unwanted by-product in these methods or when using arrangements working by these methods, the observer sees an image which is reversed with respect to three-dimensional depth and which is therefore unrealistic. Also, interference, referred to generally as Moiré fringes, is perceptible to a greater or lesser extent depending on the design of these types of arrangements. While the phenomena mentioned above can be reduced or even eliminated, this generally requires additional steps which make the arrangements more expensive or have a disadvantageous influence on their usability.

For optical reproduction of the perspective views of an object for purposes of autostereoscopic display, it is known to use electronically controllable displays which are also suitable for showing two-dimensional views when controlled in conventional manner. In this connection, it is desirable for possible cases of application to be able to switch from three-dimensional autostereoscopic display to two-dimensional display (and vice versa) of the same scene or object. However, in known arrangements of this type, switching disadvantageously changes the image quality in such a way that displayed text, for example, is easily legible in one operating mode, but still insufficiently legible in another. This occurs in arrangements based on the barrier method, particularly when the barrier is composed of alternately opaque and transparent stripes arranged vertically adjacent to one another. Moreover, Moiré effects still occur in this case and provide for an unpleasant visual sensation. Lenticulars also substantially reduce legibility of displayed texts through the permanent optical imaging.

EP 0791847 describes an arrangement in which autostereoscopic views are generated using a conventional RGB LC display in connection with inclined lenticulars, wherein Moiré patterns occur on principle. In order to reduce the Moiré pattern, this reference suggests arranging the color filters associated with the subpixels in a different configuration. It is disadvantageous that implementation of this suggestion would require aggressive modification of proven embodiment forms and manufacturing processes which would entail excessive costs with regard to industrial large-series production of conventional RGB LC displays. Further, the effect of the steps proposed in this reference does not extend to eliminating the disadvantages in two-dimensional displays, so that a uniformly high image quality is not ensured when switching from autostereoscopic to two-dimensional display. The reference cited above relates to an arrangement in which lenses are used for generating the autostereoscopic display.

WO 97/02709 also suggests changing the surface structure of an image display device to achieve a reduction in the Moiré effect. For this purpose, the RGB pixel surface structure is changed in such a way that a Moiré-reduced autostereoscopic effect results. The barrier method is made use of in that transparent slits are applied which are surrounded by opaque surfaces.

In U.S. Pat. No. 5,938,774, structured light sources which can also be structured with respect to their spectral properties, among other things, are used as a basis for autostereoscopic display. These structured light sources work together with lens-like optical components which map or image upon determined regions of light modulators, for example, LC displays, a group of concentrations of light generated at determined intervals for each perspective view. The disadvantageous effects described above also occur in these arrangements.

For selecting the direction of the light proceeding from the perspective views, JP 10333090 suggests the use of color illumination and color filters. In addition, an optical filter is provided for reducing the amount of light in predetermined wavelength regions. The procedure described in this reference is a two-channel method based on only two perspective views, each view being perceivable to one eye of the observer. According to the disclosure, the width of a filter element or the width of an illumination element roughly corresponds to twice the width of a subpixel in an LC display. From this it necessarily follows that conventional LC displays are not applicable for generating the structured illumination, since an RGBRGBRGB color structure of the subpixels is predetermined in this display. Further, in this case too, the stripe-shaped color filters in periodic arrangement again inevitably give rise to Moiré fringes. The fixed distance between the observer and the image plane given by the indicated equations and functions is also disadvantageous.

U.S. Pat. No. 5,751,479 describes an autostereoscopic display in which wedge-shaped light propagation directions are predetermined by vertically extended stripe-shaped red, green and blue filters for views which are interlaced, likewise in a stripe-shaped manner. Each eye of the observer accordingly sees an image composed of vertical stripes. The arrangement always presents the same views to the observer, who moves his eyes in vertical direction to the image surface, i.e., the perceived perspective impression always remains the same during a movement of this kind.

This arrangement is disadvantageous in that the observer must remain in one observation position. Further, the number of possible views to be shown is limited to a maximum of four due to geometric conditions, so that the maximum quantity of observers is also relatively small. Most of the design possibilities are suitable for only one observer. Moreover, strong Moiré effects occur when the color filters are even only slightly out of alignment relative to the image transmitter.

Color LC displays are also used in connection with color illumination and color filters for autostereoscopic display in JP 10186272 and JP 8194190. In the arrangements suggested in these references, the autostereoscopic display can be based on a plurality of perspective views. The primary colors red, green and blue exclusively are provided for the filters; the illumination sources and the filters arranged in front of them are structured in a strictly periodic manner in the same, or opposite, sequence of the primary colors on the associated color mask. The color filters are stripe-shaped and the width of the filter elements corresponds essentially to the product of the width of a subpixel and quantity of views being displayed.

As a result, the width of a filter element is at least twice as great as that of a subpixel in the LC display. Therefore, Oust as in the arrangement according to JP 10333090), the use of commercial LC displays for structured illumination is impossible because of the given RGBRGBRGB . . . subpixel structure. Further, extensive Moiré fringes are generated when the autostereoscopic display of a scene or an object is to be based upon eight perspective views, for example. In this case, assuming a currently typical subpixel extension of 70 μm, a stripe-shaped RGB sequence of a filter would have a width of 3×8×70 μm=1.68 mm on the LC display. Moiré fringes occur in a structure of this type, so that the display quality is impaired.

JP 8163605 describes an arrangement in which, again, two perspective views are used. The pixels on which the views are shown are uniquely visible for only one of the observer's eyes. Stripe-shaped color filters are arranged in front of a display or in front of a stripe-shaped RGB illumination element for selecting the direction of the light proceeding from the pixels. The same disadvantages as those described above also occur in this case.

According to the description in JP 8146347, a separate transparent-opaque barrier corresponds with a color filter for the purpose of direction selection. The transparent regions of the barrier and the translucent regions of the color filter are either slit-shaped or circular. The disadvantages described above occur again in this case, as in the arrangement according to JP 8146346 which uses a two-channel method with stripe-shaped vertical color filters for correlating the direction with the two perspective views.

A two-channel method for stereoscopic display based on two perspective views of a subject or a scene is described in EP-A-0 744 872. The image information of both perspective views is made visible separately for each of the two perspective views and exclusively for the right eye and left eye, respectively, of only one individual observer. When more than one pair of such perspective views showing the subject or the scene from different observation positions is available, these additional pairs of perspective views are always displayed successively by pairs, so that, as the pairs of views change, observation is always stereoscopic, but is possible from different corresponding observation positions. EP-A-0 744 872 provides for synchronization between the image reproduction and the structured barrier for generating two stereoscopic views in each instance.

EP-A-0 860 728 describes an autostereoscopic display which is likewise suitable to use for two-channel display methods. In this case, also, always only information from two perspective views is made visible, one of which perspective views is assigned to the right eye of an observer, while the other perspective view is assigned to the left eye of the observer. The technical solution which is described in detail serves to direct the observer to viewing areas in which pseudoscopic perception is possible.

DESCRIPTION OF THE INVENTION

Proceeding from the prior art mentioned above, it is the object of the invention to achieve an autostereoscopic display for a plurality of observers simultaneously with a few, preferably commercially available, optical components while improving perceptibility.

According to the invention, in a method of the type described above, propagation directions are predetermined for the light radiated from the image elements $\alpha_{ij}$, which propagation directions depend on the wavelength of this light, wherein the propagation directions within an observation space in which the observer or observers is or are situated intersect in a plurality of intersection points, each of which corresponds to an observation position. From each observation position, one eye of an observer perceives predominantly image elements $\alpha_{ij}$ of a first selection and the other eye perceives predominantly image elements $\alpha_{ij}$ of a second selection from views $A_k$ (k=1 . . . n).

In this connection, an image element $\alpha_{ij}$ is a self-luminous or illuminated surface of small size with a surface content of about 10,000 μm$^2$ to several mm$^2$ on which a minimum section of one of the views $A_k$ (k=1 . . . n), referred to hereinafter as partial information of such view $A_k$ (k=1 . . . n), can be reproduced in location ij. The index pair i,j can also advantageously designate the position in view $A_k$ from which the partial information that is reproduced on the image element $\alpha_{ij}$ originates, insofar as the views $A_k$ (k=1 . . . n) are arranged in rasters of columns i and lines j.

By a selection from views $A_k$ (k=1 . . . n) is meant those views $A_k$ whose image elements $\alpha_{ij}$ are to be predominantly visible for one eye or the other. For example, the propagation directions for light coming from image elements $\alpha_{ij}$ on which partial information of views $A_k$ (k=1 . . . 4) (corresponding to a first selection) are shown can be predetermined such that this light or this partial information primarily reaches the left eye of an observer stationed in the observation space, while the propagation directions for the light coming from image elements $\alpha_{ij}$ on which partial information of the rest of the views $A_k$ (k=5 . . . n) (corresponding to a second selection) are shown can be predetermined such that this light or this partial information primarily reaches the right eye of the same observer. Consequently, in this case, the first selection which is intended for the left eye comprises views $A_1$, $A_2$, $A_3$ and $A_4$. The second selection which is intended for the left eye would comprise views $A_5$, $A_6$ . . . $A_n$.

This also expressly includes the cases in the method according to the invention in which the light coming from an image element $\alpha_{ij}$ reaches the respective eye of the observer not in its entirety but only in part, which is possible, for example, when an image element $\alpha_{ij}$ is partly covered, for instance, by parts of the arrangement.

The condition that an eye perceives "predominantly" image elements $\alpha_{ij}$ or partial information reproduced on these image elements $\alpha_{ij}$ is also met when this eye sees, for example, 80% of the image elements $\alpha_{ij}$ reproducing partial information of view $A_1$, while the other eye can likewise see such image elements a reproducing the partial information of view $A_1$, but less than 80%.

The propagation directions are preferably predetermined by a plurality of wavelength filters $\beta_{pq}$, wherein an image element $\alpha_{ij}$ corresponds with a plurality of associated wavelength filter elements $\beta_{pq}$ or a wavelength filter element $\beta_{pq}$ corresponds with a plurality of associated image elements $\alpha_{ij}$ such that the straight connecting lines between the surface center of the visible portion of an image element $\alpha_{ij}$ and the surface center of the visible portion of a wavelength filter element $\beta_{pq}$ corresponds to a propagation direction.

It is advantageous when the wavelength filter elements $\beta_{pq}$ are arranged in arrays with columns p and lines q and one or more such arrays are arranged at a fixed distance in front of and/or following the raster with image elements $\alpha_{ij}$ with reference to the viewing direction of an observer.

For purposes of predetermining the propagation directions, exactly defined positions ij on the raster are allocated to the image elements $\alpha_{ij}$ reproducing the associated partial information of views $A_k$ (k=1 . . . n). Defined positions p,q on the array are assigned to the wavelength filters $\beta_{pq}$ which are to correspond with these image elements $\alpha_{ij}$. The propagation directions are then given by the positions of the image elements $\alpha_{ij}$ on the raster and the positions of the corresponding wavelength filter elements $\beta_{pq}$ on the array in connection with the distance z between the raster and array.

The correlation of the partial information of the views $A_k$ (k=1 . . . n) to image elements $\alpha_{ij}$ and the positioning of these image elements $\alpha_{ij}$ on the raster can be carried out, according to the invention, based on the following function (F 1):

$$k = i - c_{ij} \cdot j - n \cdot IntegerPart\left[\frac{i - c_{ij} \cdot j - 1}{n}\right], \quad (F1)$$

where i is the index of an image element $\alpha_{ij}$ in a line of the raster, j is the index of an image element $\alpha_{ij}$ in a column of the raster, k is the continuous number of the view $A_k$ (k=1 . . . n) from which the partial information to be reproduced on a determined image element $\alpha_{ij}$ originates, n is the total number of utilized views $A_k$ (k=1 . . . n), $c_{ij}$ is a selectable coefficient matrix for combining and mixing on the raster the different partial information which originates from views $A_k$ (k=1 . . . n), and IntegerPart represents a function for generating the greatest whole number not exceeding the argument in brackets.

In other words, the indices (i, j) designate the positions of image elements $\alpha_{ij}$ for which the views $A_k$ (k=1 . . . n) from which the partial information to be shown is to be drawn must be indicated. In this regard, i represents the horizontal index (with values from 1 to the horizontal image element resolution which, when the partial information is shown on RGB subpixels, is three-times the value of the pixel resolution) and j for the vertical index (with values from 1 to the value of the vertical image element resolution).

When the total image which is to be shown on the raster and which is to be combined from partial information of the views $A_k$ (k=1 . . . n) must be determined for an optional but fixed quantity n of views $A_k$ (k=1 . . . n), all of which have the same image resolution or the same format, the following must be taken into account for the combination rule:

The values entered in the coefficient matrix $c_{ij}$ can be values corresponding to real numbers. Natural numbers greater than "zero" are possible in the value range mentioned above for i and j.

When these parameters are set, the total image which is shown on the raster and which is combined from the different partial information of views $A_k$ (k=1 . . . n) is generated corresponding to the function indicated above in that all possible index pairs i,j are run through.

According to the invention, a further prerequisite for generating a three-dimensional view consists in determining the structure in which the wavelength filter elements $\beta_{pq}$ which give the propagation directions in cooperation with the image elements $\alpha_{ij}$ are to be positioned within the array with columns p and lines q.

The wavelength filter elements $\beta_{pq}$ have transparency wavelengths or transparency wavelength regions $\lambda_b$ which preferably correspond to the wavelength or wavelength region $\lambda_a$ of the light emitted by the corresponding image elements $\alpha_{ij}$. For special constructions of the invention which will be described in more detail in the following, the wavelength filter elements $\beta_{pq}$ also have, for example, transparency wavelengths or transparency wavelength regions $\lambda_b$ lying outside the spectrum of visible light, so that the visible light is blocked out by these wavelength filter elements $\beta_{pq}$.

A transparency wavelength or transparency wavelength region $\lambda_b$ can also stand for a combination of different wavelength regions (e.g., transparent for blue and red, but not for green). The index b can accordingly have values from 1 to the maximum number of determined transparency wavelengths/transparency wavelength regions $\lambda_b$. In case of a wavelength filter array which can pass light for the fundamental or primary colors R,G,B at predetermined positions defined by the index pair p,q, while the entire visible spectrum is to be blocked out at other positions, then $b_{max}$=4. In this case, for example, the transparency wavelengths or transparency wavelength regions $\lambda_1$, $\lambda_2$ and $\lambda_3$ correspond to red (R), green (G) or blue (B) light and the transparency wavelength/transparency wavelength region $\lambda_4$ lies completely outside the spectral region of all visible light. A transparency wavelength/transparency wavelength region $\lambda_4$ of this kind results in an opaque filter (S).

To this extent, the wavelength filter elements $\beta_{pq}$ on the array can be considered as translucent or transparent parts of a mask image. The position of each wavelength filter $\beta_{pq}$ is uniquely established by the index p,q. A determined transparency wavelength or a determined transparency wavelength region $\lambda_b$ is associated with every wavelength filter element $\beta_{pq}$. The structuring of the wavelength filter elements $\beta_{pq}$ to form a mask image is carried out—in a manner analogous to the combination of partial information of different views $A_k$ (k=1 . . . n) to form a total image—according to the following rule (F2):

$$b = p - d_{pq} \cdot q - n_m \cdot IntegerPart\left[\frac{p - d_{pq} \cdot q - 1}{n_m}\right], \quad (F2)$$

where p represents the index of a wavelength filter $\beta_{pq}$ in a line of the array, q represents the index of a wavelength filter element $\beta_{pq}$ in a column of the array, b is a whole number which determines one of the provided transparency wavelengths/transparency wavelength regions $\lambda_b$ for a wavelength filter element $\beta_{pq}$ at position p,q and can have values between 1 and $b_{max}$, $n_m$ is an integral value greater than zero which preferably corresponds to the total number n in views $A_k$ shown in the combined image, $d_{pq}$ is a selectable mask coefficient matrix for varying the generation of a mask image, and IntegerPart represents a function for generating the greatest whole number not exceeding the argument in brackets.

Constructions of the invention in which $b_{max}$ and $n_m$ are equal are preferred.

The values entered in the selectable coefficient matrix $d_{pq}$ can be values corresponding to real numbers. Natural numbers greater than zero are possible for p and q which (as was already shown) describe positions within the wavelength filter array.

Consequently, the generation of the combined total image from the partial information of views $A_k$ (k=1 . . . n) and the generation of the mask image are based on identical rules or at least related rules. The wavelength filter elements $\beta_{pq}$, as elements of the mask image, preferably extend over approximately the same surface area as the image elements $\alpha_{ij}$.

This latter fact can be applied in a particularly advantageous manner in connection with reducing Moiré effects. In this way, visible periodic superposition of the raster of image elements $\alpha_{ij}$ for image reproduction with arrays of wavelength filters $\beta_{pq}$ as mask image can be reduced in a defined manner, so that Moiré effects are also reduced.

Also, the fact that every mask image is structured in a defined wavelength-selective manner can in itself be used to substantially reduce Moiré effects through suitably structured mask images. This happens, for example, when the wavelength filter elements $\beta_{pq}$ for the primary colors R,G,B are arranged on an essentially opaque background pattern in the form of an isosceles triangle. Namely, in this case, for every primary color R,G,B, there is not chiefly a preferred direction of the superposition with image elements $\alpha_{ij}$ of the same primary color which are located directly below or directly above in the plane of the array, but rather there are many different directions, so that the perceptibility of the Moiré is appreciably inhibited.

Transparency wavelengths/transparency wavelength regions $\lambda_b$ with identical content can also be predetermined for different values of b: for example, when $b_{max}$=8, $\lambda_1$ to $\lambda_3$ can represent R,G,B in this sequence and $\lambda_4$ to $\lambda_8$ can represent wavelengths outside the range of visible light, where $\lambda_1$ to $\lambda_3$ transmit colors R,G,B and $\lambda_4$ to $\lambda_8$ block the visible spectrum. In this case, the combination rule for parameters $d_{pq}$=−1=const and $n_m$=8 give a mask image which periodically generates diagonal stripes in the RGB colors on an opaque background. Five of the filter elements $\beta_{pq}$ in every line remain opaque between these color stripes. The angle of the inclination of the color stripes depends on the dimensions of the filter elements $\beta_{pq}$.

In a further development which is mentioned by way of example, a plurality of transparency wavelengths/transparency wavelength regions $\lambda_b$ can have the same filter effects: Let $\lambda_1$ . . . $\lambda_7$ be wavelength regions which block the entire visible spectrum, let $\lambda_8$ be a filter region which is transparent for the visible spectrum, and let $n_m$=8 and $d_{pq}$=−1=const, then, according to the rule for generating a mask image, there results a substantially opaque mask image containing uniformly distributed, diagonal, transparent stripes on the surface which take up approximately one eighth of the entire surface.

The wavelength filter elements $\beta_{pq}$ and the image elements $\alpha_{ij}$ are correlated with each other by wavelengths or wavelength regions, i.e., a wavelength filter element $\beta_{pq}$ of a determined transparency wavelength/transparency wavelength region $\lambda_b$ can pass the light of those image elements $\alpha_{ij}$ which emit light corresponding to this transparency wavelength or lying within the transparency wavelength region $\lambda_b$. However, as was already shown, wavelength filter elements $\beta_{pq}$ can also block the light coming from associated image elements $\alpha_{ij}$.

The distance z between the array of wavelength filters $\beta_{pq}$ and the raster of image elements $\alpha_{ij}$, measured in the viewing direction, is a parameter to be determined while taking into account the width of the image elements $\alpha_{ij}$, the width of the wavelength filter elements $\beta_{pq}$ and the size of the observation space, namely, in such a way that, with a given combination of individual partial information of views $A_k$ (k=1 . . . n) on the raster within the observation space, the displayed scene/object can be perceived in three dimensions.

For example, the distance z between the array of wavelength filters $\beta_{pq}$ and the raster of image elements $\alpha_{ij}$ measured in the viewing direction can be determined according to the following equation (F3):

$$\frac{z}{s_p} = \frac{d_a}{p_d}, \tag{F3}$$

where $S_p$ represents the average horizontal distance between two wavelength filters $\beta_{pq}$ when the array with the wavelength filters $\beta_{pq}$ is arranged behind the raster of image elements $\alpha_{ij}$ in the viewing direction of the observer, or the average horizontal distance between two image elements $\alpha_{ij}$ when the raster of image elements $\alpha_{ij}$ is arranged behind the array with the wavelength filters $\beta_{pq}$ in the viewing direction of an observer, $p_d$ represents the average interpupillary distance with an observer, and $d_a$ represents a selectable observation distance which essentially corresponds to the average of all possible distances in the entire observation space between the raster of image elements $\alpha_{ij}$ and an observer or an observation position.

In practice, there are also other possible procedures for determining the distance z. In this connection, the relationship in which the size or distance of the observation space increases as z increases also applies in general.

For example, when three transparency wavelengths/transparency wavelength regions $\lambda_1, \lambda_2, \lambda_3$ are predetermined for R,G,B and another transparency wavelength/transparency wavelength region $\lambda_4$ by which the visible light can be completely blocked off is predetermined for generating a mask image with $b_{max}$=4, there results a mask image which is well suited for three-dimensional display of an object/scene on the basis of n=8 views $A_k$ (k=1 . . . n) using the coefficient matrix $d_{pq}$ which can be generated according to rule (F4):

$$d_{pq} = \frac{p-1-(p \bmod 3)}{q} \delta((p+q) \bmod 8) + \left(\frac{p-4}{q}\right) \delta[\delta((p+q) \bmod 8)]. \tag{F4}$$

In this case, $n_m$=8; "mod" designates the residual class in relation to a divisor. The function $\delta$ gives the value "zero" for all arguments not equal to zero; the function value 1 is given for the argument "zero" because $\delta(0)$=1 and $\delta(x \neq 0)$=0. The indices p,q run through all possible values within the mask image; when displaying on a color LC display with XGA resolution, e.g., the values for p are 1 to 1024*3 and the values for q are 1 to 768.

When the light emitted by the individual image elements $\alpha_{ij}$ propagates in a manner predetermined according to the invention there occurs within an observation space located in front of the raster with image elements $\alpha_{ij}$ a plurality of observation positions from which every observer located within this observation space sees primarily image elements $\alpha_{ij}$ of a first selection from views $A_k$ (k=1 ... n) with one eye and primarily image elements $\alpha_{ij}$ of a second selection from views $A_k$ (k=1 ... n) with the other eye, so that the scene or the object is perceived three-dimensionally by the respective observer.

The quantity of observation positions is so large and the observation positions are so close together that observers can move within the observation space, while their eyes are always, as it were, in an observation position of this kind because the observation positions correspond to intersection points of the defined propagation directions and the light beams visible to the eye have a small, but nonetheless existent, surface cross section.

By observation space is meant, within the context of the invention, the area in which one or more observers are stationed or in movement and, insofar as the observer looks in the direction of the raster, can perceive the scene or object three-dimensionally. Depending on the structure of the mask image and quantity n of views $A_k$ (k=1 ... n) that are used, viewing angles greater than 45° on the raster are possible, i.e., the observation space can have an opening angle of greater than 45° proceeding from the mean perpendiculars of the raster.

This new method for autostereoscopic display differs substantially from the relevant methods known from the prior art. Whereas, in known methods, partial information of a view is visible exclusively for one eye or the other eye, this new method intentionally allows partial information of one or more views to be visible to both eyes of the observer.

A condition to be met as a prerequisite for three-dimensional perception consists in that one eye sees more partial information of the same view than the other eye. However, by maintaining the propagation directions which are predetermined according to the invention, the quantity of "wrong" partial information—"wrong" because it is really to be assigned to the other eye—does not exceed a limiting value beyond which the quality is no longer sufficient for three-dimensional perception. In this connection, while not strictly required, it is advantageous to use perspective views as views of the scene/object. The use of orthogonal projections as views also gives excellent results.

For example, when an object is to be displayed three-dimensionally based on, e.g., eight perspective views $A_k$ (k=1 ... 8), high-quality three-dimensional perception is also ensured proceeding from the plurality of observation positions with the propagation directions which are predetermined according to the invention because the right eye of the observer perceives image elements $\alpha_{ij}$ with partial information, e.g., of views $A_1$ to $A_4$ predominantly although not exclusively, and the left eye of the observer perceives image elements $\alpha_{ij}$ with partial information, e.g., of views $A_5$ to $A_8$ predominantly although not exclusively, wherein image elements $\alpha_{ij}$ or parts thereof with partial information of views $A_1$ to $A_4$ are also visible in limited quantity for the left eye and image elements $\alpha_{ij}$ or parts thereof with partial information of views $A_5$ to $A_8$ are also visible in limited quantity for the right eye.

While "wrong" image elements $\alpha_{ij}$ which are visible for both eyes lead in principle to a slight corruption of the three-dimensional impression, this does not destroy the depth-correct 3D impression within the observation space.

This also results in a substantial advantage of the method according to the invention which consists in that this method can be converted and utilized with arrangements that can be produced economically using a few commercially available standard products, e.g., color LC displays, and for reproducing partial information on the image elements $\alpha_{ij}$ as well as for generating the mask image with wavelength filters $\beta_{pq}$. When the subpixels R,G,B of a color LC display serve as image elements $\alpha_{ij}$ and the latter reproduce the partial information of views $A_k$ (k=1 ... n), a surprising color fidelity and color brilliance can be achieved.

The use of wavelength filters offers a multitude of significant advantages particularly compared with the methods known from the prior art for three-dimensional display which are based on imaging optical elements, e.g., lenticulars.

The filter elements do not generate any optical imaging and therefore also do not generate any imaging errors. Optical imaging based on single-stage lens systems, on the other hand, always entail imaging errors. Aspherical lenses having the extension of the filter elements in the filter array cannot currently be produced at a reasonable cost.

Further, when using lenticular shields, for example, light reflections from ambient light points are always perceptible over the entire width of the lenticular surface due to the shape of this surface. In contrast, punctiform ambient light sources are also reflected only as punctiform interference light reflections in the method according to the invention; such effects can be minimized, moreover, by the use of reflection-reducing films on the carrier material of the filter array or on the filter array itself.

In the lenticular method, the lenticulars image the image elements for the observer; more exactly, an image element usually fills the entire width of a lenticular for the observer, with the result that the size of the image elements is perceived more coarsely. On the other hand, in the method according to the invention, every image element which is visible for the observer remains without optical imaging and is accordingly perceptible in an unmagnified manner.

The method according to the invention offers the further advantage of the possibility that the three-dimensional display can be based on almost any number of, but at least two, views of a scene or object depending on the resolution of the raster used for image reproduction.

Moreover, it is possible to substantially improve the legibility of displayed text compared with known black-and-white barrier methods. That is, when wavelength-dependent mask image structures entirely without opaque surfaces are used in an arrangement within the framework of the invention and conventional text is placed below it, the text under every wavelength filter element $\beta_{pq}$ will be visible in contrast to a black-and-white barrier method for four views in which only a part, namely, one fourth of the displayed text surface, is visible in the center. This substantially facilitates legibility of text.

Further, in this case, a three-dimensionally displayed image (e.g., using bandpass filters with a transmission of 100%) can be about a third brighter in relation to the average surface luminous density than the same three-dimensional image generated with black-and-white barriers.

A special advantage of the method and arrangements for implementing this method according to the invention consists in that wavelength filter arrays can be produced in a relatively simple manner in technical respects relating to manufacture. For example, they can be printed or impressed on glass or other carrier material, printed as a sheet or generated by an exposure process. In a particular embodiment, construction as a holographic optical element is also possible.

In addition to the advantages of favorable and multifold possibilities of production, there are further advantageous optical characteristics of the wavelength filter arrays with respect to alignment. For example, a slight rotation of the filter array in the observation direction does not necessarily generate strong and unpleasant Moiré effects, which substantially reduces expenditure on assembly.

When using transparent carrier materials for the wavelength filter array, there occur beam offsets (parallel offsets) of the light propagation directions which influence the three-dimensional impression only negligibly. Further, the quality of the three-dimensional perception is affected only insignificantly when the wavelength filter elements $\beta_{pq}$ are not constructed as ideal filters (100% edge filters). As a result, currently available filter colors, also with characteristics that are not ideal, are suitable for producing the wavelength filter arrays.

The use of the method according to the invention is not limited only to the light in the visible spectral region; rather, components of the invisible electromagnetic spectrum can also be blocked or passed with a correspondingly modified wavelength filter array and, in this way, when a stereoscopic camera designed for these spectral regions is located at the location of the observer, three-dimensional recordings can be obtained and made visible after frequency conversion for the purpose of visual evaluation. In this way, numerous application possibilities result for the medical field alone, for example, when a radiation dose with a given wavelength is to be introduced at a determined spatial depth in a body.

Every wavelength filter element $\beta_{pq}$ can have fixed predetermined transparency wavelengths/transparency wavelength regions $\lambda_b$ containing the wavelength of the light coming from the associated or corresponding image elements $\alpha_{ij}$. Alternatively, wavelength filter elements $\beta_{pq}$ whose transparency wavelength/transparency wavelength region $\lambda_b$ can be changed depending on a control can also be provided.

With appropriate programming of a control circuit, it is also possible to change the filtering effect of the wavelength filter elements $\beta_{pq}$ during operation, which can be advantageously used for the purpose of adapting the autostereoscopic perceptibility of a displayed object to the individual impression of an observer. This is achieved by changing the mask image. Accordingly, for example, a wavelength filter element $\beta_{pq}$ can transmit a determined primary color, for instance, R, in an optimal manner or not at all or in a brightness-dependent intermediate stage depending on control.

Also, wavelength filter elements $\beta_{pq}$ which are selected in this way and belong to a predetermined region of the array can be switched so as to be as completely transparent as possible, so that this region generates a two-dimensional display of the scene or object, while the rest of the regions which are still wavelength-filtered continue to show a three-dimensional view. Of course, it is also possible in this way to display the entire scene/object by appropriate controlling of all wavelength filter elements $\beta_{pq}$ in two dimensions or three dimensions, as desired.

This can be achieved, for example, when a transparent color LC display which, like the color LC display provided for image reproduction, has separately controllable subpixels R',G',B' (provided with an apostrophe for distinguishing them) is used as wavelength filter array and a surface illumination extending over the entire surface of the display is associated with this transparent color LC display. When illumination is switched on, beams of the corresponding fundamental wavelength or corresponding wavelengths/ wavelength regions proceed from every subpixel R',G',B'.

For example, when a color LC display with subpixels R',G',B' which serves as a wavelength filter array is arranged in front of a color LC display with subpixels R,G,B which is provided for reproducing the image elements $\alpha_{ij}$, the radiation coming from a subpixel R can always only pass through subpixel R' of the color LC display which is arranged in front. When the partial information of one of the views $A_k$ (k=1 . . . n) is associated with subpixel R, the propagation directions for the information of this image element $\alpha_{ij}$ are given by straight lines through the surface centers of subpixel R' and subpixel R. This also applies in an analogous sense to subpixels G and G' or B and B'.

In this way, the respective desired propagation directions of the image information can be determined by correlating partial information of the different views $A_k$ (k–1 . . . n) with subpixels R,G,B of the image-displaying color LC display. For example, as will be explained more fully in the following with reference to an embodiment example, the wavelength-dependent correlation of the image elements $\alpha_{ij}$ of one of the views $A_k$ (k=1 . . . n) predominantly with one eye or the other eye of the observer, as was intended, can be achieved in this way.

In this connection, the invention is also directed to an arrangement for three-dimensional display of a scene/object in which, for purposes of reproducing the image elements $\alpha_{ij}$, a color LC display with separately controllable subpixels R,G,B is provided and coupled with a control circuit which generates image elements of views $A_k$ (k=1 . . . n) on the subpixels R,G,B, wherein, further, there is at least one array of a plurality of wavelength filters $\beta_{pq}$ which is arranged at a predetermined distance z in front of and/or after the color LC display with respect to the viewing direction of the observer, wherein a plurality of wavelength filter elements $\beta_{pq}$ correspond respectively with one of the subpixels R,G,B in such a way that these wavelength filter elements $\beta_{pq}$ are transparent for light proceeding from the corresponding subpixel R,G,B, and wherein the propagation directions of the light proceeding from this subpixel R,G,B are determined by the positions of these wavelength filter elements $\beta_{pq}$.

The distance between the subpixels R,G,B on the color LC display, the distance of the wavelength filter elements $\beta_{pq}$ relative to one another inside the array and the distance z between the array of wavelength filter elements $\beta_{pq}$ and the color LC display measured in the viewing direction of an observer are adapted to one another in such a way that the light proceeding from the subpixels R,G,B propagates through the corresponding wavelength filter elements $\beta_{pq}$ in the determined directions in such a way that a three-dimensionally perceptible display results in the manner described above.

A color LC display is preferably provided as a wavelength filter array and is coupled with a control circuit which controls the subpixels R',G',B' depending on the parameters $d_{pq}$, $n_m$ and $\lambda_b$, wherein the wavelength $\lambda_b$ associated with a wavelength filter element $\beta_{pq}$ corresponds to the primary color of a subpixel R',G',B'or of a corresponding subpixel R,G,B. A wavelength region $\lambda_b$, hereinafter designated by S, which is completely opaque for visible light can be provided in addition to R,G,B as additional wavelength region $\lambda_b$.

It is expressly noted that the invention includes arrangements in which the wavelength filter array is arranged, with respect to the viewing direction of an observer, after or in front of the color LC display serving to show the image elements, and in other possible arrangements a wavelength filter array is arranged in front of and after the color LC display for showing the image elements.

With respect to their transparency behavior, the wavelength filter elements $\beta_{pq}$ can also be designed so as not to be changeable over time. It is critical and also essential to the invention that the subpixels R,G,B for reproducing the image elements $\alpha_{ij}$ correspond with wavelength filters $\alpha_{pq}$ or subpixels R',G',B' in such a way that there is a plurality of propagation directions corresponding to the method described above.

For particular cases of application, it may also be advantageous when the respective elements in one or both rasters, i.e., in the image-displaying raster (i,j) and/or on the wavelength filter array (p,q), are also formed with dimensions which change by pairs. For example, a determined wavelength filter element $\alpha_{pq}$ at the edge can be wider than a wavelength filter element $\beta_{pq}$ in the center of the array.

Further—in case the wavelength filter array is arranged in front of the image-displaying raster of image elements $\alpha_{ij}$ in the viewing direction—the wavelength filter array can be corrected in width (and, if need be, in height) by a correction factor f which is formed as follows:

$$f = \frac{d_a}{z + d_a},$$

where $d_a$ and z are defined as in F3. The correction factor f which is formed according to f=1/f is used when the wavelength filter array is arranged behind the image-displaying raster of image elements $\alpha_{ij}$ in the viewing direction.

In another preferred construction, either the color LC display for displaying image elements $\alpha_{ij}$ or a color LC display serving as wavelength filter array is provided with a flat illumination source which essentially emits white light and whose surface area dimensions approximately correspond to the dimensions of the respective color LC display. The color LC display and flat illumination source are connected with one another or positioned relative to one another in such a way that the light proceeding from the illumination source is radiated through the subpixels R,G,B and R',G',B' of the display and, in so doing, is filtered corresponding to the fundamental wavelengths R,G,B.

By means of this arrangement, light is advantageously emitted from each subpixel R,G,B with essentially the same intensity in the direction of the associated subpixels R',G',B', and vice versa.

In another special development, the flat illumination source is changeable with respect to its light intensity, so that it is possible to vary the intensity when an object is being displayed three-dimensionally and accordingly to adapt it individually to the observer in order to optimize three-dimensional perception.

In a concrete embodiment of the invention, the constructional unit comprising the illumination source and the first array (i.e., LC display or filter array) located in front of it in the viewing direction can be formed by an electroluminescent display, an electron beam tube, a plasma display, a laser beam-illuminated display, an LED display, a field emission display, or a polymer-based display device. For example, a Pioneer PDP-501 MX or Philips SFTV1.5-E, Model 42PW9982/12, plasma display can be used. Large displays for stadium displays, rear projection displays or the like are also possible.

In certain cases, it is also advantageous when a magnifying or reducing lens, preferably a Fresnel lens, is arranged in front of the above-described arrangement according to the invention with respect to the viewing direction. This results in a real or virtual imaging of the arrangement for three-dimensional display for the observer.

In a very special case of application of the invention described above, it is possible to display different image contents (e.g., television programs) simultaneously on the same image screen (e.g., of a television set) and to assign to each of these image contents a separate propagation direction from which it is possible to observe only this image content when viewing the screen substantially without being influenced by the other image contents.

For example, a first image content is shown in the first four views $A_1$ to $A_4$ which can be four adjacent perspective views. A second image content is then contained in a further four views $A_5$ to $A_8$. When a correspondingly generated combination image is shown with the arrangement according to the invention, the first image content can be perceived three-dimensionally from one observation location and second image contents can be perceived three-dimensionally from a second observation location. Of course, in special cases, views $A_1$ to $A_4$ and views $A_5$ to $A_8$ can be identical to one another, so that the two image contents can be perceived from different directions, but two-dimensionally.

It is known from the prior art to demodulate the signals of a plurality of, but at least two, television transmitters in a circuit arrangement of one and the same device, for example, by using corresponding satellite receivers. The two different image contents mentioned above can be obtained from these two television signals, so that, depending on the observation position, one image content or the other can be viewed over the entire surface of the image screen. Accordingly, it is possible for a number of persons to watch different television programs simultaneously on a television set. The accompanying sound can be heard, e.g., via headphones or can be sent via separate boxes to the observation locations.

The invention is also directed to an arrangement for selective three-dimensional or two-dimensional display of a scene/object, which arrangement is outfitted with means for changing the transmission characteristics of the wavelength filter elements $\beta_{pq}$. The wavelength filter elements $\beta_{pq}$ can transmit selectively for the purpose of 3D display according to the above-described rule for generating a mask image for a predetermined transparency wavelength/transparency wavelength region $\lambda_b$, or can be controlled for purposes of a 2D display so as to be as transparent as possible, i.e., so as to transmit as much visible light as possible.

In a concrete use of a color LC display as a wavelength filter array, this means that all RGB subpixels are controlled so as to be optimally transparent on the image portion to be used as 2D display, wherein a quasi-white illumination portion is formed which ensures an unimpaired two-dimensional impression.

In the first case, the control circuit is advantageously constructed in such a way that either only a selection of the wavelength filter elements $\beta_{pq}$ or the wavelength filter elements $\beta_{pq}$ in their entirety is/are switchable with respect to their transmission characteristics, so that the entire display of the scene/object can be selectively changed from three-dimensional to two-dimensional display or only selected display regions can be changed from three-dimensional to two-dimensional display.

This ability to change from three-dimensional display to two-dimensional display, and vice versa, can advantageously be achieved with a construction of the arrangement according to the invention which comprises an image reproducing device comprising a plurality of image elements $\alpha_{ij}$ representing information from a plurality of views of the scene/object in a predetermined correlation, wherein light is radiated from the individual image elements $\alpha_{ij}$ in different wavelength regions, a filter arrangement which is arranged in front of or behind the image reproducing device in the viewing direction of an observer with a filter array of a plurality of filter elements comprising linear polarization filter elements as well as wavelength filter elements $\beta_{pq}$ which transmit in determined wavelength regions, with a linear polarization filter and with a controllable optical medium which is arranged between the filter array and the linear polarization filter and which, depending on its control, causes a rotation of the polarization direction of linearly polarized light passing through, wherein the filter elements are arranged in such a way that propagation directions which are defined for the light radiated by the image reproducing device are predetermined in a first state of the optical medium in which the polarization direction caused by the optical medium and the polarization direction of the subsequent filter, i.e., the linear polarization filter elements of the filter array or of the linear polarization filter, intersect, so that predominantly information of a first selection or of a first group of views can be perceived at a plurality of first observation locations and predominantly information of a second selection or of a second group of views can be perceived at a plurality of second observation locations, each of which is located roughly at interpupillary distance or eye distance from an associated first observation location, wherein a plurality of groups of views are possible, and in a second state of the optical medium in which the polarization direction caused by the optical medium and the polarization direction of the subsequent filter, i.e., of the linear polarization filter elements of the filter array or of the linear polarization filter, essentially run parallel to one another, the filter arrangement has increased transparency compared with the first state.

For purposes of switching between 3D operation and 2D operation, the optical medium need only be actuated so as to cause a rotation of the polarization direction.

For presetting the defined propagation directions in the three-dimensional operating mode (3D operation), the optical medium assumes a state such that the areas of the linear polarization elements are extensively canceled due to the intersecting polarization directions as the result of a predetermined control relative to the filter following in the direction of the passage of light, which filter is formed, depending on the arrangement, either by the linear polarization filter elements of the filter array or by the linear polarization filter. This produces an extensive structuring of the light passing through the filter arrangement.

This structuring can be canceled by an actuation of the optical medium in that the latter is changed to a state in which the polarization direction caused by the optical medium extends substantially parallel to the subsequent filter, i.e., there is only a slight weakening, if any, of the light intensity through the filter arrangement. The linear polarization elements which are opaque in three-dimensional operating mode in cooperation with the optical medium and linear polarization filter are accordingly translucent in two-dimensional operating mode. A substantially homogeneous passage of light through the filter arrangement is achieved by means of a suitable arrangement of these linear polarization elements. In this way, images generated by the image reproducing device can be perceived in the resolution of their reproduction.

The controllable optical medium preferably comprises liquid crystals for rotating the polarization direction, resulting in a particularly simple and economical solution. For example, LC panels, which are known per se, but which are without polarization filters, can be used for this purpose. Further, rotatable linear polarization filters or piezoelectric elements can be used. Optical media based on the Pockels effect, the Kerr effect or the Faraday effect can also be used as optical media for polarization rotation.

A structure of the filter array which can be produced in a particularly favorable manner results when all linear polarization filter elements have the same polarization direction. In addition, the construction of the optical medium remains simple and the low expenditure on switching is maintained.

The structure of the wavelength filter array and/or the optical medium can also be selected in such a way that switching is carried out in principle only on certain parts of the arrangement. This can be advantageous when a determined image component, for example, should always be perceived two-dimensionally or three-dimensionally.

The filter arrangement is advantageously arranged in front of the image reproducing device in the viewing direction of the observer. The image reproducing device may also be followed by a flat illumination source radiating white light. The observer accordingly sees the light emitted by, or passing through, the image reproducing device, for example, a color LC display, through the filter arrangement. However, it is likewise possible to arrange the filter arrangement between the illumination source and the image reproducing device or color LC display. The color LC display and the filter arrangement can be advantageously combined to form a constructional unit. The distance z between the latter is on the order of 1 mm to 10 mm and is determined as a function of the raster that is used for the image elements and the filter elements, the average interpupillary distance of a normalized observer, and a desired observation distance.

The possibility of changing from three-dimensional display to two-dimensional display, and vice versa, can be advantageously achieved also by the further construction of the arrangement according to the invention which is described in the following. This arrangement comprises an image reproducing device having a plurality of image elements $\alpha_{ij}$ which represent information from a plurality of views of the scene/object in predetermined correlation, wherein light is radiated from the individual image elements $\alpha_{ij}$ in different wavelength regions, a filter arrangement which is arranged on the image reproducing device in the viewing direction of an observer with a filter array comprising a plurality of wavelength filter elements $\beta_{pq}$ which transmit in determined wavelength regions, and with a diffusion screen which is arranged behind the image reproducing device and in front of the filter array in the viewing direction and which is switchable between a transparent position and a scattering or diffusing position, wherein the wavelength filter elements $\beta_{pq}$ are arranged in such a way that propagation directions which are defined for the light radiated by the image reproducing device are predetermined in the transparent position of the diffusion screen, so that predominantly information of a first group of views can be perceived at a first observation location and predominantly information of a second group of views can be perceived at a second observation location, wherein a plurality of such locations with different groups of this kind exist, and the structuring of the light passing through the filter array is substantially reduced in the diffusing position of the diffusion screen relative to the first position.

For purposes of switching between 3D operation and 2D operation, it is only necessary to actuate the diffusion screen. The defined propagation directions in the three-dimensional operating mode are predetermined in the transparent state of the diffusion screen via the filter array. The above-mentioned extensive structuring of the light passing through the filter arrangement can be brought about in this way. This structuring of the light can be canceled again by actuation of an optical medium, i.e., in this case by means of the diffusion screen, in that the latter is switched so as to be translucent in a scattering manner. A substantially homogeneous passage of light through the filter arrangement is achieved in this way, so that images generated by the image reproducing device can be perceived in the resolution of their reproduction. Diffusion screens of this kind which are electronically controllable are known per se and therefore require no further explanation for the person skilled in the art.

The structure of the wavelength filter array and the structure of the diffusion screen can also be selected in such a way that switching is carried out in principle only on certain parts of the arrangement. This can be advantageous, for example, when a determined image component should always be perceived two-dimensionally or three-dimensionally.

The wavelength filter arrangement is advantageously constructed as a passive filter, i.e., a filter not requiring any electrical energy. The wavelength filter array can be produced, for example, as a thin-walled plate or sheet in which the desired structure of wavelength filter elements $\beta_{pq}$ is permanently impressed. The use of filter arrays of this type allows considerable cost savings compared with color LC displays. In addition, Moiré effects resulting from the use of two identical color LC displays are prevented. It is preferable to use filter arrays whose individual wavelength filter elements $\beta_{pq}$ each have a polygonal, preferably rectangular, contour.

In this construction, as well as in other constructions of the invention, the wavelength filter arrays preferably comprise exclusively wavelength filter elements $\beta_{pq}$ which are transparent or opaque in one of the three color regions red, green or blue or in the entire spectrum of visible light. In this way, the legibility of displayed text can be substantially improved over known black-and-white barriers because of the greater sum light transmission. This can also be achieved with wavelength filter arrays which comprise exclusively wavelength filter elements $\beta_{pq}$ which are transparent or opaque in two of the color regions red, green or blue or in the entire spectrum of visible light. Further, some of the wavelength filter elements $\beta_{pq}$ can also be formed as combined wavelength- and linear polarization filters or as pure linear polarization filters.

The linear polarization elements of the filter array which may be provided between the wavelength filter elements $\beta_{pq}$ act as opaque or transparent filter elements, depending on the control of the optical medium.

However, the positive aspect of simplified apparatus described above can also be achieved with a filter array in which filter elements of the type mentioned above which are either opaque or transparent in the entire spectrum of visible light are provided exclusively.

It is also advantageous in this case that a color LC display with separately controllable subpixels is provided as an image reproducing device, wherein a subpixel corresponds to an image element $\alpha_{ij}$. In 3D operation, a selective perception of these image elements $\alpha_{ij}$ is brought about at the image reproducing device by the filter arrangement.

From each observation position, an observer perceives predominantly image elements $\alpha_{ij}$ of a first selection from views $A_k$ (k=1 ... n) with one eye and predominantly image elements $\alpha_{ij}$ of a second selection from views $A_k$ (k=1 ... n) with the other eye to the extent that the correlation of partial information of views $A_k$ (k=1 ... n) to image elements $\alpha_{ij}$ and the positioning of these image elements $\alpha_{ij}$ on the raster are carried out, as was already described, according to function (F 1), and the structuring of the wavelength filter elements $\beta_{pq}$ to form a mask image is carried out—in a manner analogous to the combination of the partial information of the various views $A_k$ (k=1 ... n) to form a total image—according to rule (F2).

With respect to the ability to change from three-dimensional display to two-dimensional display, and vice versa, the arrangement according to the invention in a further development can comprise, in addition to an image reproducing device, described above:

a filter arrangement with at least two static filter arrays which are arranged in parallel one behind the other, which filter arrangement is arranged at a distance z in front of or following the image reproducing device considered in the viewing direction of an observer, wherein each filter array has a plurality of filter elements $\beta_{pq}$ which pass light in determined wavelength regions and/or determined polarization directions, an arrangement for displacing at least one of the filter arrays at right angles to the viewing direction from a first position relative to the second filter array into a second position relative to the second filter array, wherein the individual filter elements $\beta_{pq}$ are arranged on the filter arrays in such a way that, in the first position, the filter arrangement predetermines propagation directions for the light emitted by the image reproducing device such that predominantly information of a first group of views is perceptible at a first observation location and predominantly information of a second group of views is perceptible at a second observation location at eye distance from the first observation location, and wherein there exists a plurality of such locations with different groups, and the filter arrangement has an increased transparency in the second position compared with the first position.

The filter elements $\beta_{pq}$ can also be constructed as passive filter elements and/or as passive linear polarization filter elements. The filter elements are preferably constructed as passive filter elements.

In order to switch between 3D operation and 2D operation, it is merely necessary to actuate the displacement device by which the preferably two filter arrays are displaced relative to one another. Further, all expenditure for the control of the individual filter elements $\beta_{pq}$ can be dispensed with by using two static filter arrays. This results in a considerable simplification of the control expenditure on the arrangement.

A piezo-adjusting device is preferably used as a mechanical displacement device. This piezo-adjusting device allows a very exact offset of the filter array by the very small longitudinal spacing of the filter elements $\beta_{pq}$, so that the filter arrays can be aligned exactly relative to one another by their raster arrangement when switching between the two positions of the filter arrangement. With the piezo-adjusting device, a parallel offset of the filter array in the order of magnitude of 100 µm can be retained precisely. In an alternative constructional variant, a stepper motor is used instead of a piezo-adjusting device.

The filter arrays can also be constructed as passive filters, i.e., filters not requiring any electrical energy, and can be produced as thin-walled plates or sheets in which the desired structure of the filter elements $\beta_{pq}$ is permanently impressed.

However, the effect of simplified apparatus described above can also be achieved with a filter arrangement comprising a plurality of filter arrays which comprise exclusively filter elements $\beta_{pq}$ which are opaque or transparent in the entire spectrum of visible light.

In an advantageous construction of the invention, a color LC display with separately controllable subpixels is provided as image reproducing device, wherein a subpixel corresponds to an image element.

In 3D operation, a selective perception of the image elements $\alpha_{ij}$ is caused at the image reproducing device by the filter arrangement as was already described above; in this case, an image element $\alpha_{ij}$ also corresponds to a self-luminous or illuminated surface with a surface content of about 10,000 µm² to several mm², on which a small section of one of the views $A_k$ (k=1 . . . n) can be reproduced at location i,j.

For some applications, a desirable operating mode for autostereoscopic display is one in which only selected sections of the displayed scene or object can be perceived three-dimensionally, while the rest is perceptible two-dimensionally. Moreover, it is also often desirable to be able to vary two-dimensionally or three-dimensionally reproduced portions locally within the total display.

In this connection, a further development of the invention provides means for switching between a plurality of different operating modes in which the illumination light reaches the observer either, for purposes of two-dimensional display, exclusively only through the image elements of the image reproducing device, but not through filter elements of the wavelength filter array, or, for purposes of three-dimensional display, through at least a portion of the filter elements of the wavelength filter array and subsequently through an associated portion of the image elements $\alpha_{ij}$.

With this arrangement, the scene or object can be displayed selectively for the observer so as to enable two-dimensional perception in whole or three-dimensional perception in whole. However, in contrast to this, it is also possible to display only one or more image sections three-dimensionally and to display the rest of the image two-dimensionally, namely, when one operating mode is selected in which the illumination light reaches the observer through the filter elements of the wavelength filter array and subsequently also through the associated image elements of the image reproducing device only in partial areas corresponding to the three-dimensionally displayed image sections.

A first flat illumination source and, behind the wavelength filter array in the viewing direction of the observer, a second flat illumination source are provided between the image reproducing device and the wavelength filter array, for example, as means for switching between the different operating modes, both flat illumination sources being coupled with separately controllable on/off switches.

In this way, it is achieved in a simple manner, depending on the control of the on/off switch, that only the first flat illumination source is switched on in a first operating mode for two-dimensional display and illumination light reaches the observer only through the image reproducing device but not through the wavelength filter array, and in a second operating mode for three-dimensional display only the second flat illumination source is switched on and illumination light always reaches the observer through the wavelength filter array and the image reproducing device.

The scene or object can be perceived by the observer two-dimensionally in whole when the first operating mode is selected and can be perceived three-dimensionally in whole when the second operating mode is selected.

In another development in this respect, a raster comprising a plurality of individually controllable shutter elements is associated with the wavelength filter array and, depending on the quantity of controlled shutter elements, the path of the illumination light generated by the second flat illumination source is interrupted or opened through a larger or smaller quantity of filter elements.

Three operating modes can be realized in this way in connection with the on/off switch mentioned above. Accordingly, the entire image can be perceived two-dimensionally in a first operating mode in which only the first flat illumination source is switched on and illumination light reaches the observer only through the image reproducing device, but not through the wavelength filter array.

In a second operating mode, only the second flat illumination source is switched on and the illumination light always reaches the observer through the wavelength filter array and the image reproducing device, so that the entire image can be perceived three-dimensionally as long as the shutter elements are open.

In a third operating mode, both flat illumination sources are switched on and a predetermined quantity of shutter elements are controlled in such a way that the illumination light in areas of the controlled (open) shutter elements reaches the observer through the filter elements as well as through the associated image elements and, consequently, with a predetermined propagation direction, while the illumination light in areas of the shutter elements which are not controlled (not open) reaches the observer only through the image reproducing device, but not through associated filter elements and consequently not with a predetermined propagation direction. Accordingly, the scene/object can be perceived two-dimensionally when viewing the areas of the shutter elements that are not controlled, but can be perceived three-dimensionally when viewing the areas of the controlled shutter elements. In this connection, it can be provided in a special construction that one or both flat illumination sources can be coupled to dimmers, so that the emitted brightness can be regulated and adjusted in such a way that the brightness of the first flat illumination source is less than that of the second flat illumination source, preferably approximately by a factor of three.

In this connection, the first flat illumination source preferably comprises a plate-shaped light guide which is limited by two large surfaces which are located opposite one another, a first large surface facing the image reproducing device and the second large surface facing the wavelength filter array, and by circumferentially extending narrow surfaces. This light guide is supplied by at least one light source whose radiation is coupled into the light guide through one or more of the narrow surfaces. Within the light guide, the radiation is reflected back and forth partly due to total reflection at the two large surfaces and is emitted partly as useful light via the first large surface. In this way, large-surface flat illumination sources can be produced for large-surface image reproducing devices.

In a flat illumination source constructed in this manner, the second large surface of the light guide can advantageously be provided with a coating which frustrates or interferes with the total reflection and whose interference capacity over the extent of the second large surface is inhomogeneous between two limiting values, wherein the limiting values are dependent upon the density d of the coating and the density d is a measure of the average distance between particles per area unit.

In this way, the light density distribution can be influenced in an economical and simple manner and a desired light density distribution can be produced over the radiating large surface. The operation upon which this is based can be explained as follows:

With every reflection at the first large surface within the light guide, only a portion of the radiation is reflected into the light guide again due to total reflection, while a remaining portion exits continuously through the first large surface as useful light. The coating according to the invention which is applied to the oppositely located second large surface interferes with the total reflection in that by influencing the exit angle at the second large surface it changes the reflection behavior in such a way that more light impinges at an angle on the radiating large surface at which the total reflection can no longer take place and a larger amount of light can accordingly exit as useful light.

The light guide is a transparent body which is made, for example, from glass or PMMA and is accordingly a medium that is denser than the surrounding air. It is known that wherever the cladding of a light guide comes into close contact with adjacent materials or objects, the total reflection is disrupted, resulting in scattered rays. This is undesirable in light guide technique on principle. However, this effect is made use of in the present construction of the invention to interfere with the total reflection at the second large surface of the plate-shaped light guide in a defined manner, specifically, such that the interference capacity is more or less pronounced in different areas of the large surface, as will be shown in the following.

The differentiated interference capacity in different areas of the second large surface can be predetermined in such a way, for example, that the interference capacity of the coating is increasingly strong as the distance x from a narrow surface increases. In this connection, the interference capacity can be progressively increased in parallel to stripe-shaped surface portions oriented to this narrow surface.

Accordingly, a coating can be applied in a first surface portion near the narrow surface in which the average distance between particles per area unit is large and the interference of total reflection is thus relatively small. In the next surface portion which is oriented parallel to the latter and which starts, for example, at a distance $x_1$ from the narrow surface, the average distance between particles per area unit is less than in the first surface portion and the interference of total reflection is accordingly more pronounced. In a third surface portion starting at distance $x_2$ from the respective narrow surface, the average distance between particles per area unit is again smaller, i.e., there are more particles per area unit, which results in that the total reflection in this area is interfered with to an even greater extent. This continues accordingly over the entire second large surface, wherein the surface portion at the greatest distance from the respective narrow surface has the greatest density of particles per area unit and the interference capacity is accordingly also most pronounced at that location.

Therefore, while the total reflection has the least interference near the narrow surface into which the light is radiated, a sufficiently large proportion of the light is coupled out through the radiating large surface because of the greater light intensity still present at that location. However, as the distance from the narrow surface and the density of particles in the coating increase, the total reflection is interfered with a progressively increasing extent, so that a proportion of light of approximately equal magnitude to that near the narrow surface is effectively coupled out in each of the areas of the radiating large surface that are located opposite these surface portions, in spite of the light intensity which is already low at these locations.

In this way, a virtually homogeneously luminous large surface can be achieved which has a measurable luminous density per area unit at least three-times that of comparable flat illumination sources known from the prior art. This is noticeable particularly in large-surface light guides, which is advantageous for large-image display.

An even greater increase in brightness is made possible in another constructional variant in which the interference capacity of the coating becomes increasingly strong as the distances $x_1$ and $x_2$ increase proceeding from two narrow surfaces into which light is coupled. These two narrow surfaces can extend in parallel opposite one another at the light guide. In this case, the coating can also be formed such that the interference capacity increases progressively in stripe-shaped portions which are oriented parallel to one another and to the narrow surfaces, namely, up to a maximum located approximately in the center of the longitudinal dimension of the second large surface.

A lacquer is preferably applied to the outside of the second large surface as a coating. This provides simple possibilities for applying the coating which are already proven techniques and provide a coating which is sufficient for many applications. The local lacquer density is equivalent to the interference capacity at this location. The lacquer density can be defined according to the function $d=f(x)$, where x is a measure for the distance from the narrow surface into which the light is coupled, while d corresponds to a density value. In this case, for example, $d=1$ for a completely lacquered area and $d=0$ for an area of the second large surface that is not lacquered.

In an advantageous construction, the density function can be given by $$d=f(x)a_3 \cdot x^3 + a_2 \cdot x^2 + a_1 \cdot x + a_0,$$

where the parameters $a_0$, $a_1$, $a_2$ and $a_3$ are selectable. For example, the parameters $a_0=0$, $a_1=4$, $a_2=-4$ and $a_3=0$ have proven successful.

This arrangement of the invention is not necessarily limited only to polynomials of the third degree; in individual cases of application, it may also be useful to aim for a density function in the form of a polynomial of a degree higher than the third degree.

In another possible construction, the density d is predetermined not only as a function of the distance x from the narrow surface into which the light is coupled, but also as a function of the y-coordinate extending vertical to it. In this case, for example, the lacquer density is defined according to the function $d=f(x,y)$, wherein, as was already described, x is a measure for the distance from the narrow surface into which the light is coupled, but y is a measure for a position vertical to this distance. The density of the coating can accordingly be predetermined for every location x, y on the second large surface and the amount of light exiting through the radiating large surface in an oppositely located area can be influenced.

The density function d=f(x,y) can be useful particularly when a definite luminous density profile is to be generated over the radiating large surface. For example, with the function d=1 for [0.4<x <0.6 and 0.4<y<0.6], or d=0, a particularly bright spot can be achieved roughly in the center of the radiating large surface when the values x or y are also scaled, i.e., when, for instance, $x_{min}=y_{min}=0, x_{max}=y_{max}=1$. In this way, very high luminous densities can be achieved in this central spot.

The application of lacquer to the outside of the second large surface can be carried out by means of a conventional printing process, e.g., silk screening, by generating an image that corresponds to the density function and includes the entire second large surface, wherein d=1 again in this case for a completely lacquered area unit and d=0 for an area unit not provided with lacquer. This image can be generated based on a gradation curve, if required.

In a modified construction, the entire second large surface can be lacquered homogeneously from the outside, i.e., provided with a coating of uniform density. In this case, a particularly large amount of light is coupled out through the radiating large surface; however, inhomogeneities occur since the intensity is greater near the radiating light source.

In another construction of this kind, it is provided that the coating is formed of a plurality of particles with higher interference capacity and particles with a lower interference capacity in predetermined quantitative proportions, wherein the particles with higher interference capacity predominate in surface regions in which the total reflection is to be interfered more extensively and the particles with lower interference capacity predominate in surface regions in which the total reflection is to be interfered less extensively. In a very advantageous manner, dull silver particles can be used as particles with a higher interference capacity and glossy silver particles can be used as particles with a lower interference capacity.

Further, partial areas of the coating can be left out and the second large surface has the highest possible light transmission in these partial areas. In special cases, these partial areas can be arranged in regular, freely selectable patterns.

In a preferable arrangement in a further development, a translucent image reproducing device (e.g., a color LC display) is followed in the viewing direction of an observer by a wavelength filter array and a light source. In this case, the wavelength filter array is provided on its side facing the image reproducing device with reflecting or scattering surface elements and there is at least one light source whose radiation is directed only to the side of the wavelength filter array remote of the observer in the first operating mode, and is directed only to the side of the wavelength filter array with the reflecting or scattering surface elements in the second operating mode, and is directed only to selected areas of the side of the wavelength filter array remote of the observer in the third operating mode.

In this case, also, a three-dimensional display is generated in the first operating mode since the illumination light reaches the observer through the wavelength filter array as well as through the image reproducing device. When a combination image of a plurality of perspective views of the scene/object is displayed on the image-displaying raster of the image reproducing device, the three-dimensional impression for the observer occurs for the reasons mentioned above, namely, because only associated image information from the perspective views is visible for each of the observer's eyes, influenced by the positions of the filter elements relative to the positions of associated image elements or by the propagation directions of the light that are determined in this way.

In the second operating mode, on the other hand, the illumination light does not pass through the filter elements and subsequently through the image elements, but impinges on the side of the wavelength filter array facing the observer on the reflecting or scattering surface elements and is consequently reflected or scattered from this side of the wavelength filter array in the direction of the image reproducing device, passes through the translucent image elements and reaches both eyes of the observer. Therefore, a selection of direction or assignment of image information to the right or left eye of the observer does not take place, so that, as a result, the display of the scene/object is perceived by the observer two-dimensionally rather than three-dimensionally.

In this way, it is possible to generate, over a whole surface, a two-dimensional display or a three-dimensional display of the scene/object in a relatively simple manner.

When a raster of individually controllable shutter elements is arranged in a manner analogous to the arrangement already described above, wherein the shutter elements correspond at least approximately to the size of the filter element or image element, the illumination light directed onto the surface elements can also be blocked out in certain sections by controlling predetermined shutter elements.

In this construction, in a third operating mode in which a quantity of shutter elements in an area of the image surface is not controlled (not opened), an image section corresponding to this surface region is perceived two-dimensionally by the observer.

On the other hand, the light passes through the rest of the controlled (opened) shutter elements and then through the wavelength filter array and also through the image reproducing device, wherein the image sections corresponding to these surface portions are perceived three-dimensionally by the observer.

In this way, it is also possible in this case to generate a display of the scene/object which is two-dimensional or three-dimensional in certain sections of the image simultaneously with relatively simple means.

The illumination light can proceed from two independent light sources, wherein the radiation of one of the first two light sources is directed exclusively to the side remote of the observer and the radiation of the second light source is directed only to the side of the wavelength filter array which faces the observer and which is provided with surface elements.

In order for the illumination light to be directed to the wavelength filter array or to the image reproducing device in the indicated manner, a controllable on/off switch can be associated with each of the two light sources. The control of the on/off switch and shutter elements, which can be parts of an LC shutter, can be carried out by PC and corresponding software which predetermines the switching states for the desired operating modes.

It is also conceivable to provide only one light source instead of the two separately switchable light sources and to arrange swivelably mounted reflectors by which the radiation proceeding from this light source is directed only to the side of the wavelength filter array remote of the observer in a first swiveling position, only to the side of the wavelength filter array with the reflecting or scattering surface elements in a second swiveling position, and by which the radiation proceeding from this light source is directed to the side of the wavelength filter array remote of the observer as well as to the side of the wavelength filter array with the reflecting or scattering surface elements in a third swiveling position. The three operating modes mentioned above can be realized in this way and in connection with controllable shutters which are positioned in the beam path between the light source and the reflectors.

The wavelength filter array is preferably constructed as a static filter and the reflecting and scattering surface elements are exclusively positioned on the opaque surface regions of the static filter.

In order to enable a simple construction especially for large-format image screens, for example, plasma image screens with 50-inch image diagonals, the invention can be constructed in such a way that the filter arrays are formed of neutral filters for wavelength-independent attenuation of the light intensity, wherein a determined transmission factor is given for every filter. Transmission factors of 0%, 25%, 50%, 75% and 100% are preferably used, so that the legibility of displayed text is also considerably improved in this case compared with known black-and-white barriers due to the greater light transmission in sum.

Moreover, some of the filters can also be constructed as combined neutral filter elements and wavelength filter elements, i.e., with wavelength-dependent transmission factors. In concrete terms, this means that the corresponding filters with transmission characteristics of the kind mentioned above can only pass light of determined transparency wavelength regions and simultaneously also attenuate their intensity.

In this connection, the term "transmission characteristics" is assumed to include all possible properties of the filters employed herein. Accordingly, every filter has a very definite transmission characteristic $\lambda_b$. As was already explained, this may be, in particular, a wavelength-independent attenuation of the light intensity with a determined transmission factor or a wavelength-dependent (optimal) transparency or a combination of the two, i.e., a wavelength-dependent attenuation of the light intensity combined with a determined wavelength-dependent transmission factor.

Optionally, it is also possible to use wavelength filter elements $\beta_{pq}$ which transmit light of determined wavelength regions. These wavelength filter elements $\beta_{pq}$ are preferably transparent in one of the three color regions red, green or blue. For example, wavelength filter elements $\beta_{pq}$ which are transparent in two of the color ranges of red, green or blue can also be used. The optionally used wavelength filter elements $\beta_{pq}$ have transparency wavelengths/transparency wavelength regions which preferably correspond to the wavelength or wavelength region $\lambda_a$ of the light radiated by the corresponding image elements $\alpha_{ij}$.

In order to circumvent the use of expensive screens or disks in the arrangement according to the invention which are electrically conductive and at the same time optically transparent, such as those used in plasma screens, a filter array is used which is located in front of a flat screen and in which at least every tenth filter element is electrically conductive. Sufficient total conductivity is accordingly achieved.

A printable paint which is also electrically conductive (e.g., SPI Conductive Carbon Paint, produced by Structure Probe, Inc., USA), for example, can be used to generate the filter structure. In particular, metal particles which are applied to an adhesive surface can also be considered for forming opaque filter elements of the filter array. It is also possible for the material forming the filter structure to be combined with a carrier material as a photographic film or plate having corresponding electrically conductive characteristics.

The carrier material for the filter array can be a transparent plastic (e.g., PMMA), glass or a transparent foil. The carrier material is located either only on one side of the material or on both sides of the material forming the filter structure. This results in a kind of sandwich comprising a first layer of carrier material, the filter array, and a second layer of carrier material. The carrier material with the filter array is preferably fitted into the frame of the flat screen.

All of the electrically conductive filter elements on the filter array can advantageously be connected with one another so as to be electrically conducting. Further, all electrically conductive filter elements can be connected with at least one electrode by which the filter array can be incorporated in an electric circuit.

A first process for producing a filter array in which at least every tenth filter element is electrically conductive comprises, for example, the following method steps: preparing a silk-screening mask using an electrically conductive paint, wherein at least every tenth filter element which is predetermined as not transparent is produced by means of this conductive paint; silk-screening of the filter structure on a transparent carrier material, e.g., PMMA or glass and, if necessary, repetition of the above-mentioned method steps.

A second method for producing a filter array in which at least every tenth filter element is electrically conductive comprises, for example, the following method steps: preparing a printing mask using metal particles, e.g., silver particles, wherein at least every tenth filter element which is predetermined as not transparent is formed by means of said particles; coating a transparent carrier material, e.g., PMMA or glass, with a transparent glue (e.g., Acrifix 192 glue, produced by Röhm GmbH, Darmstadt, Germany); printing the filter structure on the carrier material and, if necessary, exposure, e.g., Uv exposure, for curing the glue.

There are other possible methods for forming a filter array with the characteristics mentioned above. It is essential that the material for forming at least every tenth filter element is electrically conductive. All non-transparent filter elements are preferably electrically conductive.

It also lies within the framework of the invention to provide additional outfitting with an arrangement for detecting the eye position of one of a group of selected observers, an arrangement for displacing the filter array vertical to the viewing direction of this observer, and a computation device which actuates the displacing device depending on the determined eye position of the observer. In this way, the respective observer sees almost exclusively the middle views of the views $A_k$ (k=1 . . . n) because of the position of the filter array which is permanently adapted to the eye position of the observer.

Various arrangement such as those described, among others, in WO 96/18925, can be used to detect the eye position of a selected observer (tracking). In a simple construction, a swivelable camera with a computation device is sufficient; the computation device evaluates the signal supplied by the camera in that, e.g., the eyes are searched as white surfaces with dark points corresponding to the pupils. It is also possible to mark the selected observer, preferably between the eyes, with a specially colored point or another technically detectable feature. With larger screens (e.g., plasma displays with 50-inch screen diagonals), the selected observer can be made distinguishable in a simple manner in that the observer is stationed in a determined observation area, for example, the available tracking volume of the tracking arrangement.

In order to displace the filter array, a device is provided which comprises at least one rail and at least one linear motor which is preferably constructed as a stepper motor. The displacement of the filter array is preferably effected in horizontal direction in relation to the (customary) viewing direction of an observer, but a vertical displacement is also conceivable. However, it is also possible to carry out the displacement by means of piezo-actuators.

In a special construction, a test image is presented to the selected observer beforehand in order to calibrate the system. This can be useful with respect to the physical size of the observer, since different views are presented at observation positions which differ vertically but are identical horizontally in front of the screen.

BRIEF DESCRIPTION OF THE DRAWINGS

The invention will be explained more fully in the following with reference to embodiment examples. In the accompanying drawings:

FIG. 3 shows an example of a total image from the partial information of views $A_k$ (k=1 . . . n) which is generated by the subpixels RGB of the first color LC display which are used as image elements $\alpha_{ij}$ in a highly magnified view, not true to scale;

FIG. 5 shows the positions of the partial information from views $A_k$ (k=1 . . . 8) which are reproduced in the total image according to FIG. 3 by red subpixels R;

FIG. 16 shows an example of the structure of a filter array with linear polarization elements and wavelength filter elements $\beta_{pq}$ in a highly magnified view, not true to scale;

FIG. 21 shows a second wavelength filter array composed of a plurality of basic elements according to FIG. 19;

FIG. 22 shows a summary wavelength filter array generated by superimposing the wavelength filter arrays shown in FIGS. 20 and 21;

FIG. 23 shows another summary wavelength filter array resulting from the summary wavelength filter array according to FIG. 22 after displacement of the two superimposed wavelength filter arrays from FIGS. 20 and 21 by three raster positions;

FIG. 28 shows an arrangement of one of the flat illumination sources in FIG. 27 as a flat light guide with a light source;

FIG. 29 shows an example for a possible structuring of the density d of the coating in the flat illumination source according to FIG. 28 in a greatly magnified view;

FIG. 30 shows an example for outfitting the flat illumination source according to FIG. 28 with another light source for coupling light into the light guide;

FIG. 31 shows an example for a possible structuring of the density d of the coating in the flat illumination source according to FIG. 30 in a greatly magnified view;

FIG. 39 shows an example for the structure of the filter elements $\beta_{pq}$ in a highly magnified view, not true to scale, in which exclusively neutral filters are used;

FIG. 40 shows another example of the structure of the wavelength filter elements $\beta_{pq}$ in a greatly magnified view, not true to scale, using neutral filter elements and wavelength filter elements;

FIG. 41 shows another example of a total image comprising the partial information from views $A_k$ (k=1 . . . n; n=40) generated by the subpixels RGB of the color LC display which are used as image elements $\alpha_{ij}$, in a greatly magnified view, not true to scale;

FIG. 42 shows another example of the structure of the filter elements $\beta_{pq}$ in a highly magnified view, not true to scale, in which neutral filters are used exclusively, highly suitable for three-dimensional display of a combination image according to FIG. 41;

FIG. 43 shows another embodiment example of a combination image which takes into account n=40 views;

FIG. 46 shows an embodiment example of a filter array with transparent-opaque filters and color wavelength filter elements $\beta_{pq}$ in which the wavelength filter elements $\beta_{pq}$ have about a fifth of the width of the associated image elements $\alpha_{ij}$; matching a combination image according to FIG. 43;

FIG. 47 shows another example of a combination image;

FIG. 48 shows another example of a wavelength filter array which is highly suitable for a three-dimensional display with a combination image according to FIG. 47;

DETAILED DESCRIPTION OF THE DRAWINGS

Embodiment example for describing the basic principle, according to the invention, of the 3D display:

The embodiment example which serves in the following initially to describe the basic principle of the invention provides a currently commercially available color LC display, for example, Sanyo LMU-TK 12A, for reproducing the combination of partial information from views $A_k$ (k=1 . . . n) on image elements $\alpha_{ij}$ as well as for generating the mask image by means of wavelength filter elements $\beta_{pq}$. In this way, the arrangement according to the invention can be achieved in a simple and economical manner. However, this does not exclude any other possible construction for image reproduction or wavelength filtering insofar as it satisfies the basic conditions of the invention.

Figure 1:
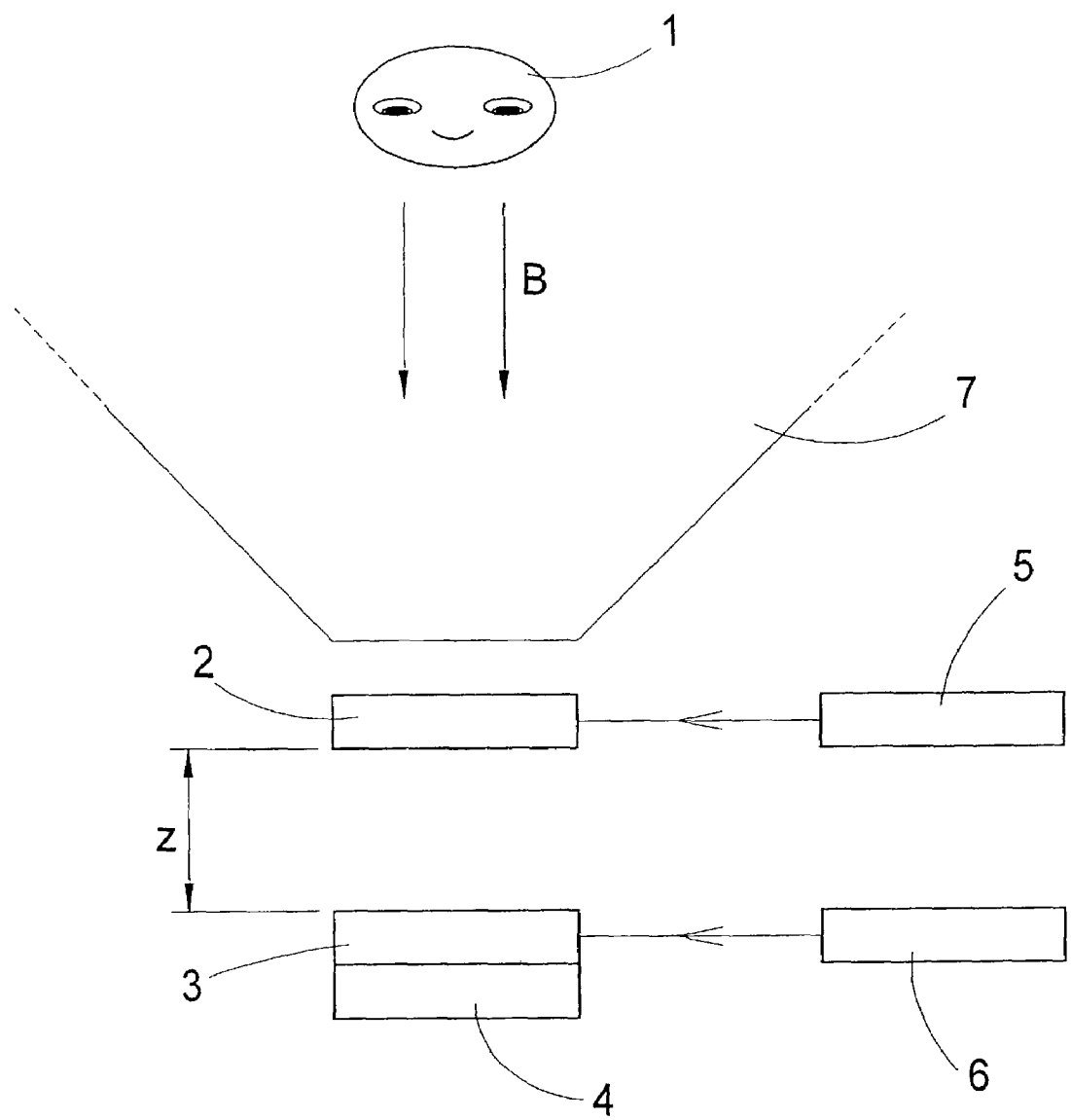
FIG. 1 shows a constructional variant in which a first color LC display, as image-displaying raster, is arranged first, with a second color LC display arranged behind it at a predetermined distance z in the viewing direction of the observer as wavelength filter array.

FIG. 1 shows a variant from the different possibilities for the arrangement of image-displaying rasters of image elements $\alpha_{ij}$, the array of wavelength filter elements $\beta_{pq}$ and flat illumination source in which, in the viewing direction B of an observer 1, a color LC display 2 is arranged first as image-displaying raster, followed at a predetermined distance z by a color LC display 3 as wavelength filter array. The color LC display 3 is connected with a flat illumination source 4 to form a constructional unit.

Further, the image-reproducing color LC display 2 is connected with a control circuit 5 and the wavelength-selecting color LC display 3 is connected with a control circuit 6. Each of the two color LC displays 2, 3 has separately controllable subpixels of primary colors red (R), green (G) and blue (B). For better distinguishing between them, the subpixels of color LC display 2 are designated by R,G,B and the subpixels of color LC display 3 corresponding to the respective transparency wavelengths/transparency wavelength regions $\lambda_b$ are designated by R',G',B' in the following.

The control circuit 5 is constructed in such a way that partial information from views $A_k$ (k=1 . . . n) can be generated on the individual subpixels R,G,B, as described above.

The control circuit 6 is designed in such a way that the individual subpixels R',G',B' for the respective fundamental wavelength red, green and blue can be switched with a transparency between 0% and 100%. The transparency with 0% would correspond to an opaque wavelength filter element $\beta_{pq}$.

In this case, the distance z between color LC display 2 and color LC display 3 is 3.8 mm, wherein the subpixels R',G',B' of color LC display 3 correspond to subpixels R,G,B of color LC display 2 in such a way that the thus determined propagation directions of the light exiting the subpixels R',G',B' and passing through subpixels R,G,B meet in a plurality of intersection points within an observation space 7 containing one or more observers 1. These intersection points of the propagation directions correspond to observation positions from which the scene/object can be perceived three-dimensionally by a pair of eyes.

The distance z for the construction variant examples according to FIG. 1 was calculated as follows:

$$\frac{z}{s_p} = \frac{d_a}{p_d}, \quad (F3)$$

wherein it is assumed for $s_p$ that the average horizontal distance between subpixels R',G',B' on the color LC display 3 which is arranged downstream in the viewing direction is 100 µm. The average interpupillary distance $p_d$ was set at 65 mm. The average observation distance $d_a$ was selected at 2.5 m. This gives a distance z of 3.8 mm.

Figure 8:
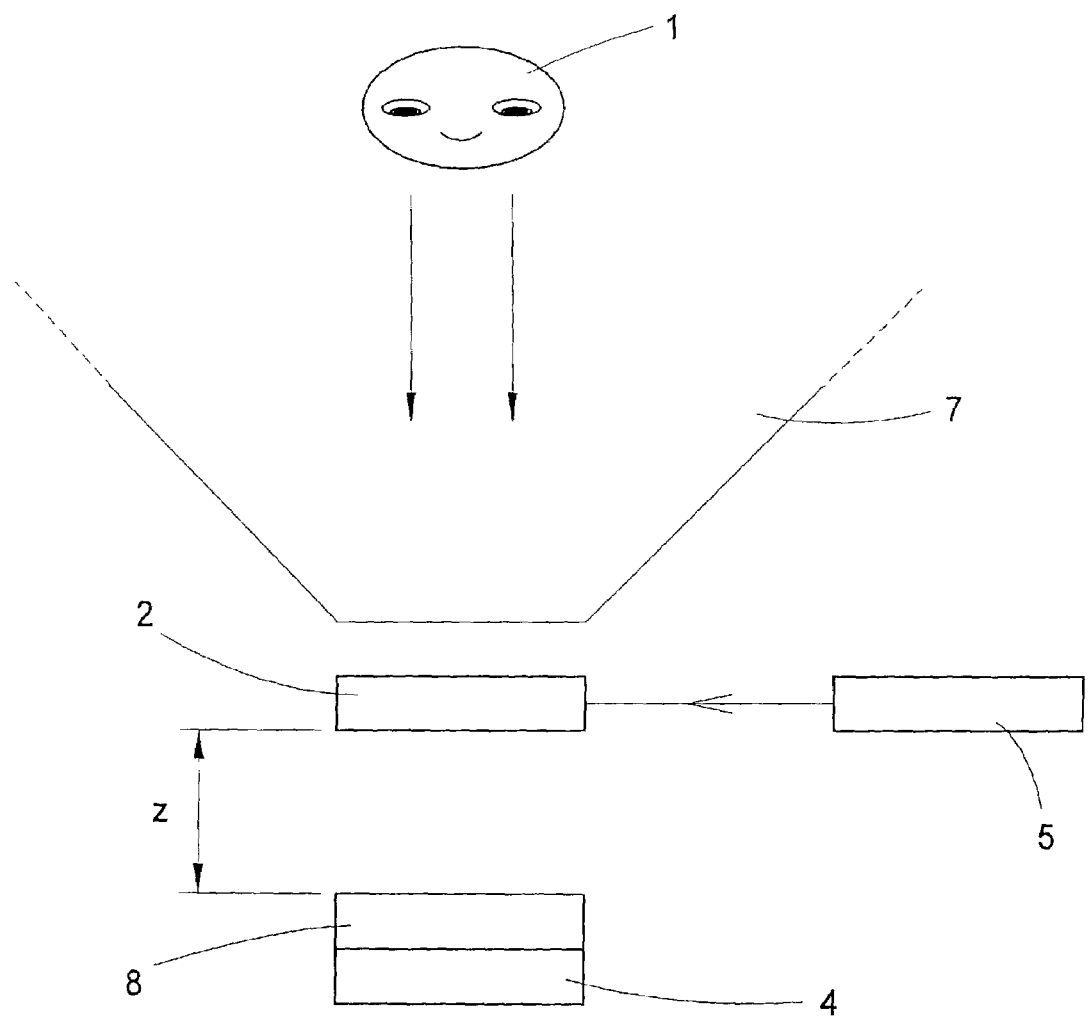
FIG. 8 shows a construction differing from the constructional variant according to FIG. 1 in which an array of wavelength filter elements $\beta_{pq}$ of fixedly predetermined transparency wavelengths/transparency wavelength regions $\lambda_b$ is provided instead of the second color LC display.
Figure 10:
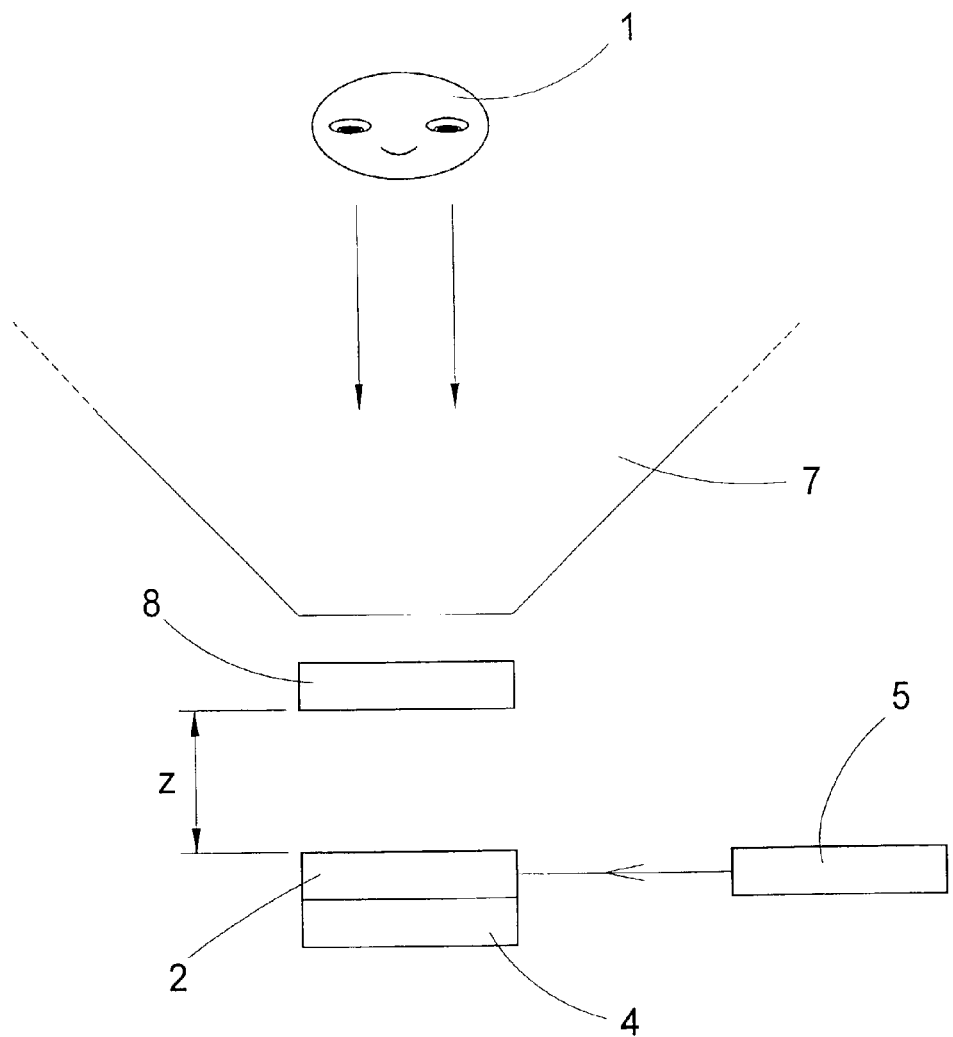
FIG. 10 shows another construction differing from the constructional variant according to FIG. 1 in which an array of wavelength filter elements $\beta_{pq}$ with fixedly predetermined transparency wavelengths/transparency wavelength regions $\lambda_b$ is positioned first in the viewing direction of the observer and is followed at a distance z by the image-displaying color LC display.

The array with wavelength filter elements $\beta_{pq}$ is constructed so as to be as thin as possible insofar as the array is arranged in front of the raster of image elements $\alpha_{ij}$ in the viewing direction of the observer. Conversely, insofar as the raster of image elements $\alpha_{ij}$ is arranged in front, this raster should be as thin as possible. Therefore, the distance z between the surfaces of the array or raster which face one another is shown in FIG. 1, FIG. 8 and FIG. 10 and does not include the thickness of the constructional group arranged in front. Printed foils or thin color LC displays, for example, can be considered as constructional groups of this kind which are as thin as possible.

The propagation directions are predetermined by the surface centers of the visible portions of the respective subpixels R',G',B' and R,G,B, wherein the beam paths propagate not only in a plane, but rather so as to be repeatedly spatially distributed.

Figure 2:
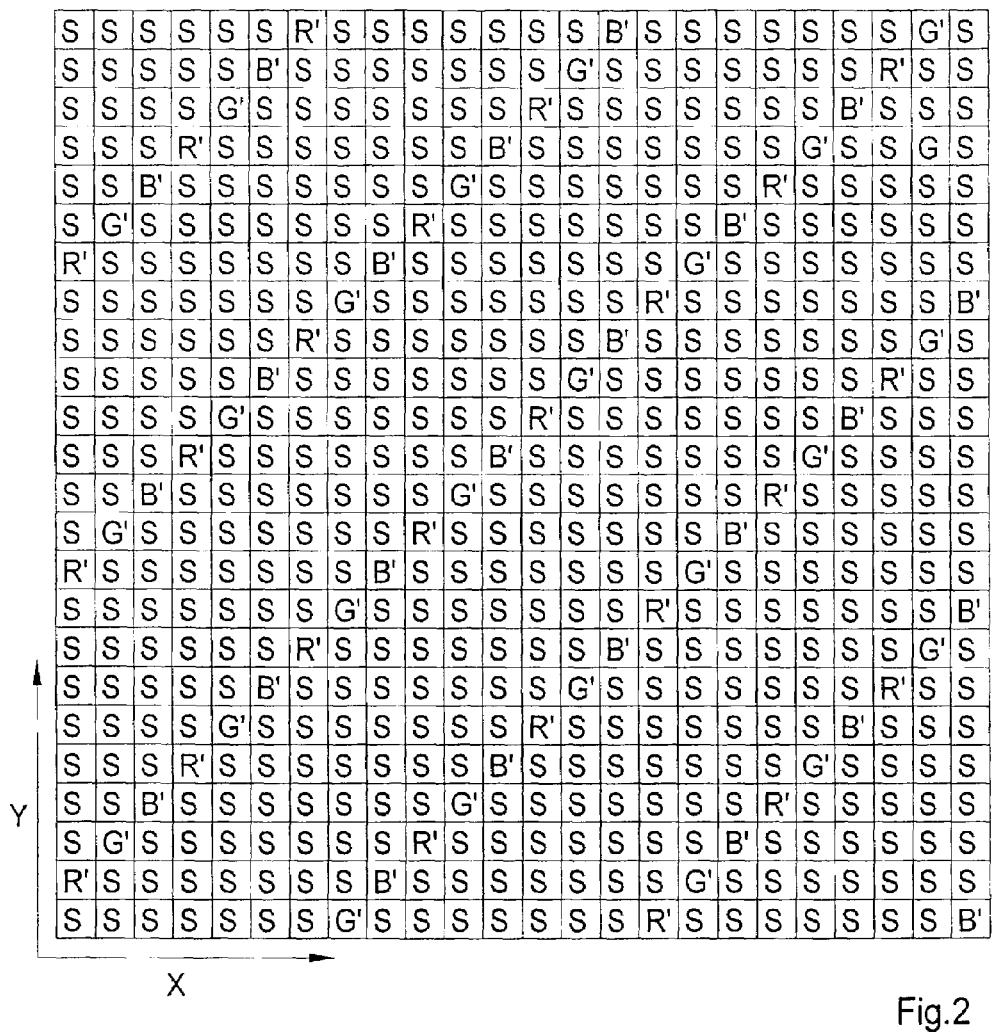
FIG. 2 is a highly magnified view, not true to scale, showing an example of a mask image generated by the subpixels R',G',B' of the second color LC display which are used as wavelength filters $\beta_{pq}$.

FIG. 2 shows an example of a mask image with reference to individual subpixels R',G',B' of the color LC display 3 in a top view of the display surface which is greatly magnified, but not true to scale, for the sake of clarity. Each partial surface shown in the drawing corresponds to a subpixel which passes light of the respective primary color red (R'), green (G') and blue (B') when controlled for transparency. The subpixels that are controlled so as to be opaque are designated by S. The partial surfaces are shown in simplified manner as squares; the exact shape of the subpixels R',G',B' is deliberately not shown.

When three transparency wavelengths/transparency wavelength regions $\lambda_1$, $\lambda_2$, $\lambda_3$ are given for R,G,B and another transparency wavelength/transparency wavelength region $\lambda_4$ is given by which the visible light can be completely blocked off, for example, in order to generate a mask image with $b_{max}=4$, a mask image which is well-suited for three-dimensional display of an object/scene based on n=8 views $A_k$ (k=1 . . . n) is given by using the coefficient matrix $d_{pq}$ which can be generated by the following formula $$d_{pq} = \frac{p-1-(p \bmod 3)}{q}\delta((p+q)\bmod 8) + \left(\frac{p-4}{q}\right)\delta[\delta((p+q)\bmod 8)]. \quad (F4)$$

The flat illumination source 4 is located behind the array shown in FIG. 2, that is, in this case, below the drawing plane of FIG. 2. When the illumination source 4 is switched on, light of the respective primary colors red, green and blue proceeds from the individual subpixels R',G',B'. The subpixels designated by S remain dark.

FIG. 3 shows—also not true to scale—an example of the combination of partial information of different views $A_k$ (k=1 . . . 8) in a top view of the raster of the color LC display 2 which has been generated according to the following function which was already described:

$$k = i - c_{ij} \cdot j - n \cdot IntegerPart\left[\frac{i - c_{ij} \cdot j - 1}{n}\right], \quad (F1)$$

where $c_{ij}=-1=$const. and n=8.

Here again, every square partial surface corresponds to a subpixel R,G,B. The numbers 1 . . . 8=k indicated inside the square partial surfaces indicate the respective view $A_k$ (k=1 . . . n) to which the partial information indicated on a subpixel or image element $\alpha_{ij}$ belongs. Accordingly, partial information indicated on a subpixel designated by k=1 belongs to $A_1$, partial information indicated on a subpixel designated by k=2 belongs to $A_2$, and so on. Accordingly, in the selected embodiment example, eight views $A_1$ to $A_8$, preferably perspective views, are provided for three-dimensional display.

The "black-matrix" which is often incorporated in color LC displays for technical reasons is not shown for the sake of clarity.

Assuming that the raster shown in FIG. 3 is arranged in front of the array shown in FIG. 2 with respect to the viewing direction, as is shown in FIG. 8, the light (FIG. 2) coming from a subpixel R' of the primary color red is directed through all corresponding subpixels R of the raster (FIG. 3) into the observation space 7 (which is located above the drawing plane) and carries along with it the partial information which is shown on subpixels R and corresponds to the partial information of views $A_k$ (k=1 . . . n).

It will be explained in detail with reference to FIGS. 4 to 7, based on an arrangement shown in FIG. 10, how the three-dimensional impression is brought about.

Figure 4:
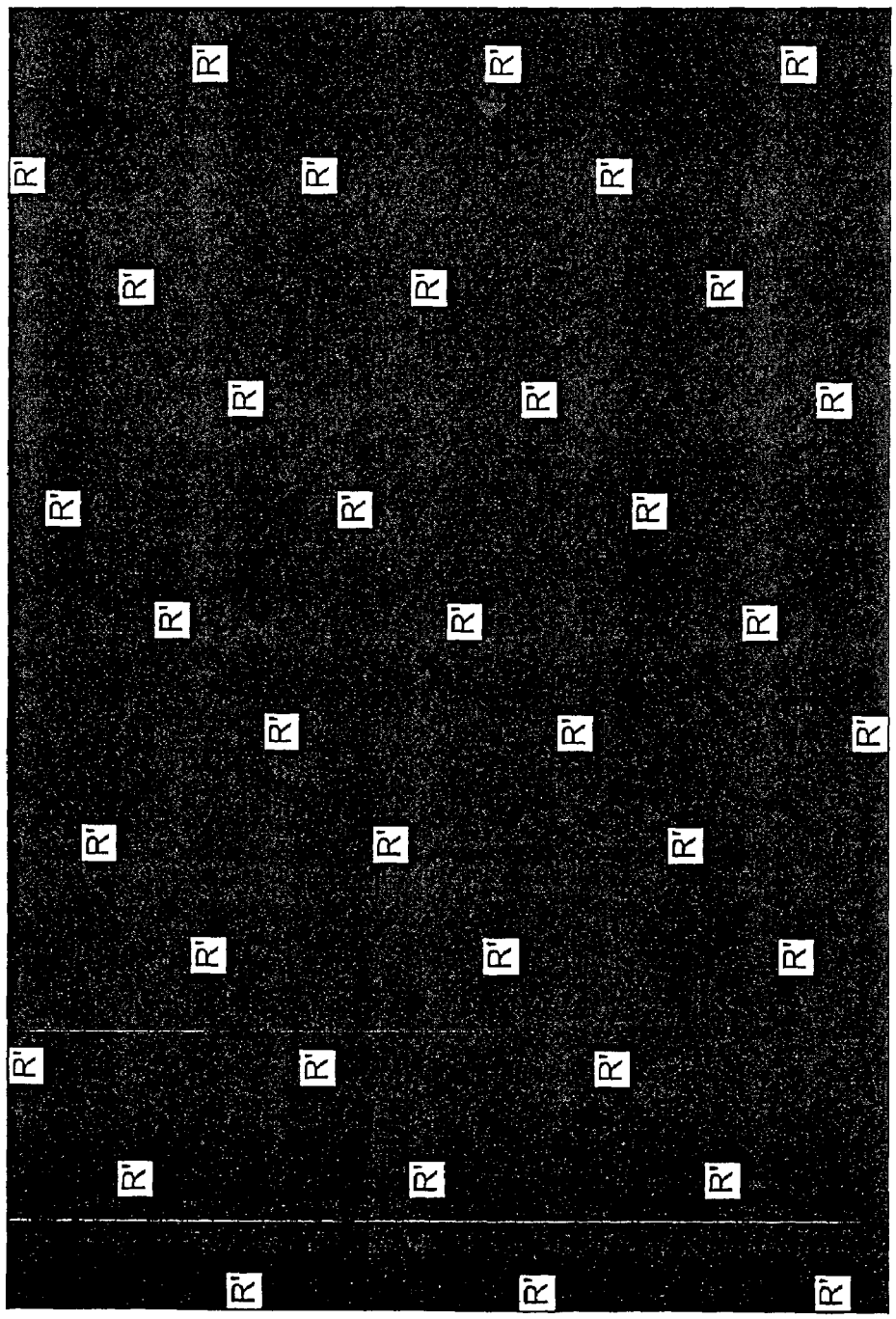
FIG. 4 shows the structure of a mask image according to FIG. 2 which is formed exclusively of red subpixels R'.
Figure 5:
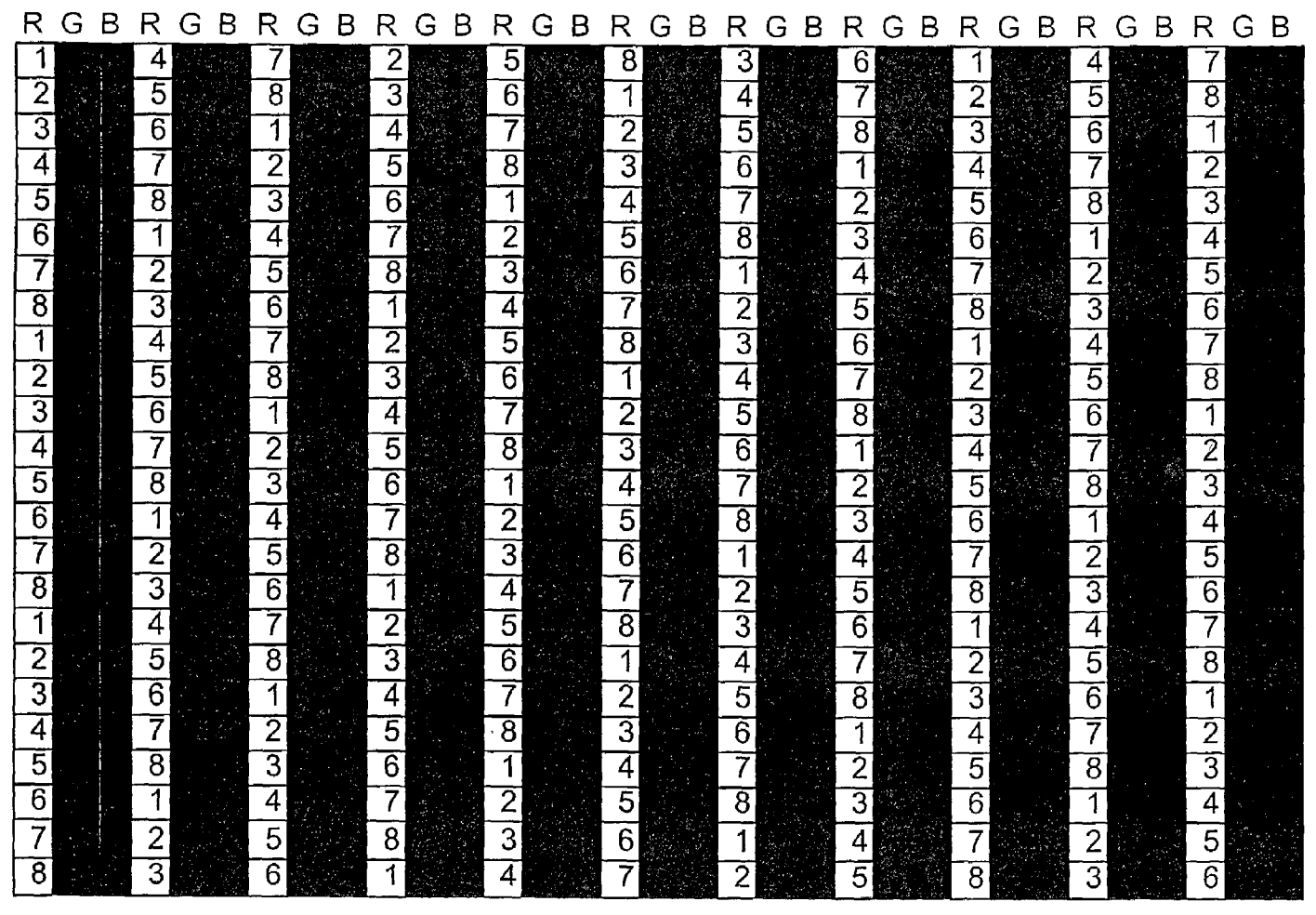

For the sake of simplicity, exclusively red image elements $\alpha_{ij}$ or red wavelength filters $\beta_{pq}$ will be considered. This means that only the red wavelength filters $\beta_{pq}$ from FIG. 2 are shown in FIG. 4; consequently, FIG. 4 shows the structure of a mask image with wavelength filter elements R'. In a corresponding manner, FIG. 5 shows only the red image elements $\alpha_{ij}$ from FIG. 3. The numbers entered in the columns in the view in FIG. 5 correspond to the continuous numbers k of the views $A_k$ (k=1 . . . 8) from which the partial information to be shown on this image element $\alpha_{ij}$ or subpixel R is to be taken in order to generate a combination image from views $A_k$ (k=1 . . . 8). This explanation, which is given by way of example, can be transferred to blue and green in equivalent manner.

The views in FIGS. 4 and 5 are not true to scale and the mask image is shown in a somewhat enlarged view. This is intended to reflect the fact that, e.g., when using a mask image according to FIG. 2 in which the wavelength filter elements $\beta_{pq}$ actually have the same dimensions as the image elements $\alpha_{ij}$ in FIG. 3, the mask image appears somewhat bigger to an observer than the raster with image elements $\alpha_{ij}$ because of the closer position in the viewing direction.

When this slightly enlarged mask image according to FIG. 4 is placed—in an imaginary sense—directly on the combination image according to FIG. 5, image elements $\alpha_{ij}$ or portions thereof which are visible for different eye positions can be detected.

Figure 6:
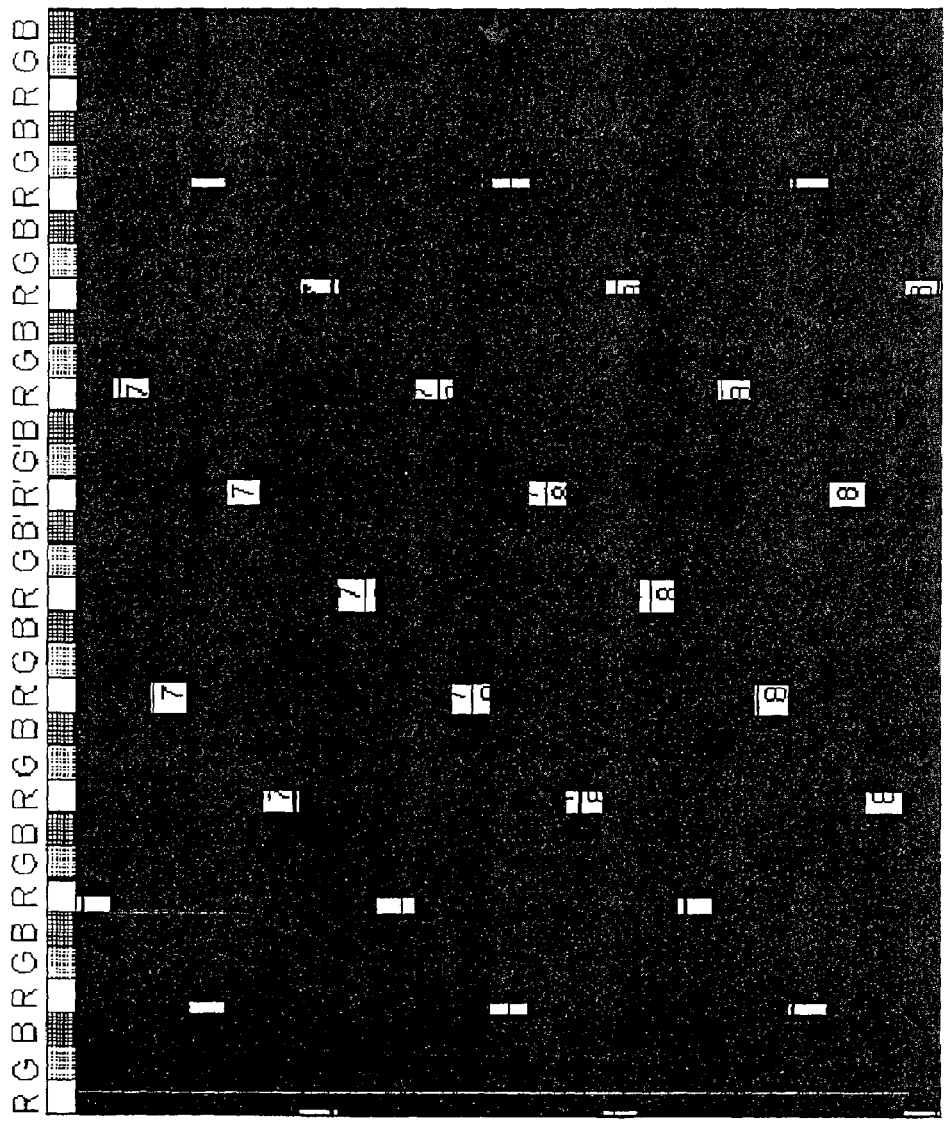
FIG. 6 shows the visible partial information, or parts thereof, for one eye of an observer viewed from one of the observation positions through the image mask from FIG. 4.
Figure 7:
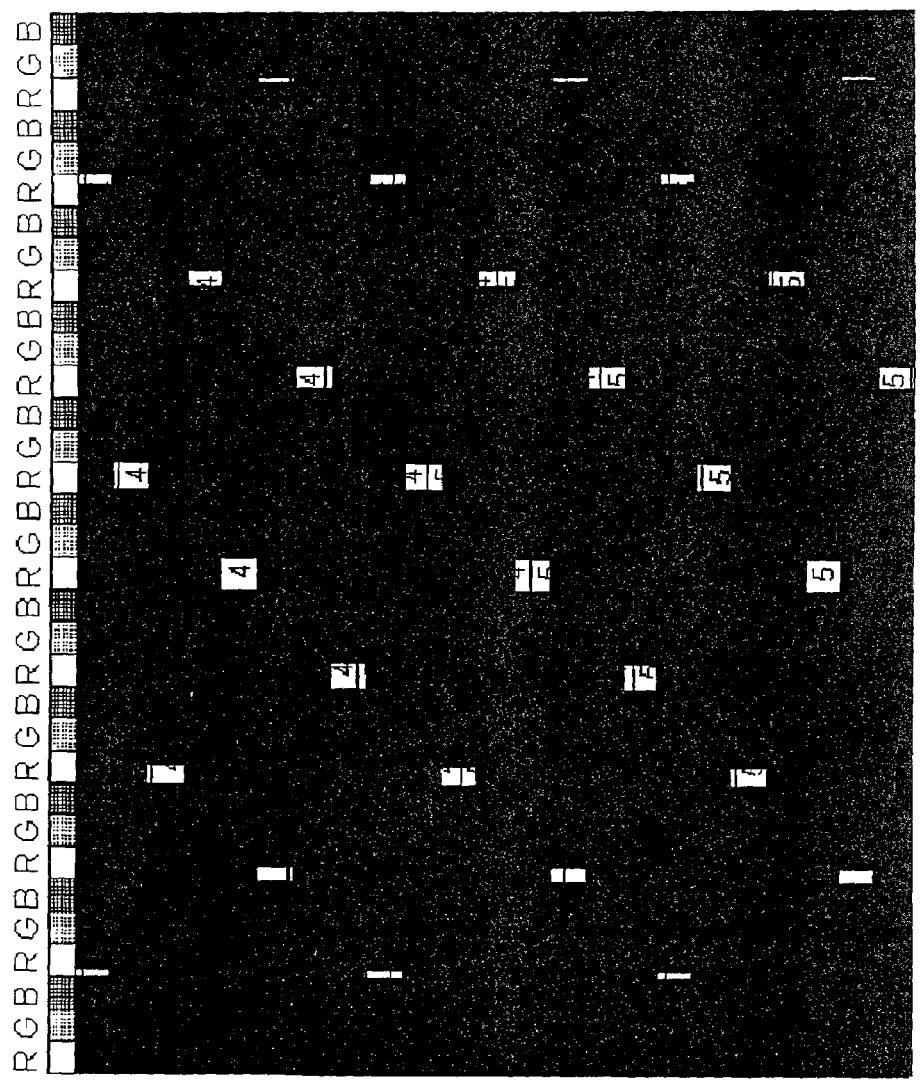
FIG. 7 shows the visible partial information, or parts thereof, for the other eye of an observer viewed from one of the observation positions through the image mask from FIG. 4.

This is shown—not true to scale—by way of example in FIGS. 6 and 7 for two mask images imagined for different eye positions. It will be seen that chiefly image elements $\alpha_{ij}$ (or components thereof) of views $A_7$ and $A_8$ can be perceived, e.g., from the eye position associated with FIG. 6. According to FIG. 7, on the other hand, chiefly image elements $\alpha_{ij}$ (or parts thereof) from views $A_4$ and $A_5$ are visible from the position of the other eye of the same observer.

This is intended only to clarify the basic principle of the method according to the invention. Three-dimensional perception results from the multiplicity resulting from the surface area-type arrangement of image elements $\alpha_{ij}$: both eyes see image elements $\alpha_{ij}$ and partial information of predominantly different views $A_k$ (k=1 . . . n) from the observation position, wherein the proportion of partial information perceptible for each eye is essential for three-dimensional perception.

There are other possible constructional variants of the invention which diverge from the basic configuration according to FIG. 1. For example, as is shown in FIG. 8, a wavelength filter array 8 having wavelength filter elements $\beta_{pq}$ which are arranged in a structure similar to that of the color LC display 3, but which are not changeable, for example, with respect to their wavelength selectivity, can be provided instead of the color LC display 3 (in FIG. 1). The selectivity according to the primary colors red, green or blue or opaque or other transparency wavelength/transparency wavelength region $\lambda_b$ is assigned in an unchangeable manner to each of these wavelength filter elements $\beta_{pq}$, so that the control circuit is also superfluous in this case.

Figure 9:
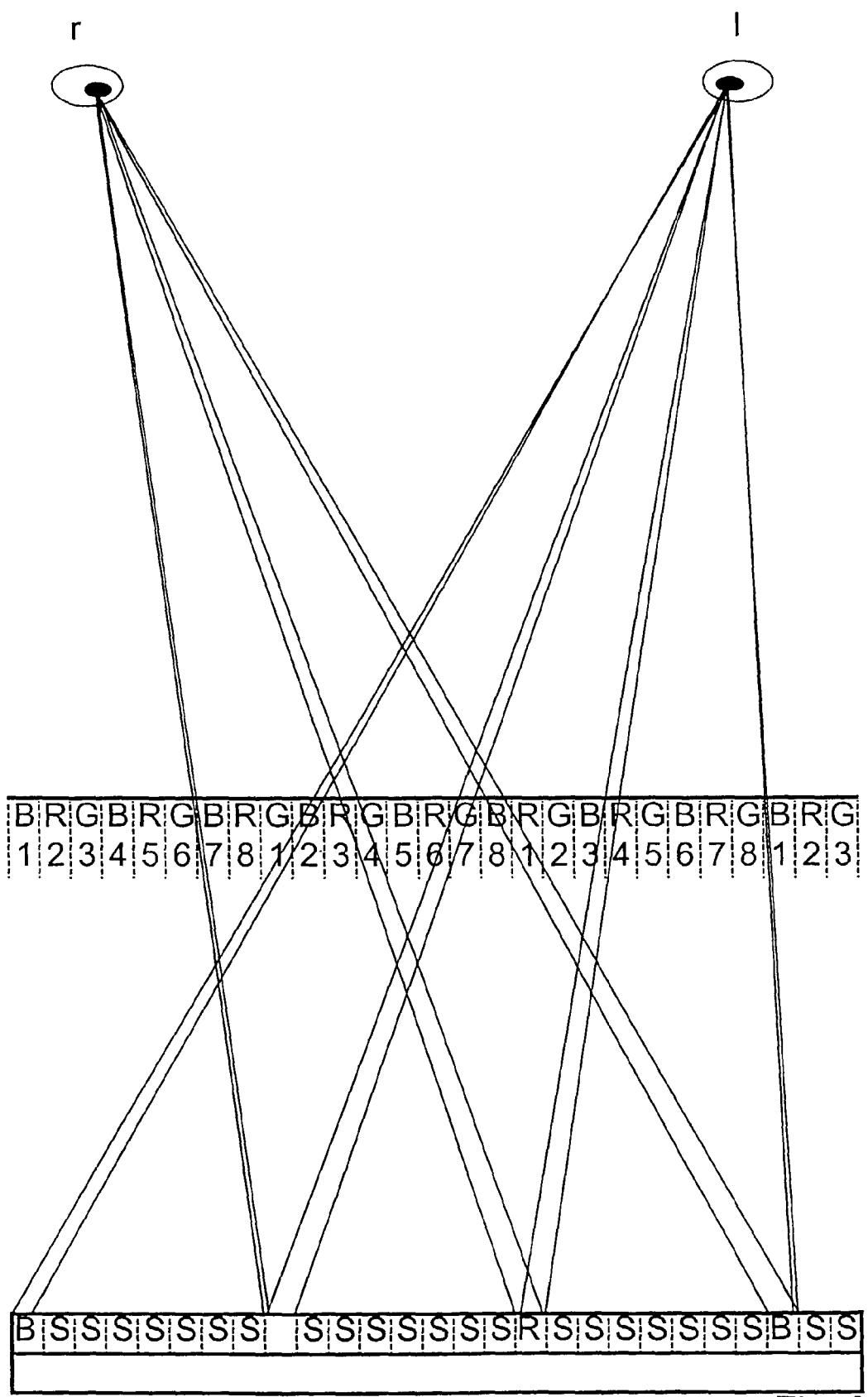
FIG. 9 shows a section through an arrangement shown in FIG. 8 with the conditions according to FIG. 2 and FIG. 3.

FIG. 9 shows a section (not true to scale) through an arrangement of the type mentioned above, shown in FIG. 8, based on the conditions given in FIGS. 1 to 3. This view is also not true to scale, but can nevertheless be used for purposes of illustration. In FIG. 9, for example, the right eye r sees about half of an image element $\alpha_{ij}$ with partial information from views $A_3$ (in this case R) and $A_8$ (in this case B) and a very small portion of an image element $\alpha_{ij}$ with partial information from view $A_6$ (in this case G). The left eye, on the other hand, perceives about half of an image element $\alpha_{ij}$ with partial information from views $A_4$ (in this case R) and $A_7$ (in this case G) and a very small portion of an image element $\alpha_{ij}$ with partial information from views $A_1$ and $A_2$ (in this case B).

In another constructional variant which differs from FIGS. 1 and 8, FIG. 10 shows the wavelength filter array 8 positioned first in the viewing direction from the position of the observer 1, followed at a distance z by the image-displaying color LC display 2, wherein this color LC display 2 is connected with the flat illumination 4 to form a constructional unit. Basically the same effect is achieved in this way, namely, the propagation directions of the light coming from the subpixels R,G,B of the color LC display 2 through the corresponding wavelength elements R',G',B' of the wavelength filter array 8 intersect in the observation space 7 in a plurality of observation positions from which the shown object is perceptible three-dimensionally.

It is noted once again that the object of the invention is not limited to the arrangements shown herein; rather, the invention extends to all arrangements in which the propagation directions are determined through a wavelength-selective structure which is generated according to the formula indicated above in connection with a—preferably color—raster of image elements $\alpha_{ij}$.

In the following, for example, with reference to the arrangement shown in FIG. 1, based on the combination image from FIG. 3 and the mask image from FIG. 2, it will be explained how the reduction or prevention of Moiré effects is brought about as an essential advantage of the invention. It is assumed to be known that Moiré fringes occur when periodic patterns are superimposed in the direction extending at right angles to the angle-bisecting line of the enclosed angle from two predominant directions of the different patterns mentioned above.

In the case of a commercially available color LC display, the subpixels are arranged in columns, wherein exactly every third column contains exclusively red subpixels. Consequently, since commercially available color LC displays are used in the selected embodiment example for reproducing views $A_k$ (k=1 . . . n) as well as for generating the mask image, a direction to be considered for determining the angle-bisecting line is always the vertical line. The second direction results when a selected red subpixel is connected on the mask image with another red subpixel by a straight line. (Reference points are always the lower left corners of the subpixels).

Figure 11:
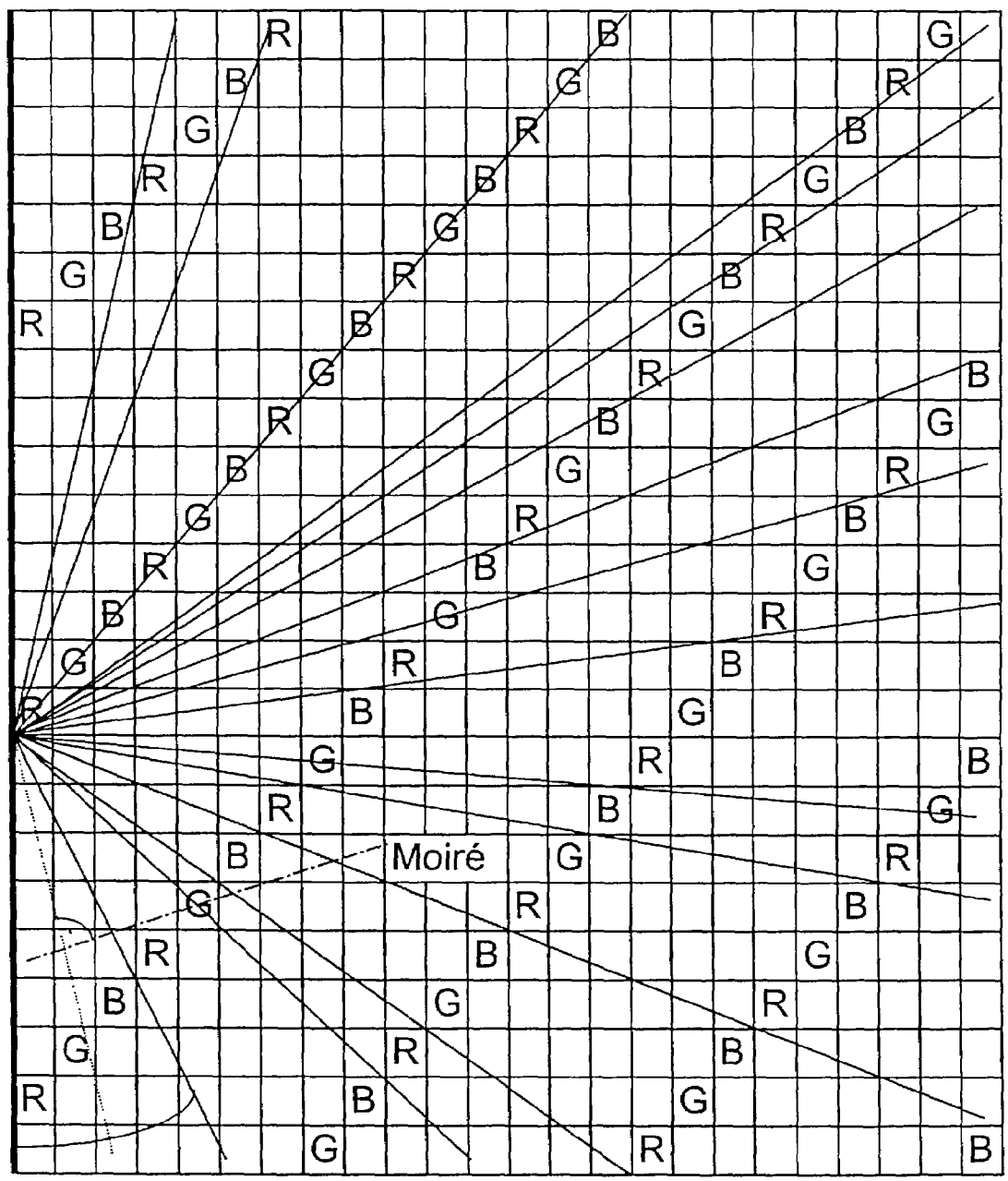
FIG. 11 shows an example of the occurrence of the Moiré effect.

In FIG. 11, this is shown by way of example for a straight line of this type. The resulting angle-bisecting line is shown by a dashed line, while the mean perpendicular or central normal on the angle-bisecting line indicates the propagation direction of the associated Moiré fringe. For all other connecting straight lines or directions of two red wavelength filter elements $\beta_{pq}$ of the mask image which are shown in FIG. 11 the corresponding propagation directions for the Moiré fringes can accordingly be determined analogously. Beyond this, there are many other relevant directions which cannot be seen here because of the sectional view of the mask image.

Whether or not the Moiré fringes are perceptible is directly related to the spatial frequency of the red wavelength filter elements $\beta_{pq}$ on the connecting straight lines. The shorter the distance between the red wavelength filter elements $\beta_{pq}$ on the straight line, i.e., the greater the spatial frequency of the red wavelength filter elements $\beta_{pq}$, the more clearly the corresponding Moiré fringes can be perceived.

However, since a great many Moiré fringes develop simultaneously in an arrangement according to FIG. 1 or FIG. 2, there is no dominating Moiré preferred or predominant direction to be perceived by the observer.

All of the superimpositions shown here also apply in like manner to the green and blue image elements $\alpha_{ij}$ or wavelength filter elements $\beta_{pq}$, so that a reduction of the Moiré effect is also achieved.

Figure 12:
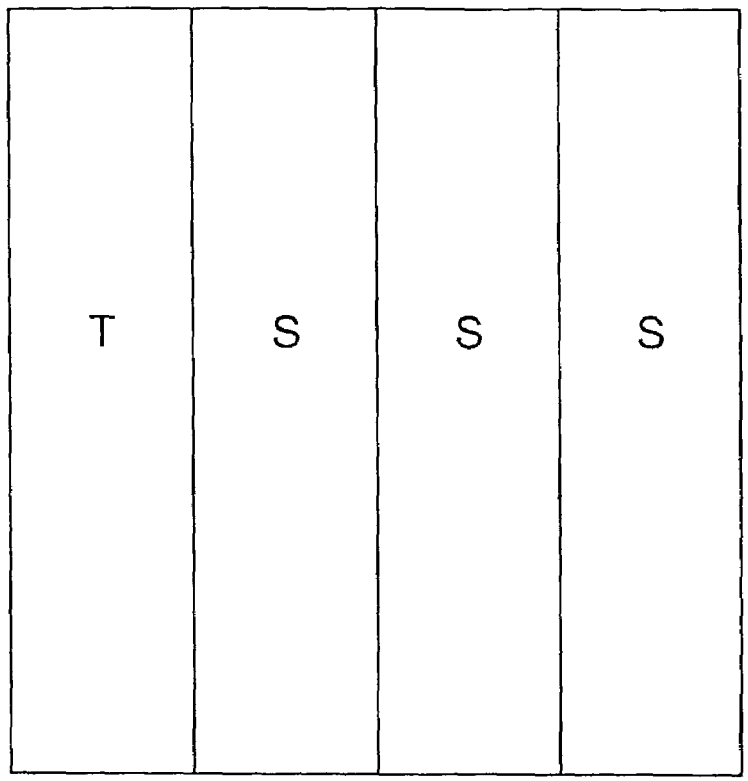
FIG. 12 shows an example of the mask image structure of a black-and-white barrier known from the prior art.
Figure 13:
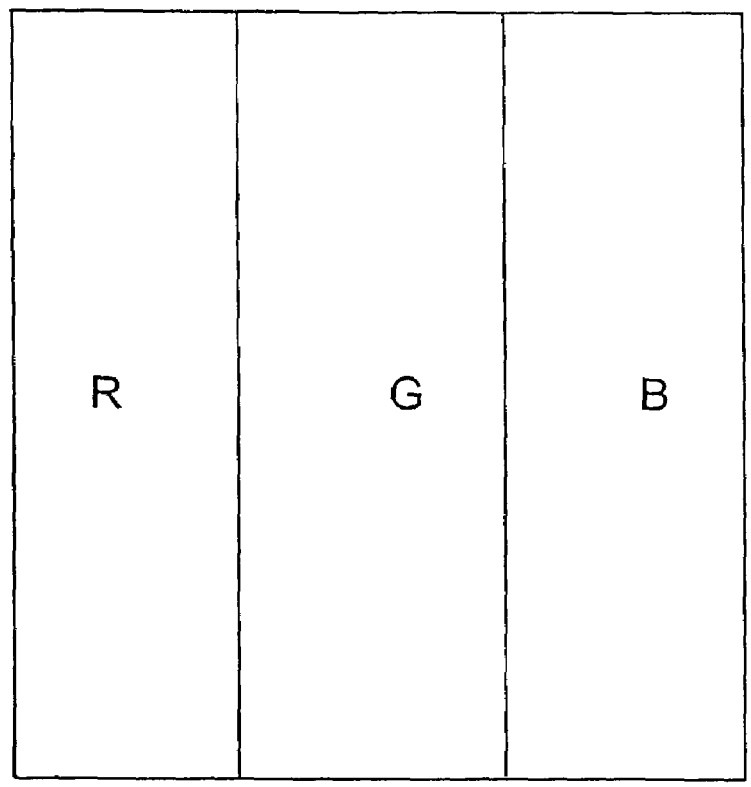
FIG. 13 shows an example of an RGB mask image structure.

The reasons for the improved legibility of text compared with known black-and-white barrier methods will be explained in the following with reference to FIG. 12 and FIG. 13. FIG. 12 shows, for example, the relationships in a black-and-white barrier known from the prior art when a column T which is transparent to visible light is followed by three opaque columns S; this corresponds to a barrier for a system with four views.

When using wavelength-dependent mask image structures entirely without opaque surfaces, as is shown, for example, in FIG. 13, and when common text is placed below both mask image structures according to FIGS. 12 and 13, then only a part, that is, a fourth, of the displayed text surface is visible below the black-and-white barrier in the center. With the RGB barrier according to FIG. 13, however, the text below each filter is visible. This substantially improves legibility.

Embodiment examples of the arrangement according to the invention in which means are provided for switching between 2D and 3D are explained in more detail in the following.

Figure 14:
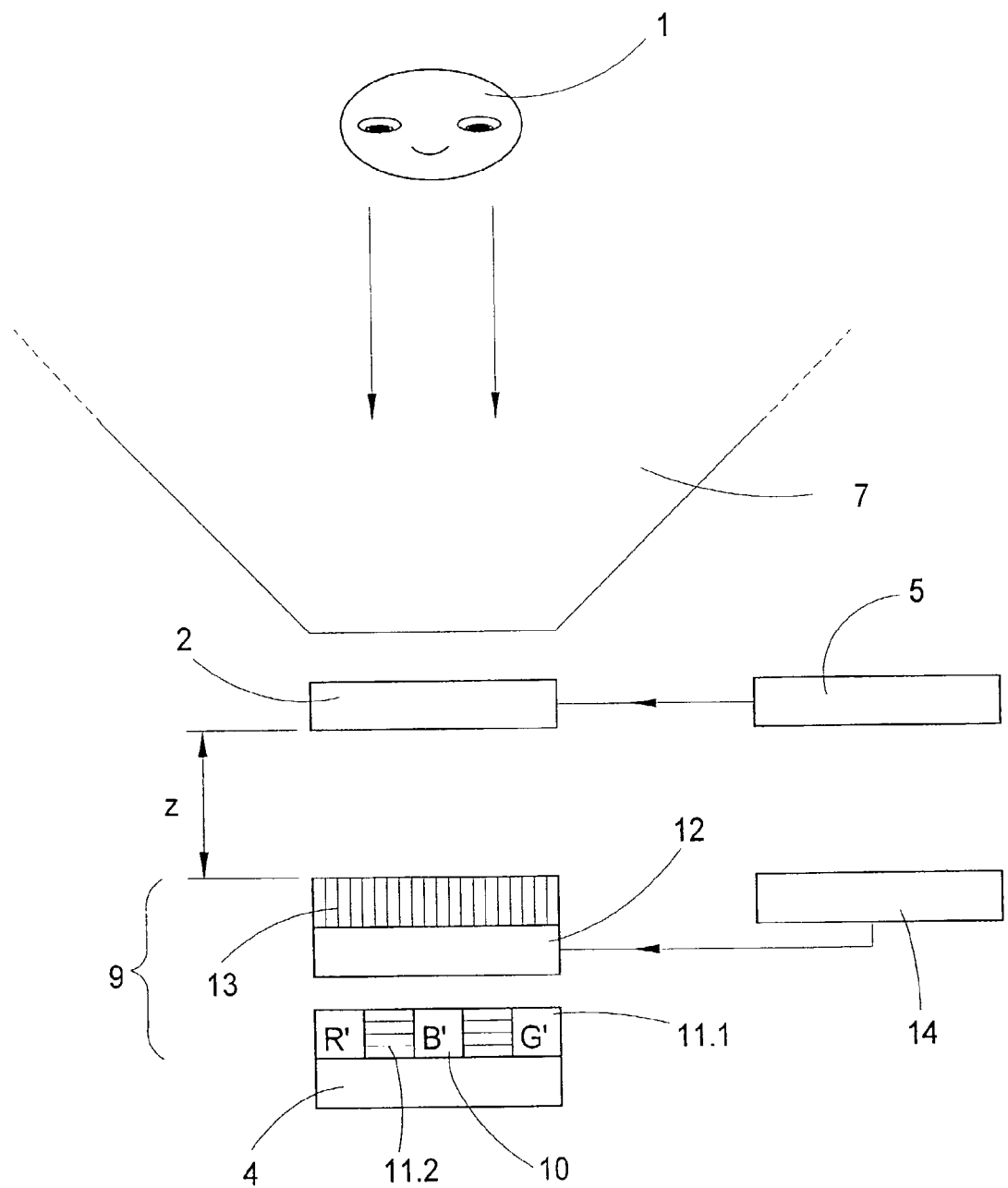
FIG. 14 shows a first embodiment example of the arrangement according to the invention with means for switching between 3D and 2D, comprising a filter arrangement which is formed of a filter array, an optical medium for rotating the polarization direction, and a linear polarization filter.

In the first of these embodiment examples which is shown in FIG. 14 and in which the three-dimensional (autostereoscopic) display can be switched to a two-dimensional display, the image information reproduced on the image elements $\alpha_{ij}$ originates from perspective views of the scenes or objects to be displayed.

In FIG. 14, an image reproducing device in the form of a currently commercially available color LC display 2, e.g., Sanyo LMU-TK 12A, is followed at a distance z in the viewing direction of an observer 1 by a filter arrangement 9 with a filter array 10. A flat illumination source 4 which emits white light is arranged behind the filter arrangement 9.

The filter array 10 in this case comprises a combination of wavelength filter elements 11.1 and linear polarization filter elements 11.2 arranged in the form of a raster. In addition to this filter array 10, the filter arrangement 9 comprises an optical medium 12 by which the polarization direction of the incident linearly polarized light can be rotated when passing through the filter arrangement 9, and a flat linear polarization filter 13. The linear polarization filter 13 is positioned between the color LC display 2 and the optical medium 12. The passing direction of the linear polarization filter 13 corresponds to the passing direction of an existing polarization filter of the color LC display 2 on the illumination side, although this is not shown in the drawing.

The color LC display 2 also has separately controllable subpixels of the primary colors red (R), green (G) and blue (B) and is connected with a control circuit 5. For purposes of distinguishing between them more readily, the subpixels of color LC display 2 are designated by R,G,B, while the wavelength filter elements 11.1 are designated by R',G',B' depending on their transparency. The wavelength filter elements 11.1 pass light irrespective of polarization direction.

As in the embodiment examples discussed above, the control circuit 5 is designed for generating partial information of views $A_k$ (k=1 . . . n) on the individual subpixels R,G,B of the color LC display 2.

When 3D mode is activated—as will be explained more fully in the following—the propagation directions of the light coming from the wavelength filter elements 11.1 of the filter arrangement 9 and radiating through the corresponding subpixels R,G,B of the color LC display 2 intersect in the observation space 7 in a plurality of observation points from which the displayed object or scene is perceptible three-dimensionally.

The distance z between the color LC display 2 and the filter array 10 is 2.3 mm in this case. This measurement results from (F3) when it is assumed for $s_p$ that the average distance between wavelength filter elements 11.1 on the filter array 10 is 100 μm. The wavelength filter elements 11.1 are designed so as to have approximately the same with, in their dimension vertical to the viewing direction, as the subpixels of the color LC display 2. The average interpupillary distance $p_d$ was set at 65 mm. The average observation distance $d_a$ was selected at 1.5 m.

The combination of partial information of different views $A_k$ (k=1 . . . 8) on the color LC display 2 again corresponds to the example according to FIG. 3. Further, the filter array 10 is also based on the example of the mask image according to FIG. 2. The combination of partial information and the mask image are likewise generated in the manner described above according to functions (F1) and (F2) and the manner in which the autostereoscopic impression is brought about corresponds to the explanation which was already given with reference to FIGS. 4 to 7 and FIG. 9.

Figure 15:
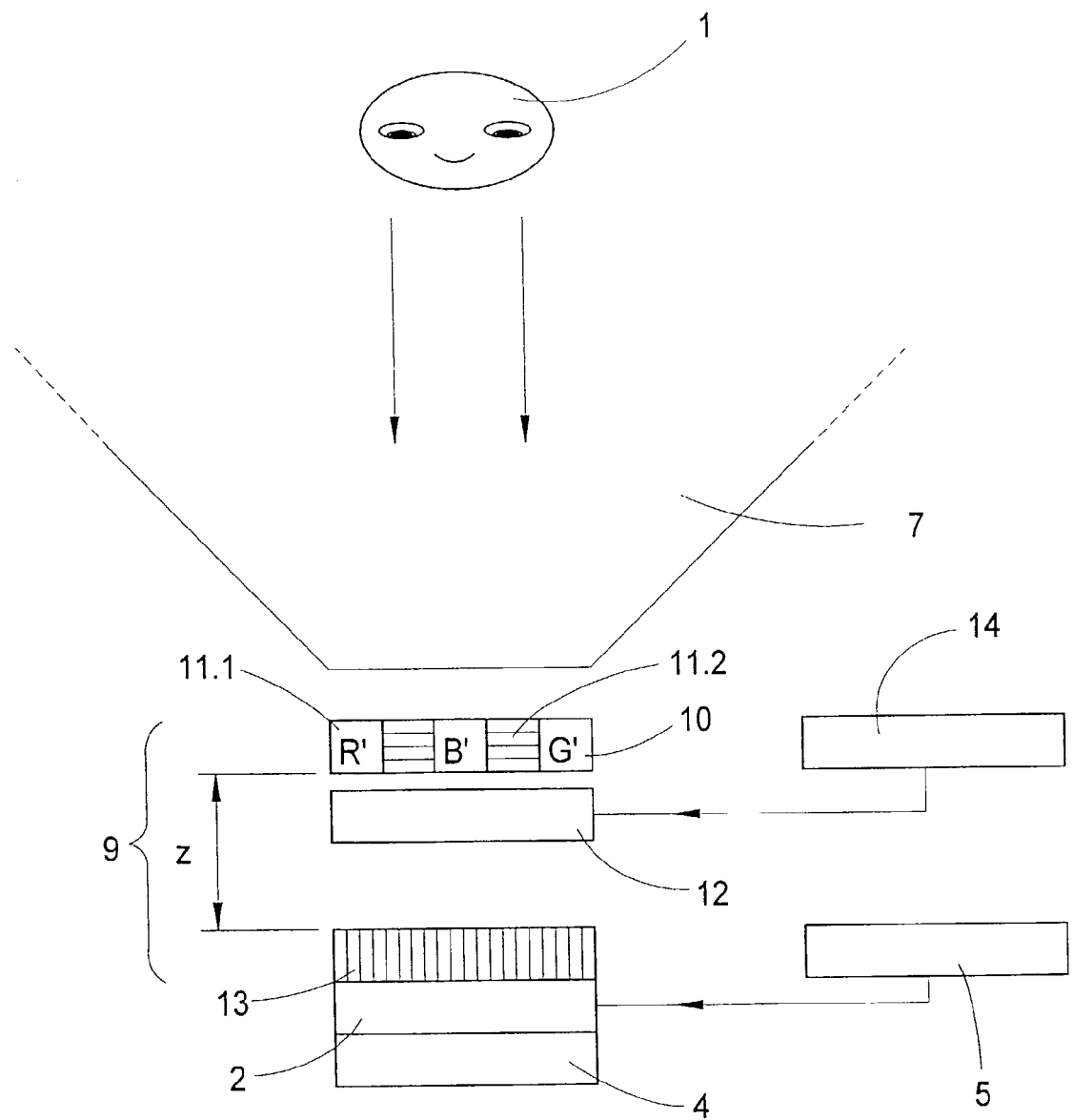
FIG. 15 shows a second embodiment example of the arrangement according to the invention with means for switching between 3D and 2D, comprising a filter arrangement which is arranged in front of an image reproducing device in the viewing direction of an observer and comprises a linear polarization filter, an optical medium for rotating the polarization direction and a filter array.

A second embodiment example of the arrangement according to the invention with means of switching between 2D and 3D is shown in FIG. 15. With respect to the component groups which are used, this embodiment example corresponds substantially to the first embodiment example according to FIG. 14, but in the present case the filter arrangement 9 with the filter array 10 which again comprises wavelength filter elements 11.1 as well as linear polarization filter elements 11.2 is located at a distance z in front of the image-displaying color LC display 2 viewed from the position of the observer 1. Further, the filter array 10 is no longer located directly in front of the light source 4 in the embodiment example according to FIG. 15.

In FIG. 15, the color LC display 2 is connected with the flat illumination device 4 and the linear polarization filter 13 to form a constructional unit. When 3D mode is activated—as will be explained more fully in the following—the propagation directions of the light coming from the subpixels R,G,B of the color LC display 2 and radiating through the corresponding wavelength filter elements 11.1 of the filter arrangement 9 intersect in the observation space 7 in a plurality of observation points from which the displayed object or scene is perceptible three-dimensionally.

In FIGS. 14 and 15, the linear polarization filter elements 11.2 are shown by horizontal lines symbolizing the polarization direction. It will be seen that the polarization direction is identical in all linear polarization filter elements 11.2. The linear polarization filter elements 11.2 can be either opaque or also transparent in the entire range of visible light; it is also possible to limit the polarization-dependent transparency to determined wavelength regions, e.g., likewise to R',G',B'.

In both embodiment examples according to FIG. 14 and FIG. 15, the arrangement of the wavelength filter elements 11.1 and the linear polarization filter elements 11.2 in the viewing direction of the observer corresponds to the highly magnified and not true-to-scale view in FIG. 2. The wavelength filter elements 11.1 are shown in FIG. 2 by R',B',G', while the linear polarization filter elements 11.2 are designated by S.

The filter array 10 is preferably formed by a thin plastic foil or plastic plate structured in the manner described above.

The controllable optical medium 12 which enables a defined rotation of the polarization direction of the linearly polarized light passing through cooperates with the filter array 10 and the linear polarization filter 13 to make it possible or to prevent—depending on rotation—the passage of light through the filter arrangement 9 in the area of the linear polarization filter elements 11.2.

In order to trigger rotation, a control device 14 is provided which makes it possible, for example, by applying a control signal to the optical medium 12, to change the polarization direction of the light on the path from the light inlet side to the light outlet side.

In this respect, the optical medium 12 has liquid crystals, for example. In the embodiment example according to FIG. 14, a conventional LC display (or an LC panel) is used for this purpose, wherein color filters and polarization filters which may have been present are missing or were removed. However, it is also possible to use an LC display in which a linear polarization filter is provided on one side which then takes over the function of the linear polarization filter 13 mentioned above. In this case, the switching of the optical medium 12 is advantageously carried out via the control device 14 of the correspondingly constructed LC display. For example, a white or black screen content can serve internally as control signal and then corresponds, e.g., to two effective polarization rotation directions of the liquid crystals crossing one another. A Philips 150B or Sanyo LMU-TK 12A LC display, for example, is suitable as an optical medium 12 for rotating the polarization direction. These latter offer the further simplification that not every individual liquid crystal element needs to be controlled separately, but rather all liquid crystal elements can respond to one or a few control building blocks.

In the embodiment example according to FIG. 15, on the other hand, an image reproducing device is provided which emits linearly polarized or nonpolarized light. It is formed, for example, by the color LC display 2 and the illumination source 4 located behind the latter. With regard to the use of a color LC display 2 which is described herein by way of example, the linear polarization filter which extends over a surface area is already functionally integrated in the color LC display 2, so that the color LC display 2 emits linearly polarized light. However, for other types of displays 2 which emit nonpolarized light, e.g., plasma screens, the linear polarization filter 13 represents a subassembly which must be added on separately.

If there is no rotation of the polarization direction carried out in the optical medium 12 which is arranged between the linear polarization filter 13 and filter array 10 in both cases described above and the polarization direction of the linear polarization filter 13 extending over a surface area intersects with the polarization direction of the linear polarization filter elements 11.2 at an angle of 90°, light is extensively prevented from passing through in the region of the linear polarization filter elements 11.2 of the filter arrangement 9. In this case, the filter arrangement 9 has a structure which is suitable for autostereoscopic, three-dimensional display.

In order to switch to the two-dimensional type of display, the optical medium 12 is actuated via the control device 14, whereupon the polarization direction of the light being radiated in is rotated by a defined angle, namely, in such a way that it can pass through the linear polarization filter elements 11.2. Accordingly, the originally severe limiting of the propagation directions of the light is appreciably reduced. In addition, the average light permeability is increased. In this case, more image information is visible to the observer, so that the image resolution increases. In particular, the legibility of texts is improved in this way. Ideally, that is, with a parallel orientation of the polarization directions at the light outlet side of the optical medium 12 and the linear polarization filter elements 11.2, the latter act as analyzers with 100% transmission. However, a strict parallelism is not compulsory because even with small intersection angles of the polarization directions of about 15°, which in this case is still considered essentially parallel, a high light transmission of about 90 percent is achieved. This is sufficient in very case for good text recognition and a high-resolution 2D image display.

In the embodiment example shown in FIG. 15, the polarization directions of the linear polarization filter 13 and the linear polarization filter elements 11.2 are arranged in such a way that the arrangement is in 3D operating mode when the optical medium 12 is in the switched off state. However, a different orientation of the linear polarization filter 13, for example, enables an opposite operation in which the 2D operating mode is predominant in the switched off state of the optical medium 12, so that the optical medium 12 must be activated for 3D operation.

As was explained in the beginning, the polarization rotation of the optical medium 12 can be generated in different ways. In one variant, a longitudinal Pockels cell with a corresponding control can be used as a switchable optical medium 12. In a cell of this type, the natural optical axis of a crystal of which it is substantially composed is oriented parallel to an electric field which can be switched on and which can be modulated in longitudinal direction. The fast and slow optical axes occurring in the switched on field in the crystal must extend at an angle of 45° to the oscillation plane of the linearly polarized incident light, which is achieved by means of corresponding orientation. The Pockels cell comprises, for example, lithium niobate (LiNbO$_3$) or potassium phosphate (KH$_2$ PO$_4$). When the half-wave voltage U, as it is called, is applied to the Pockels cell, the polarization direction of the incident linearly polarized light is rotated by 90°. The half-wave voltage is calculated according to the following equation:

$$U = \lambda_0 / 2rn_o^3, \quad (F5)$$

where $\lambda_0$ is the base wavelength for which the half-wave voltage is to be calculated, r is the tensor element of the linear electrooptic constant which indicates the component used in the Pockels cell, and no is the index of refraction of the corresponding crystal. For example, for $\lambda_0=555$ nm (green light), the half-wave voltage U=747 V for LiNbO$_3$ and U=7327 V for KH$_2$ PO$_4$.

Deviations from the exact polarization direction angle of 90° for wavelengths other than 555 nm do not have a disadvantageous effect, since the linear polarization filter elements 11.2 and the linear polarization filter 13 like all polarizer/analyzer pairs, have an intensity transmission characteristic proportional to the square of the cosine of the angle of rotation. This means that the angle of rotation of the polarization direction of the light directed onto the filter array 10 or the linear polarization filter 13 in the range of 75° to 105° always provides for a passage of light through the filter arrangement 9 which is ideally far greater than 90%.

Figure 16:
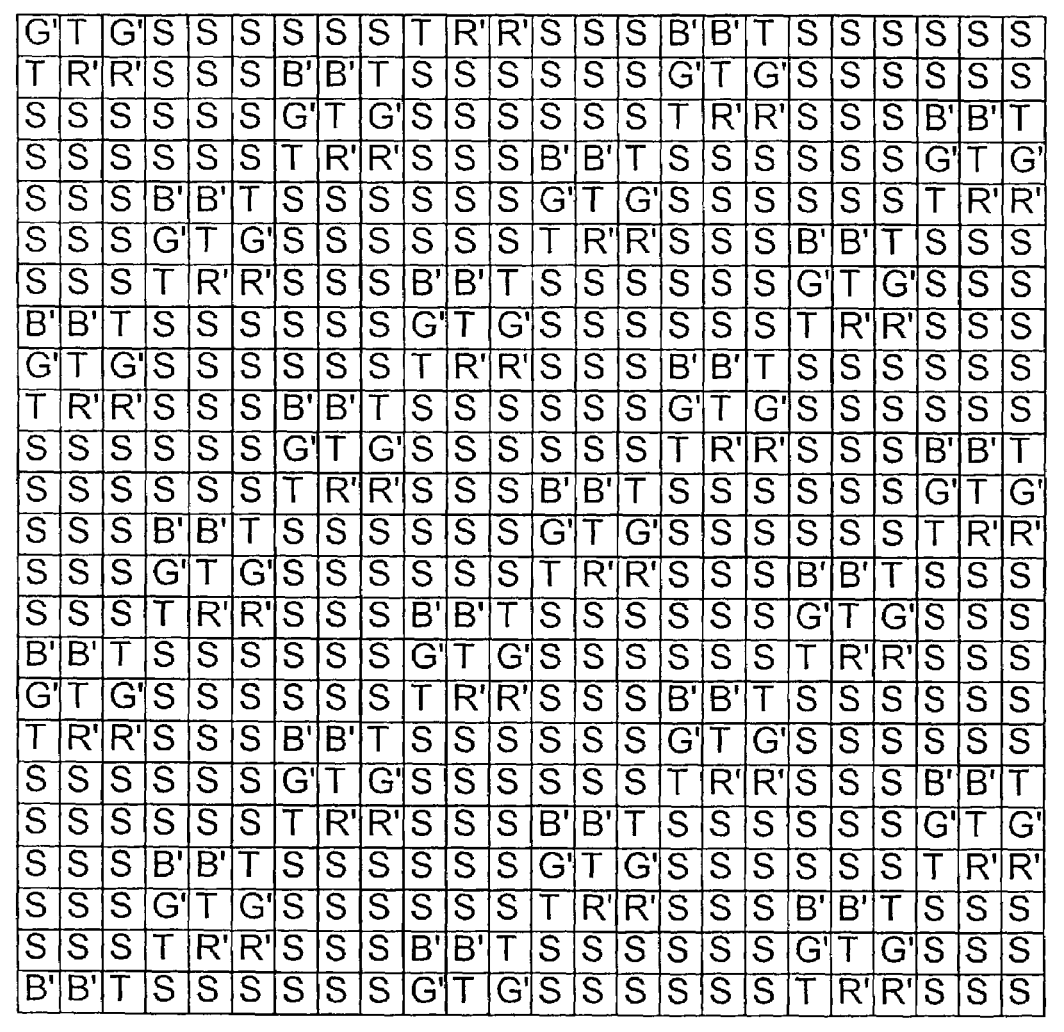

In a special constructional variant, a structure which, in addition to the individual elements R',B',G' and S, also has elements T which are always transparent, i.e., do not depend on polarization direction, can also be used instead of the structure of the filter array 10 shown in FIG. 2. A specific arrangement of these elements for purposes of a clearly perceptible switching effect in cooperation with the optical medium 12 and the linear polarization filter 13 is shown by way of example in FIG. 16.

Figure 17:
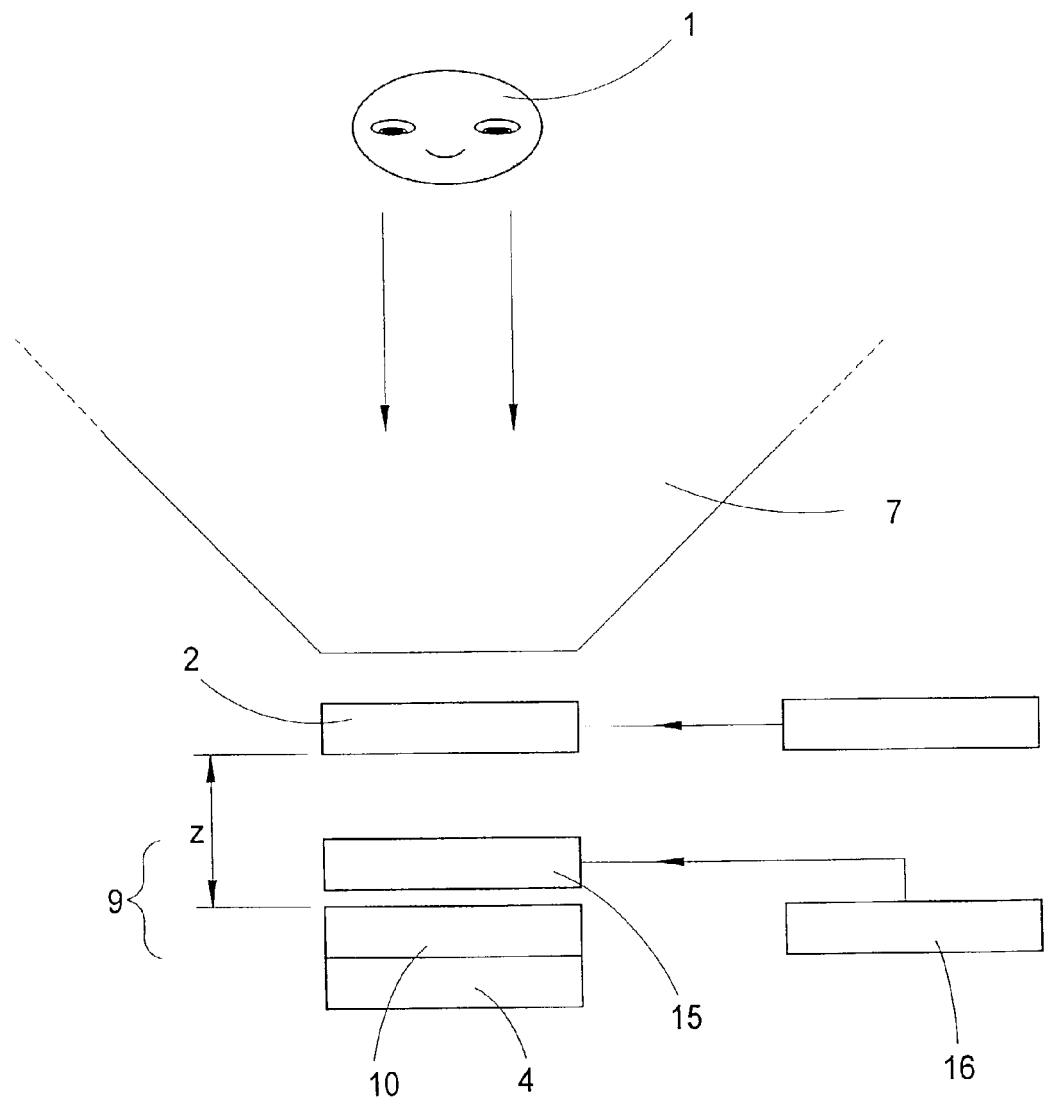
FIG. 17 shows a third embodiment example of the arrangement according to the invention with means for switching between 3D and 2D, comprising a filter arrangement with diffusion screen behind an image reproducing device in the viewing direction of an observer.

In a third embodiment example for switching from 2D to 3D which is shown in FIG. 17, a diffusion screen 15 is provided as switching means. For this purpose, the arrangement shown here again has a color LC display 2 as image reproducing device, a filter arrangement 9 and an illumination source 4. The color LC display 2 is arranged in front of the filter arrangement 9 considered from the observation position.

The filter arrangement 9 comprises a static filter array 10 of the type that has already been described. Further, the filter arrangement 9 comprises a flat diffuision screen 15 which is switchable electronically by means of a control device 16 between a transparent state and a scattering, translucent state. This diffuision screen 15 is positioned between the filter array 10 and the color LC display 2. Diffuision screens of this kind with dimensions up to 50 inches and more in the diagonal are available, for example, as Privalite Glass® from the firm of VEGLA, Aachen, Germany. This glass is based on liquid crystals which are milky, i.e., scattering, when no electric voltage is applied, but substantially transparent when electric voltage is applied.

In the transparent state, the illumination structured through the filter array 10 acts as a basis for the 3D operating mode, i.e., the diffusion screen 15 has no influence essential to function upon the light passing through. However when the diffusion screen 15 is switched to the scattering state, the structuring of the illumination is essentially canceled. As a result, the translucent image reproducing device, that is, in this case, the color LC display 2, is illuminated homogeneously to a great extent. Conventional two-dimensional image contents can accordingly be shown in the 2D operating mode without being influenced by the filter array 10.

In another embodiment example for switching between 3D and 2D, particularly in the construction of the arrangement according to the invention shown in FIGS. 8 and 10, a filter arrangement which will be described in more detail in the following with reference to FIGS. 18 to 23 can be used instead of the wavelength filter array 8 as means for switching between 2D and 3D.

Figure 18:
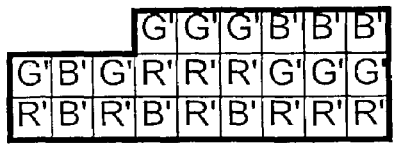
FIG. 18 shows a basic element from a first wavelength filter array.
Figure 19:
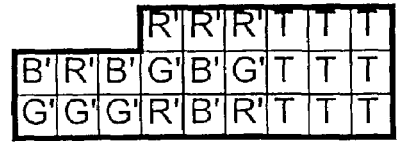
FIG. 19 shows a basic element from a second wavelength filter array.

This filter arrangement comprises two arrays which are constructed, for example, as thin foil filters and comprise static wavelength filter elements, i.e., wavelength filter elements which do not change their optical properties over time. Both autostereoscopic filter arrays are composed of a plurality of identical base elements, one of which is shown in FIG. 18 and FIG. 19. These base elements differ with respect to their structuring with individual wavelength filter elements, R',G',B' and elements T which are transparent within the entire range of visible light (compare FIG. 19).

Figure 20:
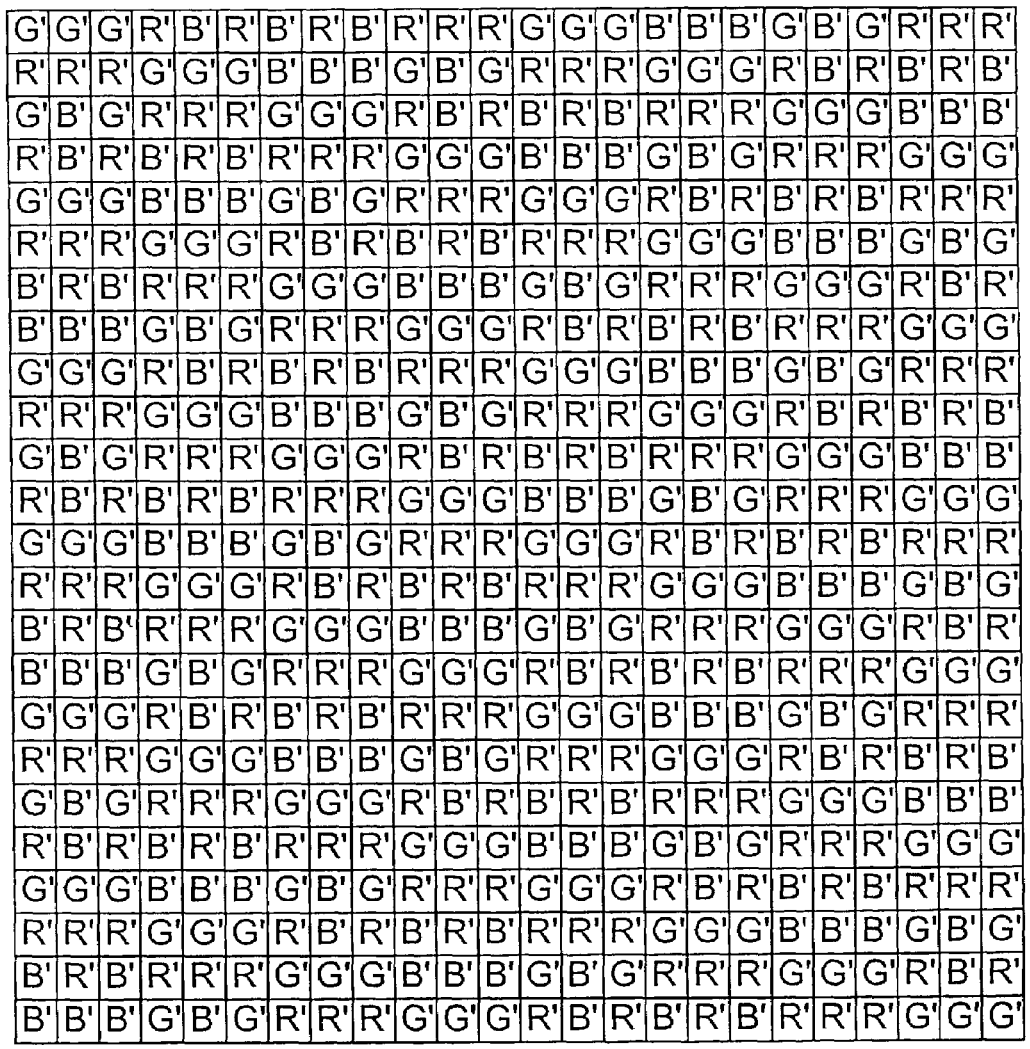
FIG. 20 shows a first wavelength filter array composed of a plurality of basic elements according to FIG. 18.

FIG. 20 shows a section of a first wavelength filter array which is composed exclusively of identical base elements as are shown in FIG. 18. This wavelength filter array has no transparent elements T.

Figure 21:
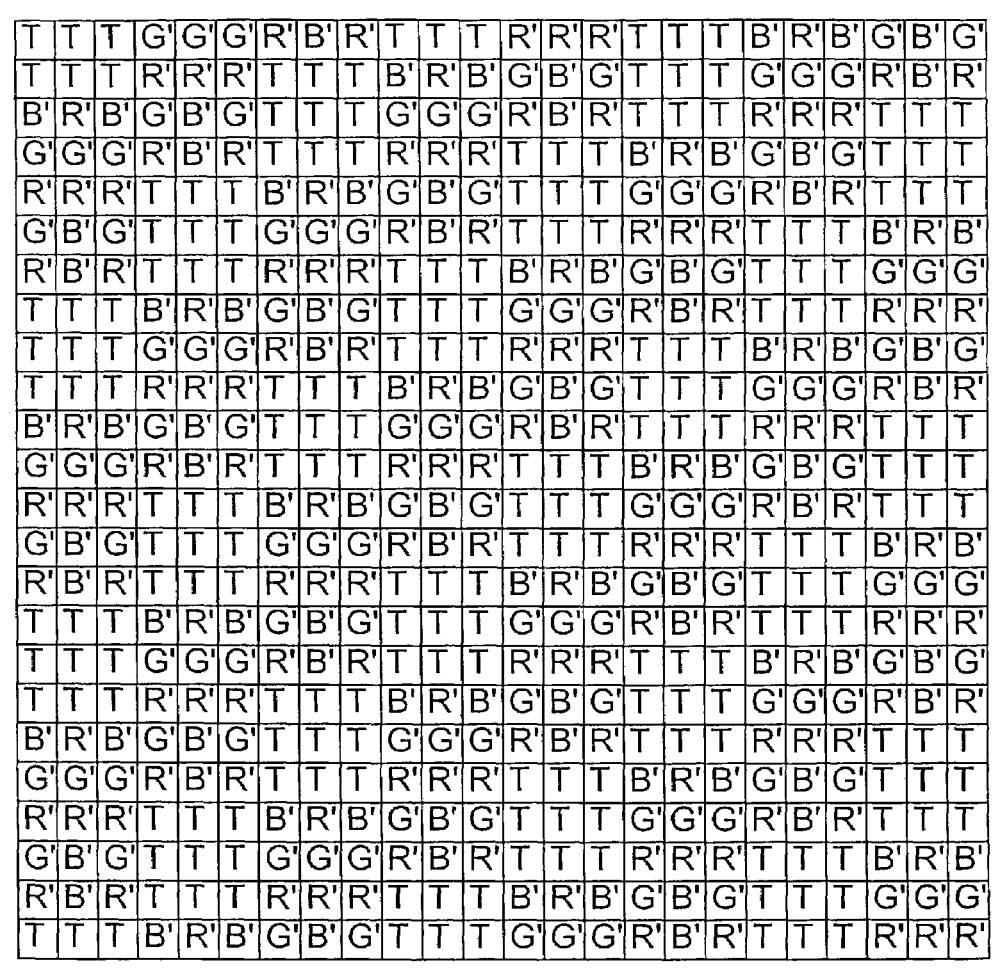

FIG. 21 shows a section of a second wavelength filter array which is composed exclusively of base elements such as are shown in FIG. 19. This wavelength filter array also has transparent elements T in addition to wavelength filter elements R',G',B'.

Figure 22:
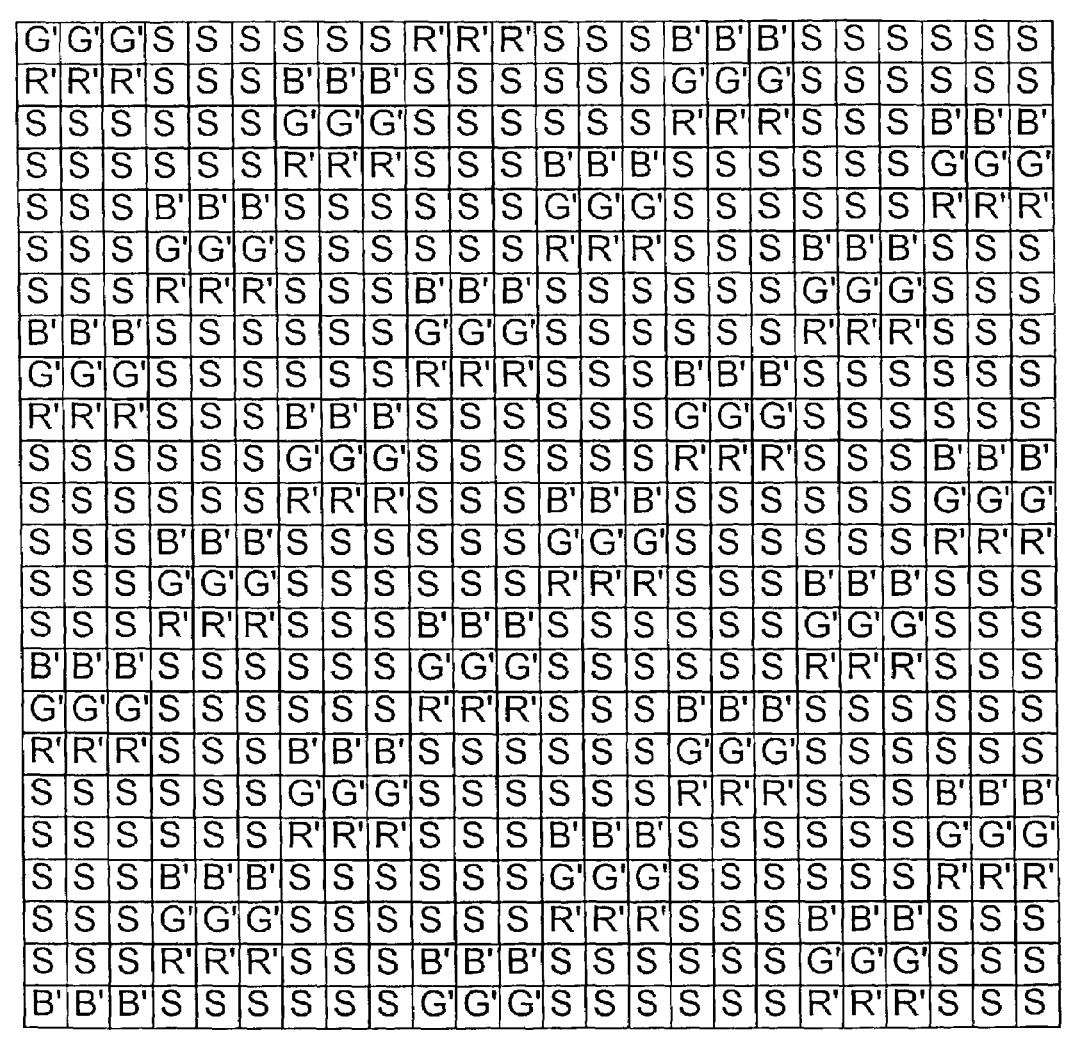

When the two wavelength filter arrays from FIGS. 20 and 21 are placed one on top of the other so that the light must pass successively through both wavelength filter arrays, the summary wavelength filter array which is shown in FIG. 22 and in which the filter effect determined by the wavelength filter elements R',G',B' (on the wavelength filter array according to FIG. 20) is achieved only in the area of the transparent elements T (on the wavelength filter array according to FIG. 21) is given in a first orientation of the wavelength filter elements R',G',B' and elements T relative to one another. At all the rest of the locations in which wavelength filter elements R',G',B' of the two wavelength filter arrays overlap, the summary wavelength filter array is opaque, i.e., non-transparent. The opaque partial raster portions of the summary wavelength filter array are designated by S in FIG. 22.

The summary wavelength filter array, as filter arrangement, causes a presetting of the propagation directions of the light radiated from the color LC display 2 in the manner described above, so that a realistic, three-dimensional perception is possible. For example, predominantly information of a first group of views $A_4$ to $A_5$ is perceived at a first observation location and predominantly information of a second group of views $A_7$ to $A_8$ is perceived at a second observation location at eye distance from the first location.

Figure 23:
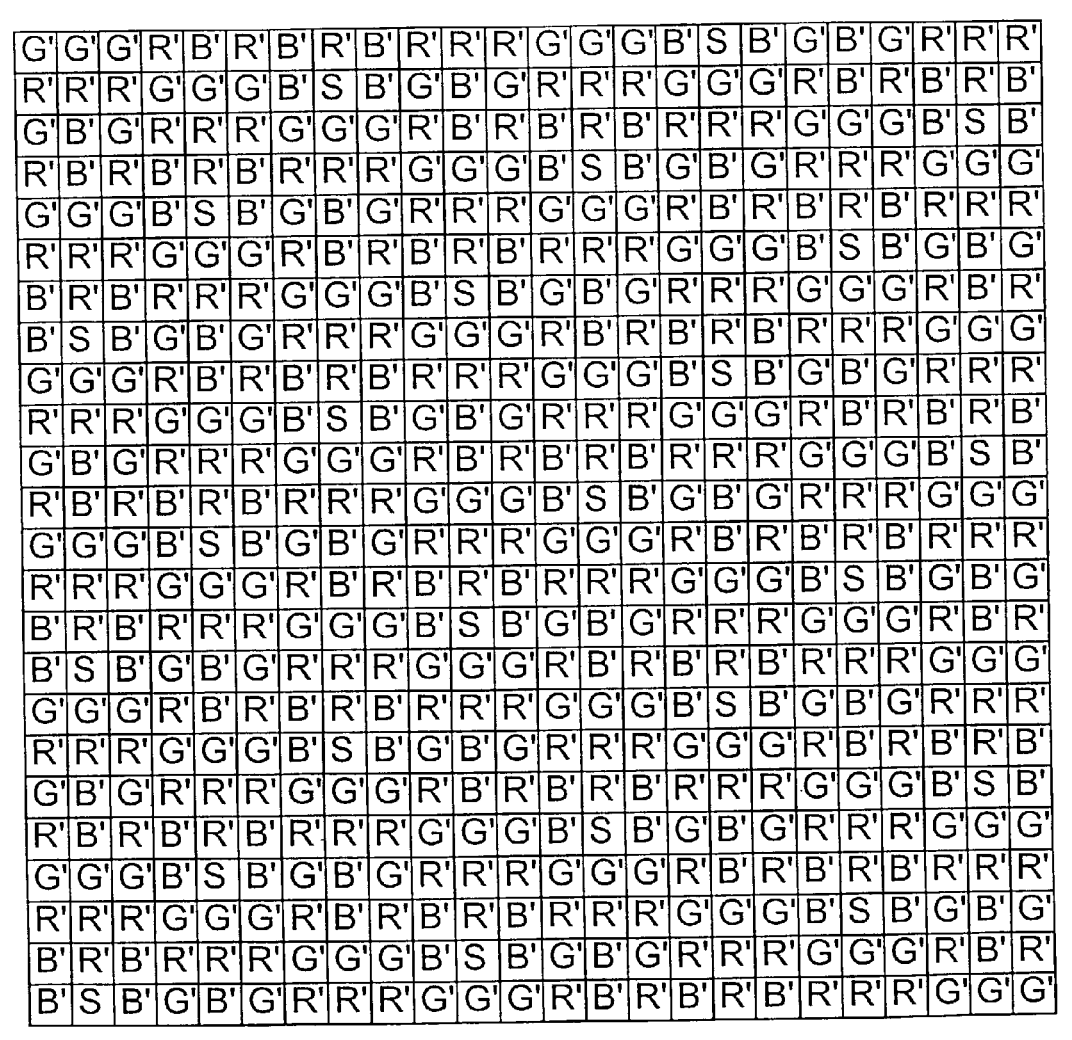

A wavelength filter array shown in FIG. 23 results when the two wavelength filter arrays from FIG. 20 and FIG. 21 lying one on top of the other are displaced by three raster positions in horizontal direction. As will be seen from FIG. 23, this results in a very high light permeability since only one of the total of twenty-four partial raster portions of a base element is not permeable to light. The three-dimensional perception impression in the previous first position is canceled by the resulting high transparency of the summary wavelength filter array according to FIG. 23, so that the image information shown on the color LC display 2 can now be observed two-dimensionally.

The parallel displacement of the two wavelength filter arrays according to FIG. 20 and FIG. 21 relative to one another is carried out mechanically, for example, by means of a piezo-actuator by which very small displacement steps in the order of magnitude of the raster width or raster height of the wavelength filter array can be realized. Instead of a piezo-actuator, a stepper motor can also be used.

In a modification, it is also possible to place more than two wavelength filter arrays above one another and to displace them relative to one another separately; however, care must be taken that the two positions mentioned above occur.

It will be seen immediately that the positioning of the wavelength filter elements R',G',B' and the transparent elements T must be adapted to one another for this purpose, so that a first position with a stricter degree of order is given by the parallel displacement for generating a 3D impression and a second position with a lower degree of order, but with higher transparency, is given for 2D display.

With the first and second wavelength filter array shown in FIG. 20 and FIG. 21, after a parallel displacement by three partial raster portions, a good 3D impression is achieved in the first position and a good 2D impression is achieved in the second position. However, the invention is not limited to the structuring of the wavelength filter array described here; other arrangement patterns can be generated based on the idea described above or based on iterative methods.

Figure 24:
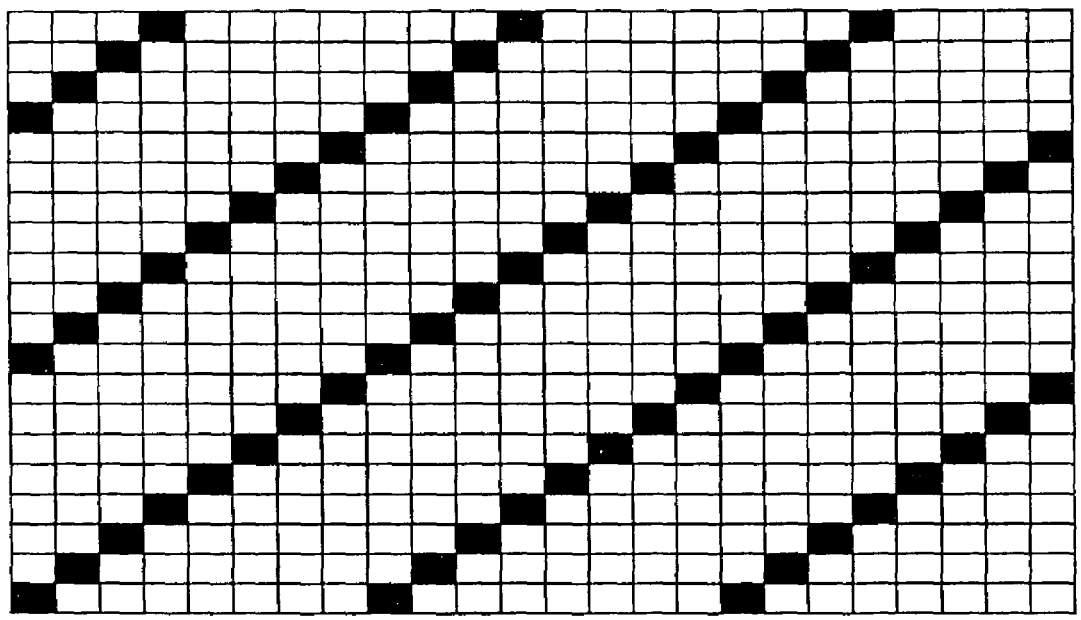
FIG. 24 shows an example of a wavelength filter array which contains exclusively opaque and transparent wavelength filter elements $\beta_{pq}$.

For example, the filter arrangement can also be formed by superimposing seven wavelength filter arrays whose individual wavelength filter elements are either opaque or transparent within the entire range of visible light. An example of a wavelength filter array of this kind is shown in FIG. 24. A superposition of seven wavelength filter arrays of the type mentioned above with an offset of one partial raster portion in each instance results in the summary wavelength filter array shown in FIG. 25.

Figure 25:
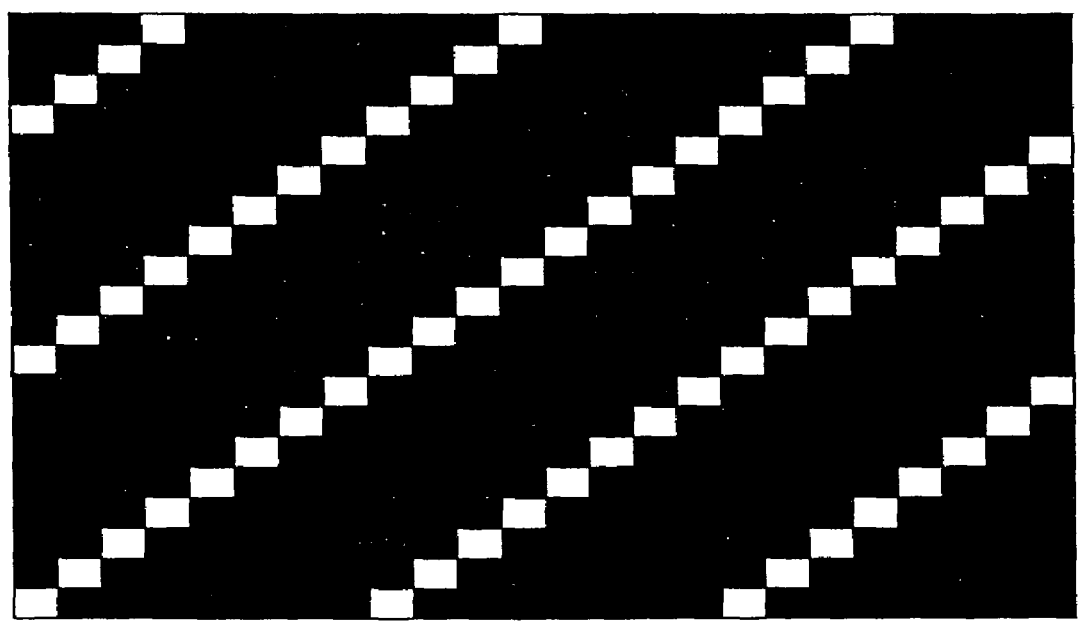
FIG. 25 shows a filter arrangement which is formed by an offset superposition of seven wavelength filter arrays according to FIG. 24.

FIG. 25 also shows the first position of this filter arrangement for the autostereoscopic mode. By switching the filter arrangement by means of one of the mechanical devices mentioned above, a second position is achieved in which the summary wavelength filter array is most extensively transparent, that is, all of the opaque partial raster portions are arranged one behind the other in the observation direction. This results in a summary wavelength filter array whose structuring corresponds to FIG. 24 and which has a high transparency, so that the images shown on the color LC display 2 are perceived two-dimensionally.

In order to improve the filter action during 3D operation, the opaque filter elements which, in the first position corresponding to FIG. 25, do not adjoin the diagonal strips that are still transparent are, for example, about 1.3 times wider than the remaining opaque filter elements. Accordingly, an overlapping of the opaque filter elements results in the first position, which ensures that viewing takes place only through the desired, non-transparent partial raster portions of the filter arrangement on the image-displaying raster of the color LC display 2 when observed at a diagonal viewing angle, that is, not at right angles to the image-displaying surface.

For the sake of simplicity, the description up to this point has referred to wavelength filter elements which are transparent in red, green and blue light or within the entire range of visible light. In contrast, however, the invention also includes the possibility of using other transparency wavelength regions insofar as they are suitable for forming static, passive filter arrays. Further, the transparency wavelength regions need not be limited to the region of visible light.

In some cases, it is desirable for the observer for a scene or object to be displayed optionally in a two-dimensional manner over the entire surface, in a three-dimensional manner over the entire surface, or in a two-dimensional manner which is limited to partial surfaces with the remaining part displayed in three dimensions. The further embodiment examples for switching between 3D and 2D which are described in the following are advantageous for this purpose.

Figure 26:
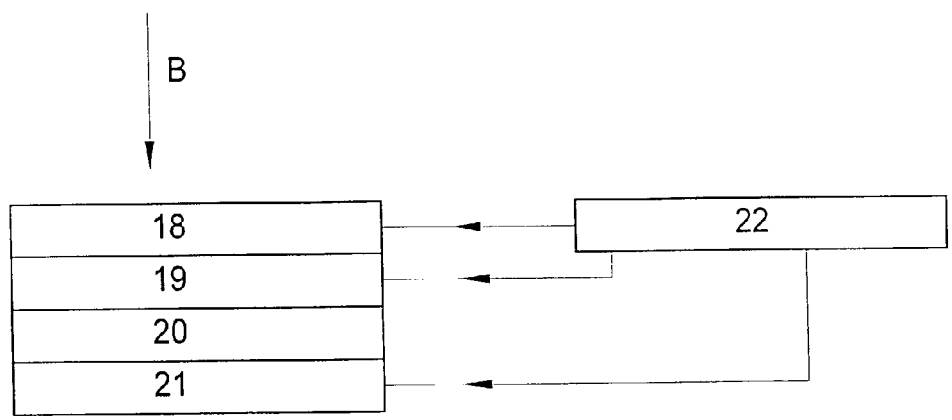
FIG. 26 shows an embodiment example of the arrangement according to the invention with means for selective display over a whole surface in two dimensions or over a whole surface in three dimensions, comprising an image reproducing device, a wavelength filter array and flat illumination sources.

In this connection, FIG. 26 shows first the basic construction of the arrangement according to the invention with the option of selective two-dimensional or three-dimensional display of images of a scene or an object. The following are shown schematically successively from viewing direction B of an observer (or a plurality of observers): an image reproducing device 18 comprising a plurality of translucent image elements on which image information of a plurality of perspective views of the scene/object can be displayed; a first flat illumination source 19 belonging to the illumination device of the arrangement; a wavelength filter array 20 comprising a plurality of filter elements which transmit light in predetermined wavelength regions, and a second flat illumination source 21 belonging to the illumination device of the arrangement.

The wavelength filter array 20 comprises a plurality of filter elements with approximate dimensions of 0.99 mm (width) and 0.297 mm (height). These dimensions are adapted to a "Batron BT 63212" color LC display which is used in this case, for example, as an image reproducing device 18. The distance between the image reproducing device 18 and the wavelength filter array 20 is about 2 mm in the selected example.

The function of the control circuit 22 is to generate on the image reproducing device 18 combination images to be displayed which are formed of a plurality of views, in particular a plurality of perspective views, of the scene or object to be displayed. These combination images can be still photographs or, if required, moving images which change in predetermined short time cycles. Further, the control circuit 22 causes the switching on and switching off of the two flat illumination sources 19 and 21, wherein separately controllable on/off switches (not shown) are associated with the latter for this purpose.

Depending on the preset by means of the control circuit 22, it is possible to switch between a plurality of different operating modes in which the illumination light reaches the observer either exclusively only through the image elements of the image reproducing device 18, but not through filter elements of the wavelength filter array 20, for purposes of two-dimensional display or reaches the observer through the filter elements of the wavelength filter array 20 and subsequently also through the image elements of the image reproducing device 18 for purposes of three-dimensional display.

FIG. 3 shows, by way of example, a highly magnified section of the image structure of the image reproducing device 18 with the plurality of image elements. Each of the subpixels which are shown in the form of squares in FIG. 3 always has exactly the same position ij within the image raster of lines and columns in relation to a perspective view. The combination image to be generated is base on eight perspective views, i.e., the image information which is to be reproduced on the individual image elements are taken from eight perspective views and combined to form a total image which corresponds to the image reproducing device in its surface area dimensions. Each of the numbers 1 to 8 entered in the image elements designates one of the eight perspective views from which the respective image information originates. The substantially enlarged raster of image elements has a total of 1024 columns and 768 lines corresponding to the color LC display that is used.

To ensure that the observer always sees image information from different views, i.e., from different image channels, simultaneously, the wavelength filter array 20 is structured, depending on the individual image elements of the image reproducing device 18 which preferably have pixel sizes or subpixel sizes, in the manner shown by way of example in FIG. 2 with reference to a section from the structure of the wavelength filter array 20 which is also shown in a highly magnified view.

While every square in FIG. 3 corresponds to an image element in pixel size or subpixel size, every square in FIG. 2 should correspond to a filter element. The filter elements, designated by R', transmit only in the range of red light, the filter elements designated by G' transmit only in the range of green light, and the filter elements designated by B' transmit only in the range of blue light. Filter elements which are not permeable to light (in the visible range) are designated by S. The filter elements and the image elements are arranged in a raster so as to be proportional or identical to one another with respect to their dimensions.

Figure 27:
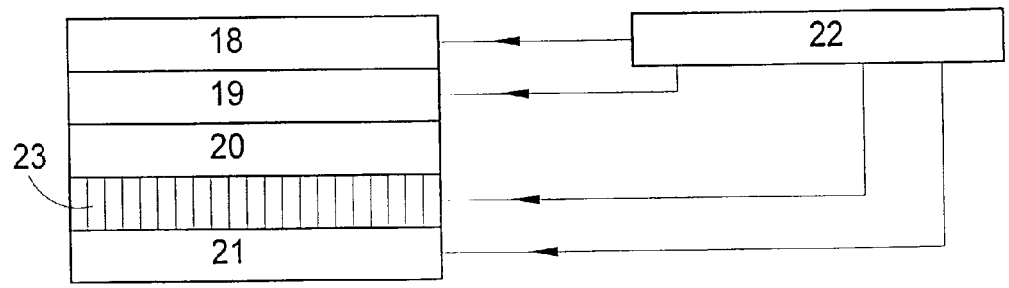
FIG. 27 shows an embodiment example of the arrangement according to the invention with means for selective display over a whole surface in two dimensions, over a whole surface in three dimensions or by image section.

FIG. 27 shows a basic construction of the arrangement according to the invention in which, in contrast to the construction according to FIG. 26, it is possible not only to display images of a scene or an object two-dimensionally or three-dimensionally as desired, but also to reproduce image sections two-dimensionally or three-dimensionally as desired.

In this case, a shutter 23 is arranged between the flat illumination source 21 and the wavelength filter array 20, which shutter 23 comprises a plurality of individually controllable shutter elements, wherein, depending on the quantity of controlled shutter elements, the path of the illumination light generated by the second flat illumination source 21 can be interrupted or released by a larger or smaller quantity of filter elements. In the following, it is assumed that controlled shutter elements open the light path, while shutter elements that are not controlled block the light path.

During operation of the arrangement, only the first flat illumination source 19 is switched on in a first operating mode for purposes of two-dimensional display, and illumination light reaches the observer only through the image reproducing device 18, but not through the wavelength filter array 20. In a second operating mode for purposes of three-dimensional display, only the second flat illumination source 21 is switched on, so that illumination light always reaches the observer through the wavelength filter array 20 and the image reproducing device 18.

In a third operating mode, both flat illumination sources 19 and 21 are switched on and a predetermined quantity of shutter elements is controlled so that the illumination light reaches the observer in regions of the shutter elements which are controlled and which accordingly release the light path, through the filter elements as well as through the associated image elements, while the illumination light reaches the observer in regions of the shutter elements that are not controlled (blocking the light path) only through the image reproducing device 18.

Therefore, the scene/object can be perceived two-dimensionally in regions of the shutter elements that are not controlled but three-dimensionally in the regions of the controlled shutter elements. This assumes, however, that the flat illumination 21 delivers an appreciably higher luminous density per area unit than the flat illumination source 19 which, for example, can be achieved by means of dimmers.

FIG. 28 shows the flat illumination source 19 in a construction which comprises a light source 24 and a flat light guide 25. The light guide 25 is defined by two large surfaces 25.1 and 25.2 which are located opposite one another and by circumferentially extending narrow surfaces 25.3 and 25.4, of which only the sectional views are shown in FIG. 28. The two other narrow surfaces defining the light guide can be imagined as extending parallel below and above the drawing plane.

The light source 24 is, for example, a rod-shaped lamp whose longitudinal dimension is oriented at right angles to the drawing plane. It is positioned in such a way that the beam emanating from it is coupled into the light guide 25 through the narrow surface 25.3. One component $L_2$ of the coupled in beam is reflected back and forth within the light guide and a component $L_2$ is radiated over the large surface 25.1 as useful light. In special cases, the narrow surface 25.4 located opposite the in-coupling can be constructed in a reflecting manner, so that radiation directed toward it is thrown back into the light guide.

In a preferred construction, a reflector 26 is associated with the light source 24 and helps to increase the intensity of the radiation which is directed to the narrow surface 25.3 and which is coupled into the light guide 25.

In order to be able to influence the light density distribution over the radiating large surface 25.1 to a predetermined extent, a coating 27 which interferes with the total reflection is provided, according to the invention, on the large surface 25.2 located opposite the radiating large surface 25.1, this coating 27 comprising individual particles and having an interference capacity which is inhomogeneous over the surface area of the large surface 25.2 between two boundary values. The boundary values of the interference capacity are determined by the density d of the coating 27, wherein the density d is a measure for the average distance of the particles relative to one another per area unit.

FIG. 29 shows an example of how the density d of the coating 27 and therefore its interference capacity, can be structured over the large surface 25.2. In the drawing, the stripes are very wide in order to illustrate the principle. The width of the stripes is preferably appreciably smaller in the actual construction. Here, the large surface 25.2 is shown vertical to the viewing direction B.

The density d which differs over the large surface 25.2 is symbolized by shading with varying distance between the lines. Let it be assumed that the surface regions with greater distances between the shading lines indicate a lower density d and, therefore, a lower interference capacity and that the surface regions with smaller distances between the shading lines indicate a greater density d and a more pronounced interference capacity of the coating 27.

FIG. 29 when compared with FIG. 28 shows that the density d and interference capacity are low near the narrow surface 25.3 through which the light is coupled into the light guide 25, but becomes increasingly greater progressively from surface portion to surface portion with increasing distance x from this narrow surface 25.3.

As a result, the total reflection is disrupted the least in the vicinity of the narrow surface 25.3 because of the lowest density d, but because of the high light intensity at that location a proportion $L_2$ of the light flow exiting from the large surface 25.1 is just as large as the light flow passing through the large surface 25.1 at a greater distance x from the narrow surface 25.3 because, although the light intensity decreases as the distance x increases, more light is coupled out through the radiating large surface 25.1 due to the increasing interference of total reflection.

In other words, the light intensity decreases as the distance x from the narrow surface 25.3 increases, but the interference capacity of the coating 27 increases, as a result of which, given an appropriate design of the density d, the light is radiated with virtually the same intensity over the whole large surface 25.1.

FIG. 30 shows a construction in which the radiation proceeding from another light source 28 is coupled into the light guide 25 additionally through the narrow surface 25.4. In order to render the light radiation uniform over the large surface 25.1 in this case, the second large surface 25.2 is provided with a coating 27 in one arrangement, wherein the interference capacity of this coating 27 in this case is designed so as to increase proceeding from both narrow surfaces 25.3 and 25.4 toward the center of the light guide 25 up to a common maximum. This is shown with reference to FIG. 31.

In this way, the total reflection is interfered with more extensively from surface portion to surface portion as the distance x from the narrow surfaces 25.3 and 25.4 increases and it is ensured that the amount of light which is radiated through the large surface 25.1 as useful light is equal to that near the side surfaces 25.3 and 25.4 in spite of decreasing light intensity toward the surface center.

The coating 27 which is formed of many individual particles can be realized by different materials. For example, it is possible that particles with greater interference capacity are provided and particles with less interference capacity are provided and these two types of particles are applied to the large surface 25.2 in a given quantitative proportion. In surface regions in which the total reflection is to be interfered with more extensively, there are more particles with a higher interference capacity and in surface regions in which the total reflection is to be interfered with less extensively, there are more particles with a lower interference capacity. For example, the particles with higher interference capacity can be dull silver particles and the particles with less interference capacity can be glossy silver particles. They can be applied by means of printing processes, wherein it is advantageous when the glossy silver particles are applied in a first printing process and the dull silver particles are applied in a second printing process.

When using these coatings for a three-dimensional display, for example, according to FIG. 26 and FIG. 27, it is advantageous when some regular patterns are left out of the coating during printing, and wavelength filter elements which are not opaque are arranged in the missing locations.

An alternative construction which can be produced by simple techniques provides a coating 27 formed by a paint or lacquer. In this case, the local lacquer density is equivalent to the interference capacity at the location in question. For example, if the lacquer density is defined by the function $d=f(x)$ then, as was already indicated, x is a measure for the distance from the narrow surface 25.3 and d is a measure for the density with the limiting values $d=0$ and $d=1$, where 1 is the interference capacity with the greatest lacquer density and 0 is the interference capacity with the absent lacquer layer. For example, in $$d=f(x)=a_3 \cdot x^3 + a^2 + a_1 \cdot x + a_0,$$

the parameters $a_0$, $a_1$, $a_2$ and $a_3$ are elective. The following parameter sets have proven successful in connection with the arrangement according to FIG. 28:

$$a_0=0;\ a_1=0.5;\ a_2=2;\ a_3=-0.5; \quad (1)$$

$$a_0=0;\ a_1=0;\ a_2=1;\ a_3=0; \quad (2)$$

$$a_0=0;\ a_1=0.5;\ a_2=-0.5;\ a_3=1. \quad (3)$$

The following can be advantageously given for the arrangement according to FIG. 30:

$$a_0=0;\ a_1=4;\ a_2=-4;\ a_3=0. \quad (4)$$

The density distribution is shown in FIGS. 32 to 35 for parameter sets (1) to (4) as a function of the distance x. The parameters are basically freely selectable. However, care must be taken that the function d=f(x) in the definition range ($x_{min}$, $x_{max}$) gives values where $0 \leq d \leq 1$. The values $X_{min}$ and $x_{max}$ superficially describe the horizontal dimension of the large surface 25.2 to be painted.

Figure 32:
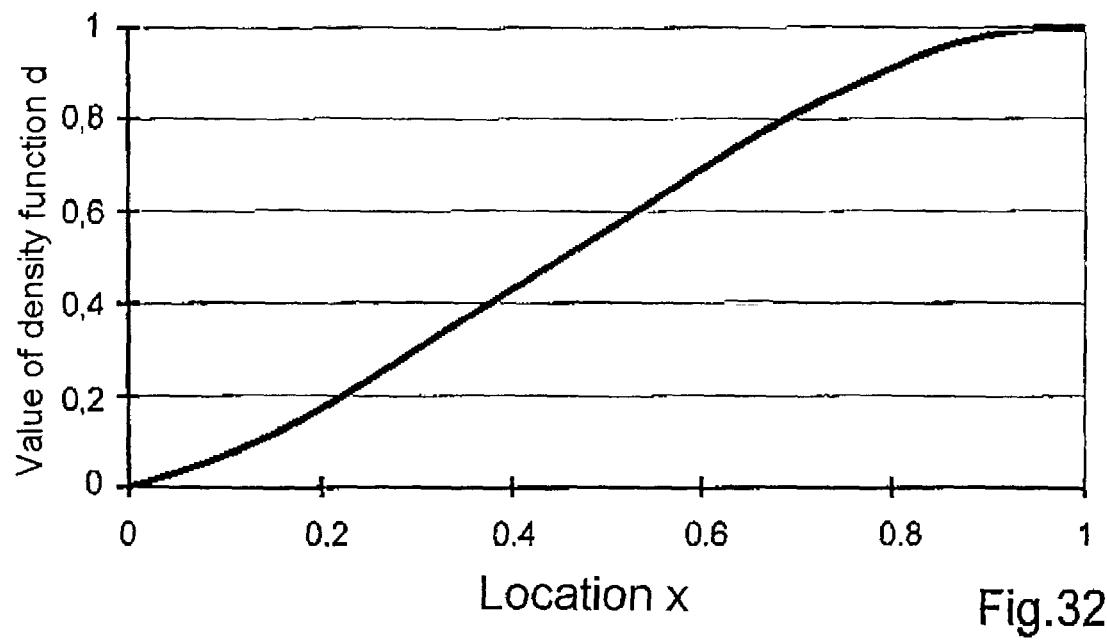
FIGS. 32 to 34 show examples for different density distributions in the construction of the flat illumination source according to FIG. 28 and coating according to FIG. 29.
Figure 33:
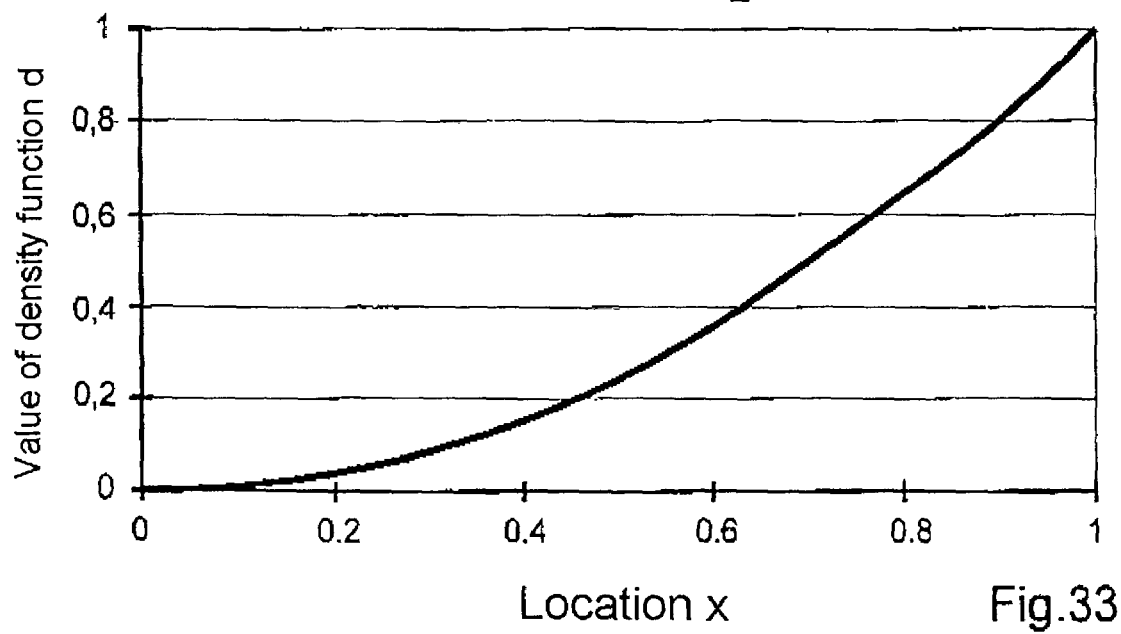
Figure 34:
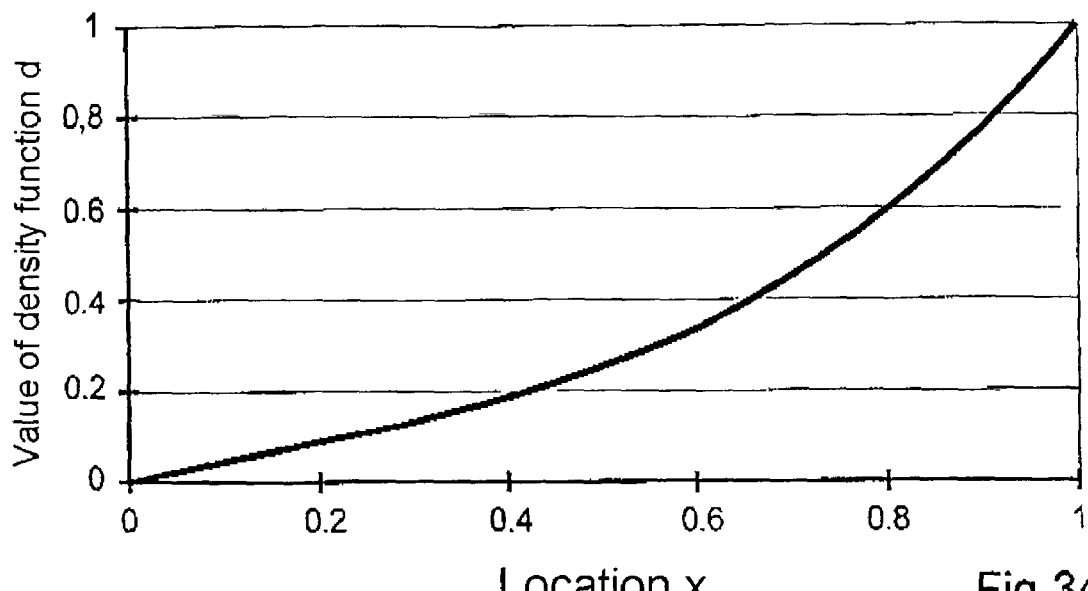
Figure 35:
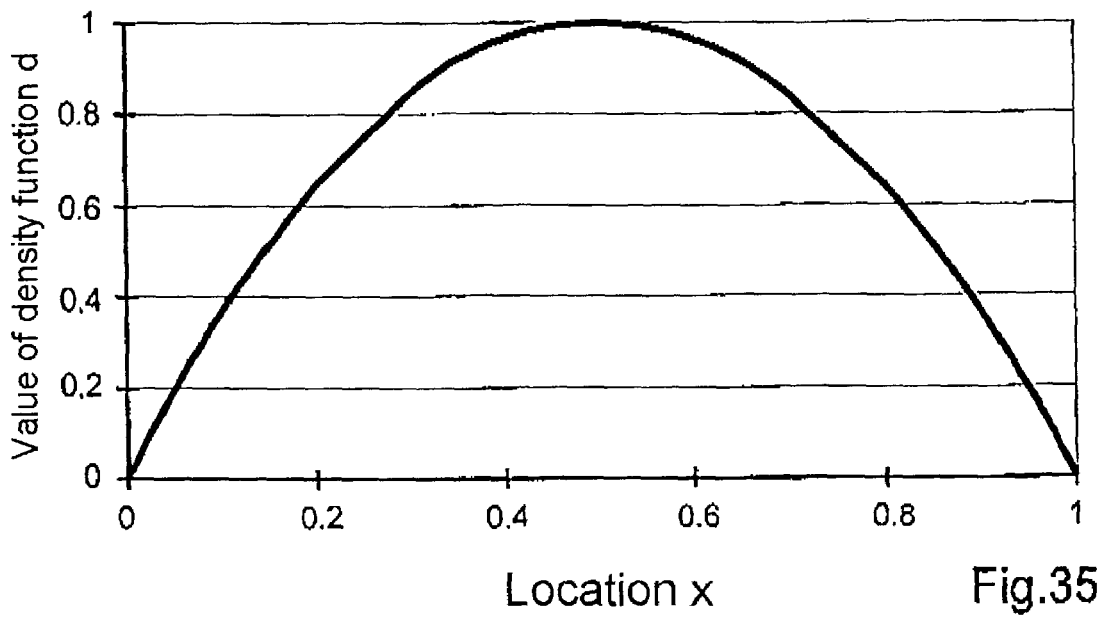
FIG. 35 shows an example for the density distribution in the construction of the flat illumination source according to FIG. 30 and coating according to FIG. 31.

On this basis, the value $X_{min}=0$ is assigned to the position of the narrow surface 25.3 and the value $x_{max}=1$ is assigned to the position of the narrow surface 25.4 in FIGS. 32 to 35. The smallest density $d_{mn}=0$ is at $x_{min}=0$, that is, always at the narrow surface 25.3 or 25.4 into which light is coupled. The maximum density $d_{max}=1$ is always at the greatest distance from the narrow surface 25.3 or 25.4 into which light is coupled. In FIGS. 32 to 34, this is only the narrow surface 25.3; therefore, the density $d_{mm}0$ is always only at $x_{min}=0$. In FIG. 35, light is coupled into both narrow surfaces 25.3 and 25.4; therefore, the density $d_{min}=0$ is at $X_{min}=0$ and at $X_{max}=1$, but the density $d_{max}=1$ is at location x=0.5.

When using light sources 24, 28 which radiate light in direction y (see FIGS. 29 and 31) with inhomogeneous intensity, it can be provided according to the invention that the density d can be varied not only in direction x but also in direction y, so that the density function then takes on the form d=f(x,y).

In this way, the large surface 25.2 has a denser coating 27 within the light guide 25 at locations with lower light intensity, wherein the total reflection is interfered with more extensively at that location and the intensity of the useful light radiated through the large surface 25.1 is thus increased. On the other hand, a lower density d and accordingly a lower interference capacity is provided at locations of higher intensity along the coordinate y, wherein a sufficient quantity of light nevertheless passes outward through the large surface 25.1 as useful light. Accordingly, the radiated quantity of light is rendered more uniform also in the direction of coordinate y.

Of course, the coating 27 can be used not only to render the amount of light radiated through the large surface 25.1 more uniform, but primarily it can also be achieved by varying the density d, when this density d is predetermined in an appropriate manner, that light is radiated through preferred surface portions of the large surface 25.1 with a higher light intensity than through surface portions that are not preferred. In this way, depending on presets, light structures and light figures can be generated which stand out from their surroundings on the large surface 25.1 because of greater or lesser brightness. Accordingly, to give a simple example, a particularly bright spot can be achieved in the center of the radiating large surface 25.1.

As an alternative, the entire large surface 25.2 can be painted or given a reflective coating in a substantially homogeneous manner, so that a particularly large amount of light is radiated through the large surface 25.1, although not with homogeneous distribution.

Figure 36:
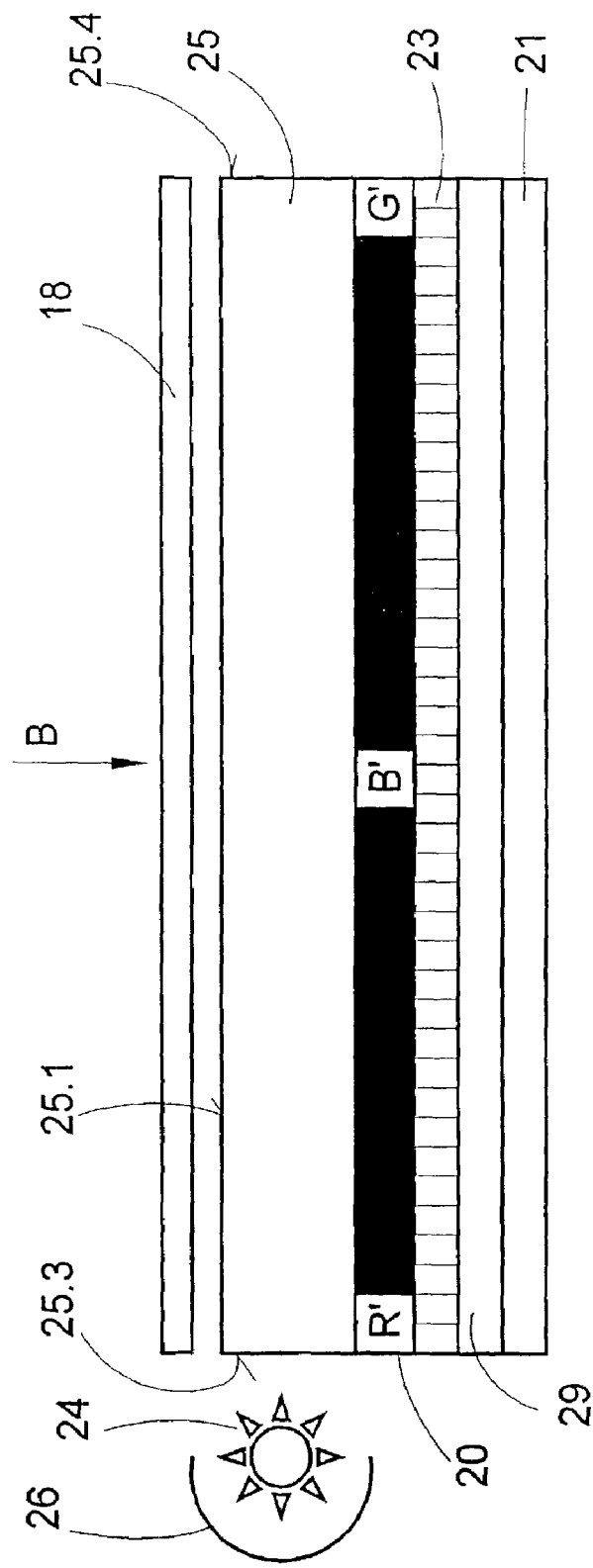
FIG. 36 shows an arrangement according to the invention as shown in FIG. 27 with integrated flat illumination source in the arrangement according to FIG. 28, but without coating.

With reference to FIG. 36, an embodiment example of the arrangement according to the invention for selective three-dimensional or two-dimensional display of a scene/object is described in detail in the following, wherein an illumination source is integrated in the construction according to FIG. 28. The coating 27 is not absolutely required in this construction. If it is applied, however, then the silver particles mentioned above are preferably used with different characteristics with respect to the interference of total reflection. In an alternative construction, it is possible to design the coating 27 in the form of a lacquer layer which forms the filter array at the same time. However, for use in the arrangement for three-dimensional display, patterns must be left out in both constructions so as to correspond to the structure of the wavelength filter array that is used in such a way that there is preferably a cutout or missing portion on the filter elements which are not opaque.

In FIG. 36, there is arranged in the viewing direction B of the observer first the image reproducing device 18 in the form of a translucent LC display, then the light guide 25, a wavelength filter array 20 and the flat illumination source 21, wherein the latter can be constructed, for example, as a Planon light tile (manufacturer: OSRAM).

A diffusion screen 29 is arranged between the flat illumination source 21 and the wavelength filter array 20 to render homogeneous the intensity of the radiation proceeding from the flat illumination source 21.

FIG. 36 again shows the light source 24, already mentioned in the preceding embodiment example, which is arranged near the narrow surface 25.3 of the light guide 25 and which has the reflector 26 for coupling radiation into the light guide 25. The light source 24 as well as the flat illumination source 21 are coupled with separately controllable on/off switches, so that it is possible to operate either only the light source 24 or only the flat illumination source 21, or both. Accordingly, as was already described, the first and second operating modes can be realized and the scene/object can be displayed two-dimensionally or three-dimensionally over a whole surface. As was already shown, the third operating mode is possible with the separate control of a selection of individual shutter elements of the shutter 23 (see the description relating to FIG. 26).

In the first operating mode, in which the flat illumination source 21 is switched on but the light source 24 is switched off, the illumination light reaches the eyes of the observer through the wavelength filter array 20, the light guide 25 and the image reproducing device 18, wherein both eyes are offered different image information predetermined by the position p,q of the filter elements relative to the positions ij of the associated image elements, and a three-dimensional impression of the scene or object displayed on the image reproducing device is brought about for the observer. The shutter is controlled (open) in this case.

In the second operating mode, only light source 24 is switched on. As a result, the light reaching the observer is exclusively light which, coming from the large surface 25.1, has passed the image elements of the image reproducing device 18 and carries along image information, but has not passed the wavelength filter array 20. Accordingly, there is no selection and predetermination of direction for selected image information and assignment of the latter to the right eye or the left eye of the observer, so that the scene/object is perceived two-dimensionally and not three-dimensionally.

In the third operating mode, the light source 24 and the flat illumination source 21 are switched on. As has already been described, a predetermined quantity of shutter elements is controlled in such a way that the illumination light reaches the observer in selected areas through the filter elements and through the associated image elements and consequently with a predetermined propagation direction, while the illumination light in the regions of the shutter elements that are not controlled reaches the observer only through the image reproducing device, but not through associated filter elements and, consequently, not with predetermined propagation direction. Accordingly, the scene/object can be perceived two-dimensionally in regions of the shutter elements that are not controlled, while it is perceptible three-dimensionally in regions of the controlled shutter elements.

The coating 27 which is preferably formed of dull and glossy silver particles in the present selected example ensures in this case that as much useful light as possible is radiated over the large surface 25.1. The density structure of the coating 27 is formed as in FIG. 29, for example, so that the intensity of the useful light radiated over the large surface 25.1 is as uniform as possible over the entire large surface 25.1 and, in so far, a uniformly distributed image brightness is ensured. However, as was already mentioned, the coating 27 in this embodiment example is not strictly required.

Cylindrical lenses (not shown) or a diffusion screen can be provided in front of the narrow surface 25.3 so that light from the light source 24 is coupled into the light guide 25 more uniformly.

Another embodiment example for switching between 2D and 3D will be explained in the following with reference to FIG. 37. In the arrangement according to FIG. 37, the side 20.1 of a wavelength filter array 20 remote of the flat illumination source 21 is coated with scattering surface elements 30. The scattering surface elements 30 are worked into a disk having a thickness of 0.5 mm by etching, for example, and this disk (not shown in particular) is connected with the wavelength filter array 20.

The etching is provided only in surface regions corresponding to the opaque filter elements designated by S in FIG. 2. The rest of the filter elements, designated by R',G',B', remain without this etching or scattering surface elements 30 and inasmuch are completely transparent.

Additional light sources 31 are positioned laterally adjacent to the outer surface of the wavelength filter array 20 that is structured in the manner described above, namely, such that the radiation proceeding from it impinges on the scattering surface elements 30. Reflectors 32 can also be associated with the additional light sources 31 and provide for an increase in the intensity of the radiation directed to the scattering surface elements 30.

Rod-shaped lamps are preferably used as light sources 31. Care must be exercised in positioning the light sources 31 such that the side 20.2 of the wavelength filter array 20 facing the flat illumination source 21 is not illuminated by the latter.

When the light sources 31 are switched on, the light emanating from them impinges on the scattering surface elements 30 and also illuminates the image-displaying raster of the image reproducing device 18 relatively diffusely and homogeneously because of the relatively small distance of only 3 mm between the wavelength filter array 20 and the image reproducing device 18.

The flat illumination source 21 and the light sources 31 can also be switched on and off separately in this case, so that the first and second operating modes can be adjusted as was already mentioned.

In the first operating mode, only the light sources 31 are switched on, while the flat illumination source 21 is switched off. In this operating mode, the image or scene shown on the image reproducing device 18 is perceptible two-dimensionally because the light reaching the observer from the image reproducing device 18 is not influenced with respect to its direction by the assignment of filter elements and image elements but rather radiates uniformly through the image reproducing device 18 and the light from all of the image elements reaches the eyes of the observer with equal access.

In the second operating mode, the light sources 31 are switched off. The image reproducing device 18 is illuminated exclusively by the flat illumination source 21 through the wavelength filter array 20. In this operating mode, a direction selection takes place because of the position correlation of filter elements and image elements which, as was described, ensures that only selected image information is visible to each eye of the observer and the observer accordingly receives the three-dimensional impression.

In order to realize the third operating mode, a shutter can again be provided between the flat illumination source 21 and the wavelength filter array 20, which shutter is formed of a plurality of individually controllable shutter elements which block or release predetermined regions of the light path as needed. The switching on and switching off of the lamps and shutter elements can be controlled via processors by means of software in all of the cases described. In this case, the flat illumination source 21 is preferably brighter than the light sources 31, i.e., the resulting luminous density per area unit of the flat illumination source 21 is higher than that of the light sources 31. This can be achieved by means of dimmers arranged in the power supply circuit.

Figure 38:
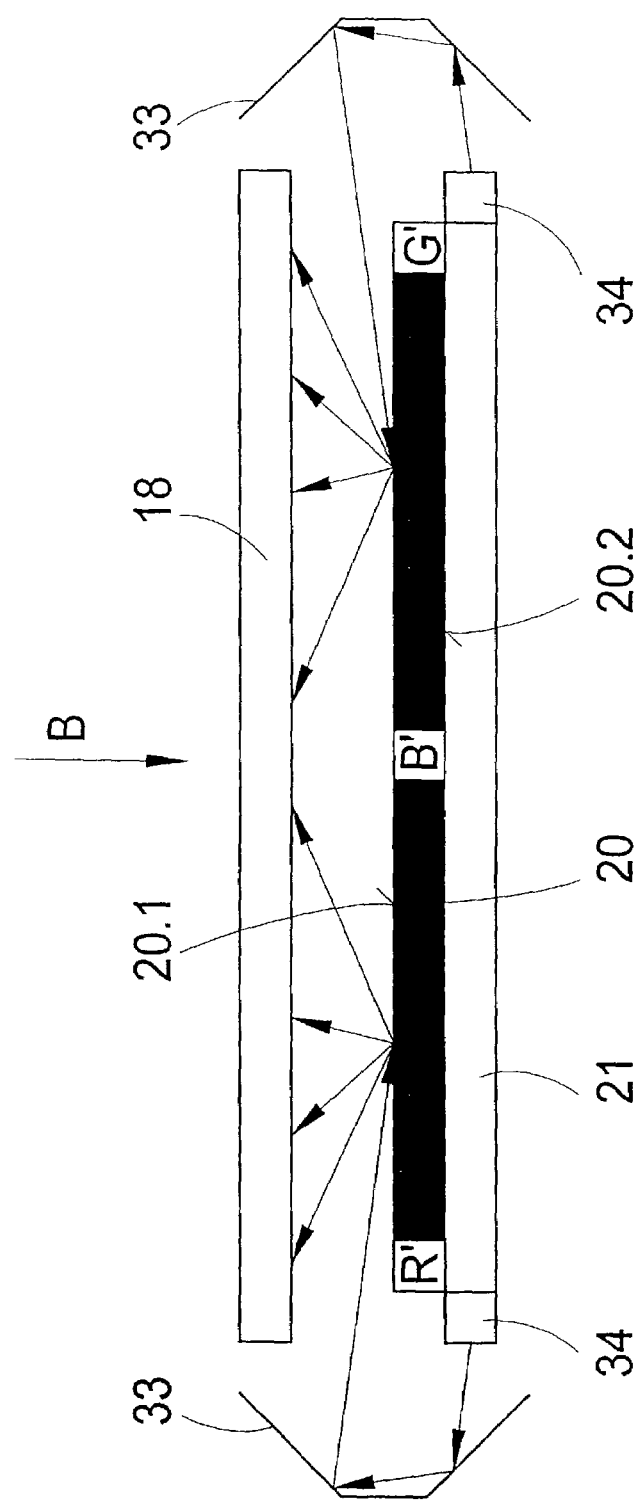
FIG. 38 shows another example for the outfitting of the illumination device with scattering or reflecting surface elements, a flat light source and additional reflectors.

As is shown in FIG. 38, it can also be provided in a special construction that only the flat illumination source 21 is present and the light exiting from the narrow surfaces of the flat illumination source 21 can also reach the surface 20.1 of the wavelength filter array 20 remote of the flat illumination source 21 via reflectors 33 which are arranged lateral to the wavelength filter array 20.

The reflectors 33 are adjusted in a fixed manner in such a way that the radiation which exits from the narrow surfaces of the flat illumination source 21 and is directed to the reflectors 33 is always deflected by the latter and directed onto the surface 20.1 of the wavelength filter array 20. Controllable shutters 34 are provided between the light-emitting narrow surfaces and the reflectors and block or release this light path depending on control. When the light path to the reflectors is released, the scene/object is perceptible two-dimensionally and the light path is perceptible three-dimensionally when the light path is blocked.

In a further development which is not shown in the drawing, the shutters 34 are absent, but the reflectors 33 are mounted so as to be swivelable. The radiation coming from the flat illumination source 21 in a first swiveling position is not directed to the surface 20.1 of the wavelength filter array 20 and in a second swiveling position it is also directed to the surface 20.1 of the wavelength filter array 20.

In this way, it is ensured in the first swiveling position that the light coming from the flat illumination source 21 reaches the observer through the wavelength filter array 20 as well as through the image reproducing device 18, while in the second swiveling position light which, as was mentioned above, is not influenced by the correlation of filter elements with image elements, also reaches the observer. Accordingly, three-dimensional perception is possible in the first case and two-dimensional perception is possible in the second case.

Figure 37:
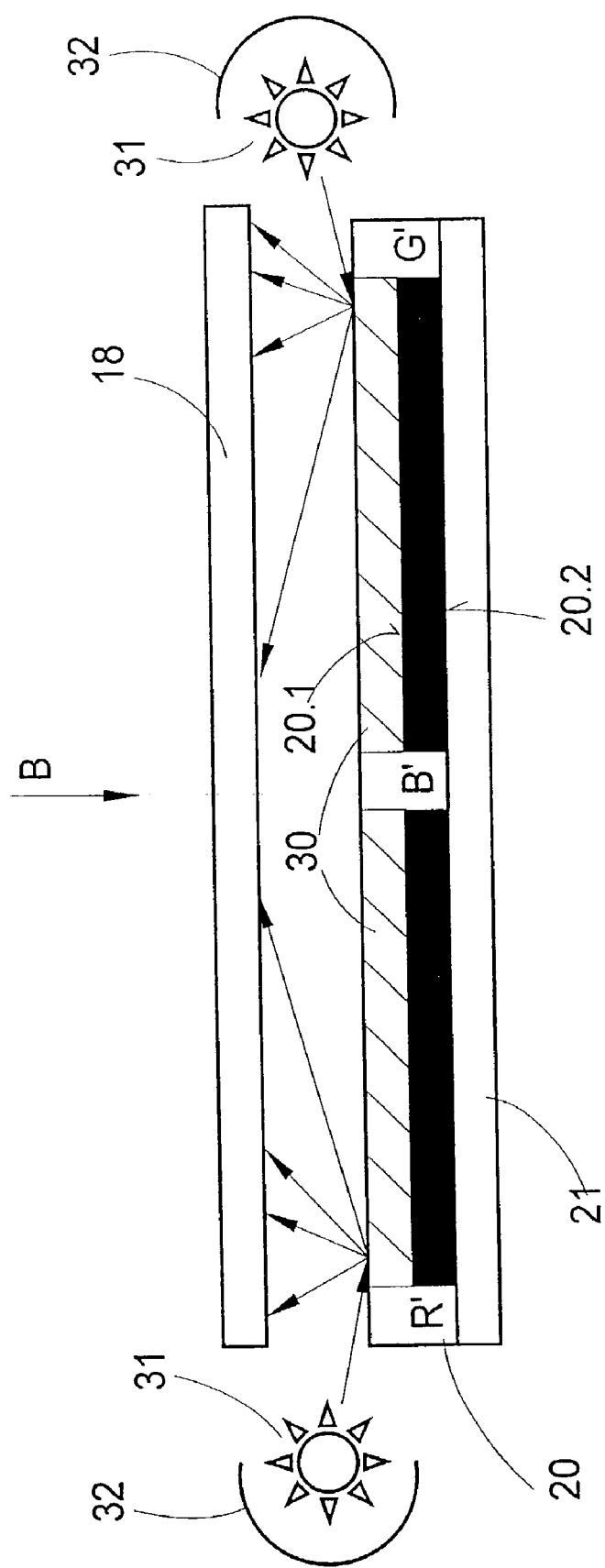
FIG. 37 shows an example for the outfitting of the illumination device with scattering or reflecting surface elements.

As in the construction according to FIG. 37, scattering surface elements 30 can also be provided in this case on the surface 20.1 of the wavelength filter array 20, preferably on the opaque surface regions (see FIG. 2) designated by S, wherein the laterally radiated light of the scattering surface elements 30 reaches the observer in a uniform manner on the back of the image reproducing device 18 and then through the latter. Reflecting surface elements can also be provided as an alternative to the scattering surface elements.

It also lies within the framework of the invention when reflecting surface elements are also applied to the side 20.2 of the wavelength filter array 20 which faces the flat illumination source 21, so that it is achieved that incident light is reflected by the surface 20.2 above a determined limiting angle, but approximately vertically incident light is transmitted below this limiting angle.

In this way, the light impinging obliquely on the wavelength filter array 20 can be used partly to illuminate the scattering surface elements 30 by means of laterally arranged reflectors, while light still passes through the wavelength filter array 20 nevertheless.

In other, different arrangements of the invention, it is also possible to use a black-and-white display instead of a color display by exclusive use of neutral filters in the filter array. In this connection, another embodiment example for switching between 2D and 3D in which neutral filters are used will be described in the following based on the construction, shown in FIG. 10, of the arrangement according to the invention.

As is shown in FIG. 10, the filter array 8 with the filter elements $\beta_{pq}$ is located at a distance z in front of the image-displaying color LC display 2 as seen from the position of the observer 1. The color LC display 2 is connected with the flat illumination device 4 located behind it to form a constructional unit. The propagation directions of the light coming from the subpixels R,G,B of the color LC display 2 and radiating through the corresponding filter elements $\beta_{pq}$ of the filter array 2 intersect in the observation space 7 in a plurality of observation positions from which the displayed object or scene is perceptible three-dimensionally.

FIG. 39 shows an example of the construction of the filter array 8 as a filter array with individual neutral filters $L_0$, $L_2$ and $L_4$. For purposes of visibility, this view is shown in a highly magnified manner and is not drawn true to scale. The partial surfaces correspond to neutral filters which transmit 0% ($L_0$), 50% ($L_2$) and 100% ($L_4$) of the incident light (in relation to the light intensity) in a wavelength-independent manner. The partial surfaces are shown in a simplified manner as squares; an exact illustration of the shape of the neutral filters $L_0$, $L_2$, $L_4$ has been omitted. They are preferably rectangular and have, for example, a width of 99 µm and a height of 297 µm.

The filter array structure shown in FIG. 39 can be generated on the basis of equation (F2) in which the values $d_{pq}=-1=$const. and $n_m=8$ are used as parameters. The transmission characteristics $\lambda_b$ are selected as follows:

$\lambda_8$ corresponds to a wavelength-independent 100%-transmitting filter ($L_4$ in the drawing), i.e., the transmission factor is 100%;

$\lambda_1$ and $\lambda_2$ correspond to wavelength-independent 50%-transmitting filters ($L_2$ in the drawing), i.e., the transmission factor is 50%;

$\lambda_2 \ldots \lambda_6$ correspond to wavelength-independent non-transmitting (opaque) filters ($L_0$ in the drawing), i.e., the transmission factor is 0%.

The transmission characteristics are decisive in this connection particularly with respect to the visible spectrum, i.e., an $L_4$ filter can be non-transparent for electromagnetic radiation, for example, in the UV range.

FIG. 3 shows an example for the combination of partial information of different views $A_k$ (k=1 . . . 8) in a top view of the raster of the color LC display 2 which was generated according to the function (F1) described above with parameters $c_{ij}=-1=$const. and n=8 and which is well-suited for three-dimensional display in connection with a filter array structure according to FIG. 39.

FIG. 40 shows a filter array 8 which has neutral filters (L2) which transmit—with respect to light intensity—about 50% of the light passing through it in a wavelength-independent manner. The filters L0 are opaque while the filter elements R',G',B', incorporated by way of example, are permeable to light in the color ranges red, green or blue.

Here again, it is possible to use transparency wavelength regions completely different from R',G',B' for the filter elements which, moreover, need not remain limited to the range of visible light.

Figure 42:
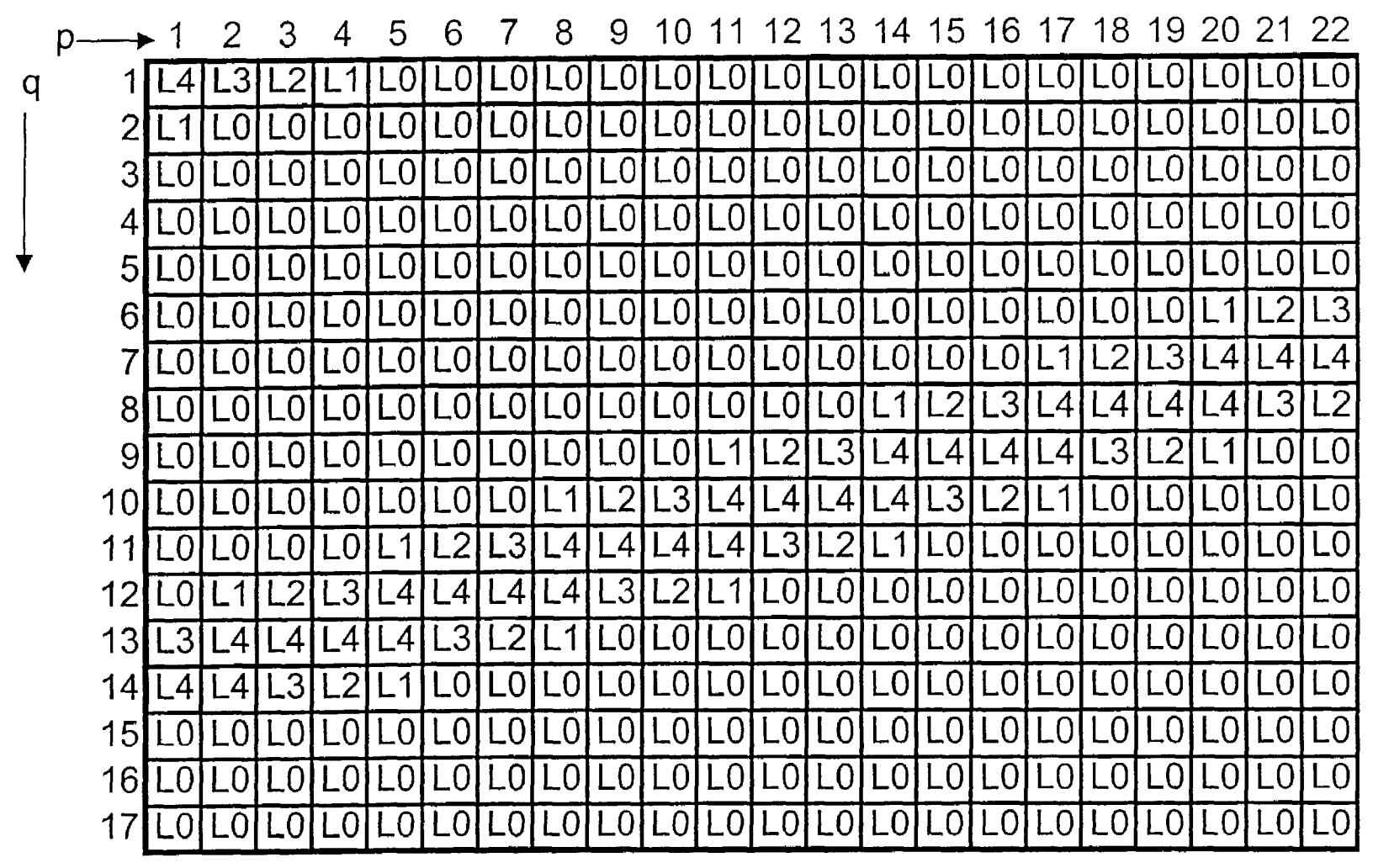

Another possibility for image combination is shown schematically in FIG. 41. In this case, n=40 views are used. FIG. 42 shows, by way of example, a filter structure for this image combination which is favorable for three-dimensional display. Wavelength-independent neutral filters are used for attenuating the light intensity and transmit 0% (L0), 25% (L1), 50% (L2), 75% (L3) or 100% (L4) of the (visible) light impinging on them. In this embodiment example, the filters preferably have about one fourth of the width of the image elements $\alpha_{ij}$, that is, the subpixels, while they are dimensioned with respect to height in exactly the same way as image elements $\alpha_{ij}$.

In particular, an arrangement of the type mentioned above has the advantage that one eye of the observer sees almost all of the displayed image information of a determined group of views (multiplied by additional image information of the next adjacent views, but predominantly views of the determined group are seen as a whole) from almost every observation position.

Figure 44:
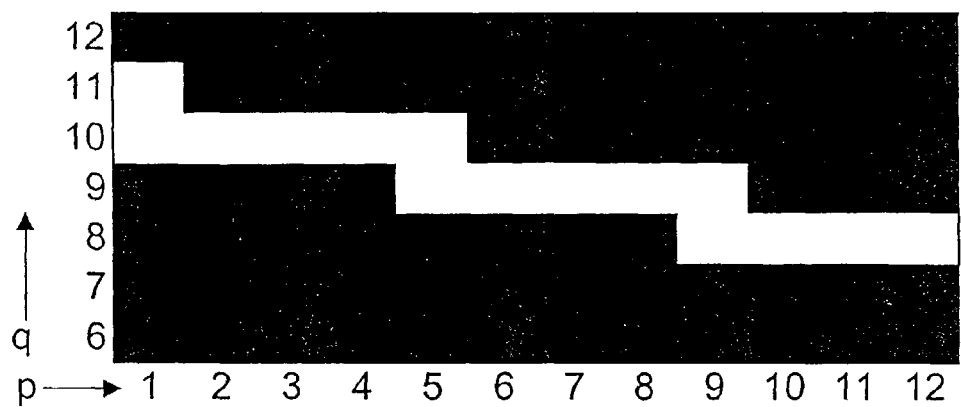
FIG. 44 shows the section of a filter array for the embodiment example according to FIG. 43, wherein a filter element has roughly one fifth of the width of an image element.

A combination image which is advantageous in some cases and uses n=40 views is shown by way of example in FIG. 43. A corresponding filter array is shown in FIG. 44. The width of the filter elements $\beta_{pq}$ is only about one fifth of the width of the image elements $\alpha_{ij}$ in this case.

Figure 45:
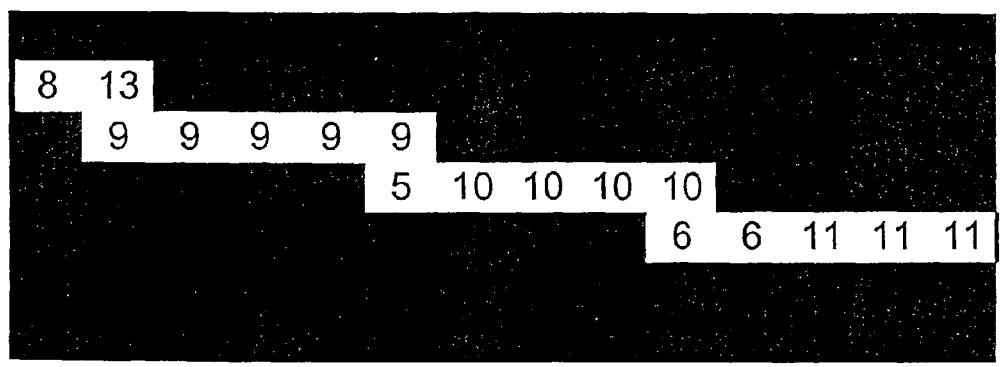
FIG. 45 shows the selection from views $A_k$ (k=1 . . . n) which is predominantly visible, for example, for one eye of the observer in the embodiment example according to FIGS. 43 and 44.

It will be seen from FIG. 45 that one eye of an observer sees predominantly a first selection of views $A_k$ (k=1 . . . n), wherein the visibility of one of these views predominates and other views, which in this case are not adjacent, are also partially seen. However, the view in FIG. 45 is idealized; actually, the components that are visible under the filter array of the image elements $\alpha_{ij}$ (or subpixels on which the corresponding image information is reproduced) are always somewhat more or somewhat fewer than those shown herein depending on the observation distance.

Other constructions of this kind are possible, for example, with n=60, n=72, n=90 or n=110 views.

FIG. 46 shows another embodiment example of a filter array. A wavelength filter element $\beta_{pq}$ has about one fifth of the width of an image element $\alpha_{ij}$, wherein not only transparent-opaque filters are provided in the filter array, but also color wavelength filter elements $\beta_{pq}$, e.g., R',G',B'. A brighter image is achieved in this way. An image combination rule which is well-suited for this purpose is shown in a section in FIG. 43.

It is known from the prior art to show a stereoscopic view to an observer in which one of its half-fields has good image resolution and the other has poor image resolution; nevertheless, as a rule, the observer subjectively perceives the three-dimensional image with the high resolution.

Figure 48:
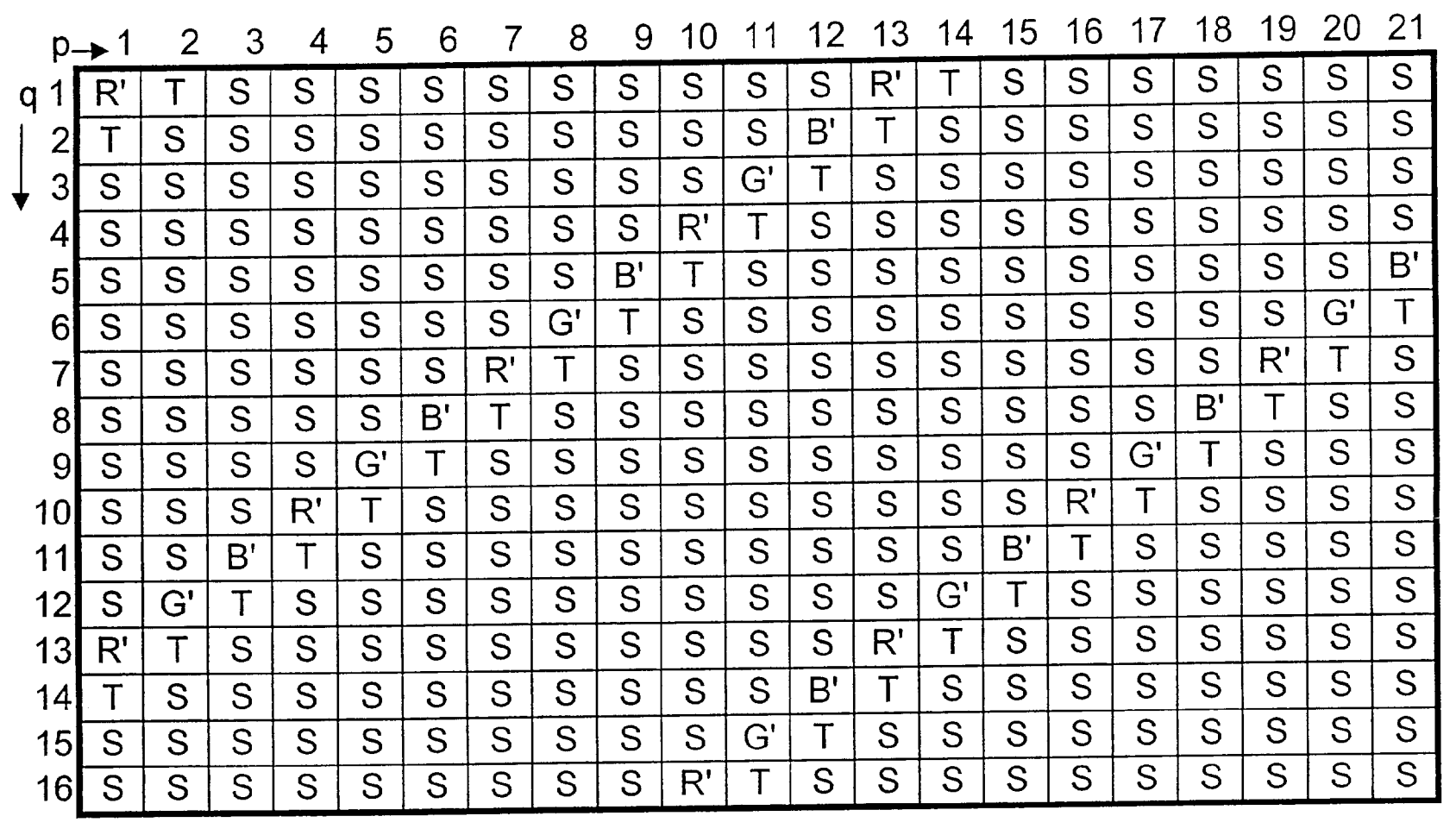

An image combination structure, given by way of example, which makes use of the effect described above and which is based on n=8 views is shown in a section in FIG. 47. In a corresponding manner, a filter array which is shown in section in FIG. 48 can be used. An advantageous effect of an arrangement of this kind consists in that the image information of every odd-numbered view has a higher resolution than the even-numbered views.

In this connection, an observer in most cases sees, with at least one eye, predominantly image elements of an odd-number view in the center because the probability of seeing predominantly components of even-numbered views with both eyes is comparatively small. The image resolution which is subjectively perceived by the observer can be increased in this way.

Figure 49A:
FIGS. 49a–c show different examples for illustrating possible constructions of filter elements $\beta_{pq}$.
Figure 49B:
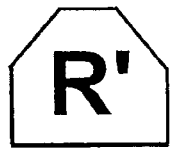
Figure 49C:
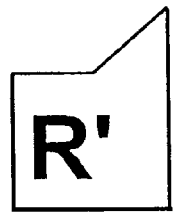

FIGS. 49a, 49b and 49c show examples of polygonal filter elements. These polygonal shapes, or others, can help to reduce Moiré effects and are easy to produce when manufacturing the filter array—in contrast, for instance, to changing the external shape of image elements in LC displays or plasma displays.

In order for an observer selected from among other observers to see almost exclusively the middle views of views $A_k$ (k=1 ... n) in spite of a changing eye position, a device for displacing the filter array vertical to the viewing direction of this observer is provided in a special embodiment example.

Figure 50:
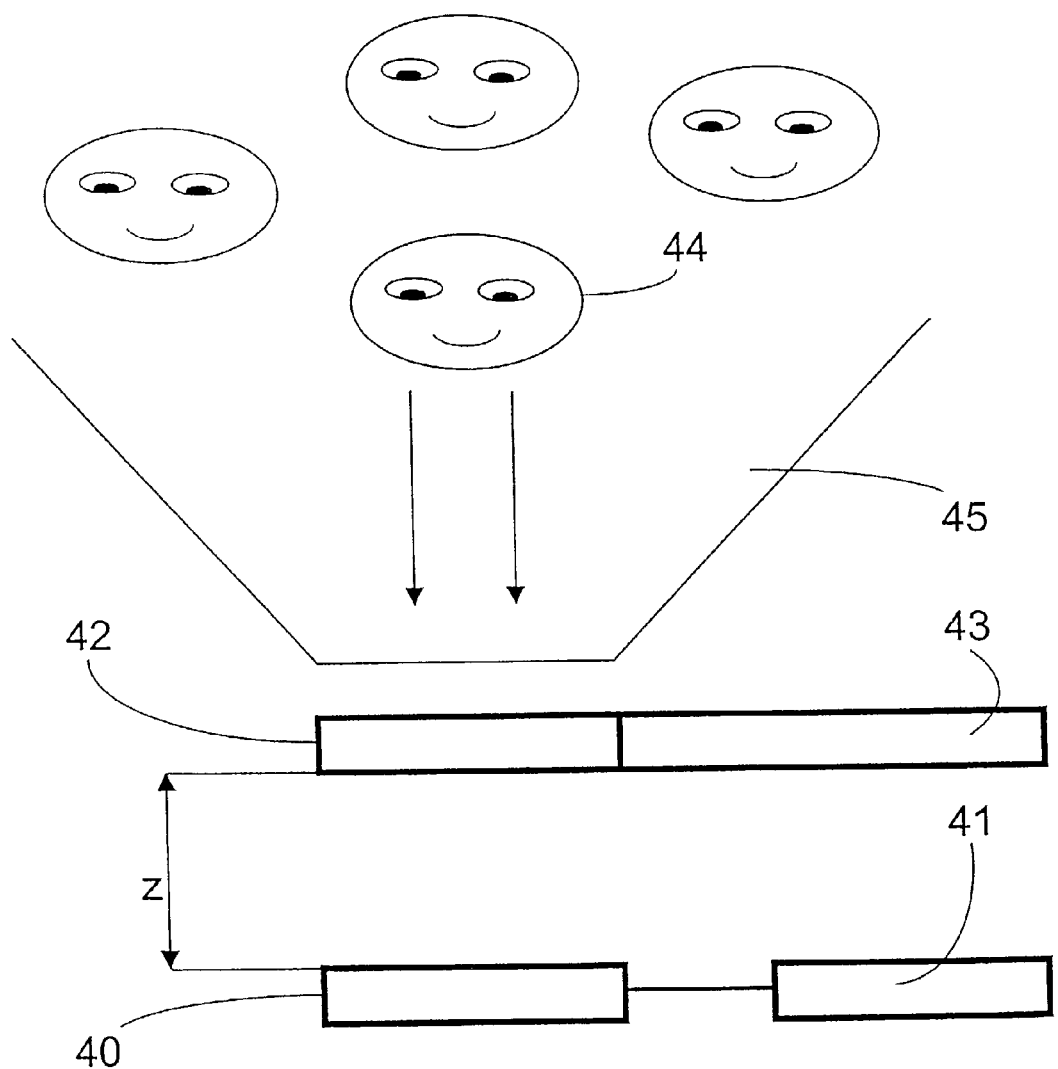
FIG. 50 shows an embodiment example of an arrangement according to the invention with a wavelength filter array which is located in front of an image reproducing device in the viewing direction of the observer and which can be moved laterally by a displacing device.

As is indicated schematically in FIG. 50, an arrangement of this type comprises a color LC display 40 for image reproduction with a control circuit 41 and a filter array 42 which is coupled with a mechanical displacement device 43 for displacement vertical to the viewing direction of the selected observer 44 who is stationed in the observation space 45 along with other observers.

In one example of the arrangement, the displacement device 43 comprises a stepper motor (with a corresponding control) and guide rails for the filter array 42. The filter array 42 is laminated on a carrier, e.g., a pane of glass. This pane of glass with the filter array 42 is guided at its upper edge and lower edge in a rail, wherein additional means for reducing friction (e.g., rollers) can be provided.

A tracking device (not shown in the drawing) for real-time detection of the eye position of a selected observer 44 supplies information for the control unit of the displacement device 43 via a computation device. This displacement device 43 causes the progressive displacement of the filter array 42 with the aim that the selected observer 44 always perceives predominantly the same views $A_x$ and $A_y$ from views $A_k$ (k=1 ... n), which views $A_x$ and $A_y$ differ in pairs.

The inertia or hysteresis of this control loop comprising the tracking and displacement device 43 is compensated in that the views located next to the middle views $A_x$ and $A_y$ mentioned above still give a correct 3D impression for the selected observer 44 when the displacement is too slow or when displacement of the filter array 32 overshoots compared with the exact target position that is aimed for. This can be advantageous especially when a large-format screen (e.g., a plasma display of the type mentioned above) is to be fabricated as a 3D screen, because in such cases the mass and therefore the inertia of the filter array 42 (and of the carrier material, as the case may be) and the inertia or hysteresis of said control loop can be particularly large.

While the selected observer 44 always sees essentially views $A_x$ and $A_y$, the other observers can also perceive an orthoscopic, autostereoscopic 3D image. When the selected observer 44 moves, only the perspective of the rest of the observers changes. In the event that an observer enters the transitional zone of the views, the jump point, as it is called, in which the cycle or period of views which are perceptible horizontally adjacent to one another starts again (i.e., in the area of the transition between the last view $A_n$ and the first view $A_1$), this observer can enter an orthoscopic viewing region again by a slight lateral movement of the head.

This arrangement offers many advantages over the prior art. In particular, a selected observer 44 can see a correct three-dimensional image always from essentially the same perspective without the help of spectacles. Pseudoscopic phenomena can be prevented for this selected observer even when using very large image display devices and the comparatively large optical components required for three-dimensional perception, while many of the rest of the observers can view the same scene three-dimensionally without auxiliary means.

In another construction, not only is the filter array displaced, but the image content, i.e., the views and the resulting combination image, can also be recalculated constantly and preferably in real time corresponding to the position of the selected observer. In this way, it is possible for the selected observer to walk around the displayed three-dimensional scene to a certain extent.

An arrangement of this kind can be used particularly to provide a person entrusted with an important task, for instance a surgeon, with the same perspective continuously and, moreover, with a three-dimensional view which is always correct, while an audience or auditorium also sees a three-dimensional image, although one which can change slightly in perspective. This audience could be, e.g., a group of medical students attending an operation.

In another embodiment example of the arrangement according to the invention, a plasma display, for example, a Pioneer PDP-502MXE, is provided for showing the partial information of views $A_k$ (k=1 ... n) on image elements $\alpha_{ij}$ in the raster (ij).

A construction of the type mentioned above is shown schematically in FIG. 51, not true to scale. The plasma display 35 shown here with the frame 36 is controlled by electronics, not shown, in such a way that the image elements $\alpha_{ij}$ of the raster (ij) take their image information from the perspective views according to the combination rule shown in section in FIG. 41. The raster (ij) relates to the arrangement of the image elements $\alpha_{ij}$ as RGB-subpixels of the plasma display, i.e., column i=1 contains exclusively red image elements (subpixels), while column i=2 contains exclusively green image elements (subpixels), followed by the blue subpixels in the next column i=3, and so on. This is indicated by the letters R,G,B in FIG. 41.

Figure 52:
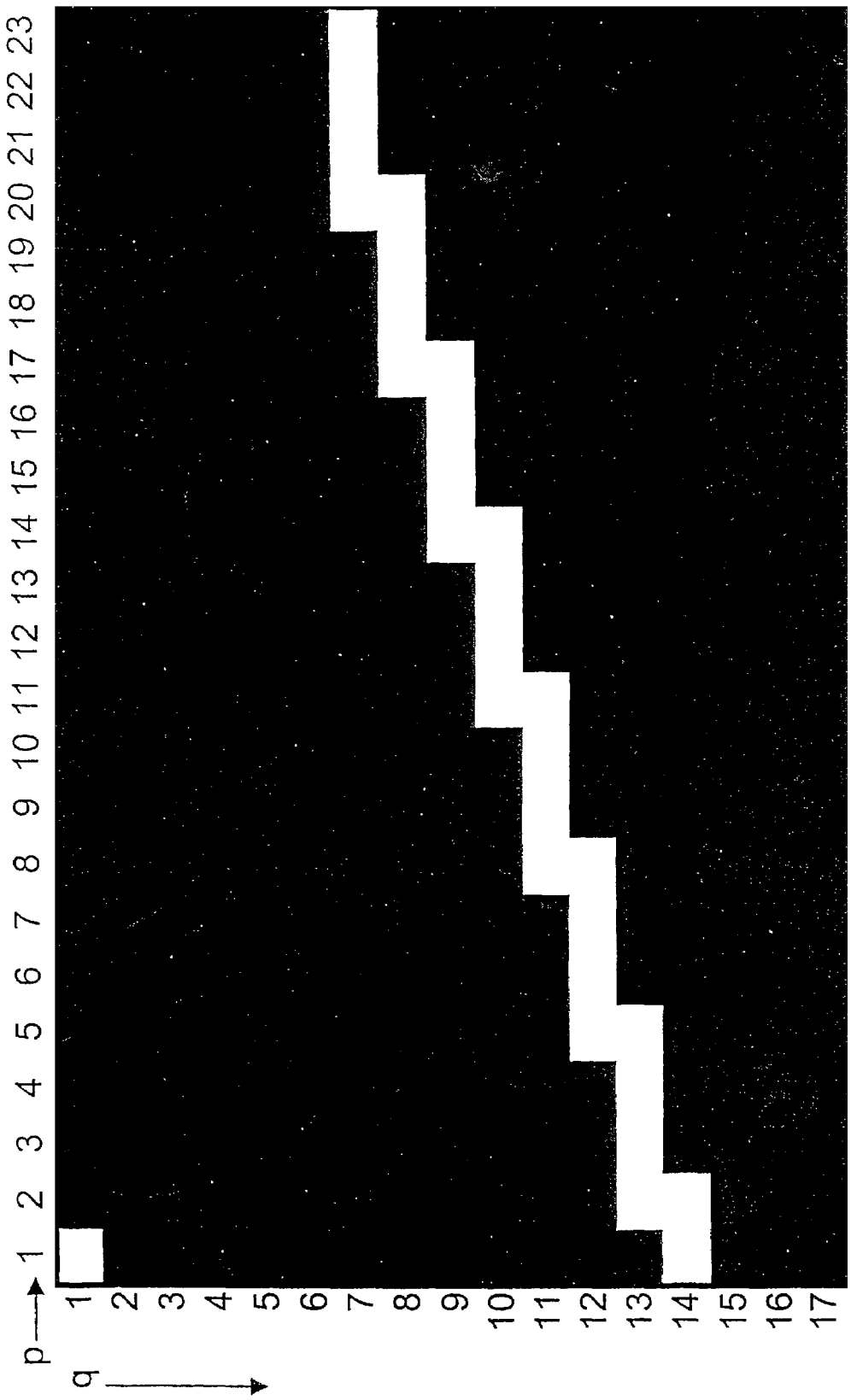
FIG. 52 shows an example of a possible structure of the wavelength filter array, where n=40, using exclusively opaque and transparent wavelength filter elements $\beta_{pq}$ which are highly suited for three-dimensional display of a combination image according to FIG. 41.

The carrier material 37 with a filter structure in the form of a filter array 38, of which a section is shown, not true to scale, in FIG. 52, is located at a distance z in front of the plasma display 35. It is necessary to take into account the difference between the raster (ij) for the image elements $\alpha_{ij}$ and the raster (p,q) for the surface elements of the filter array structure, particularly as concerns the width of the surface elements of the two rasters (ii) and (p,q) in the physical construction (see the following).

Figure 51:
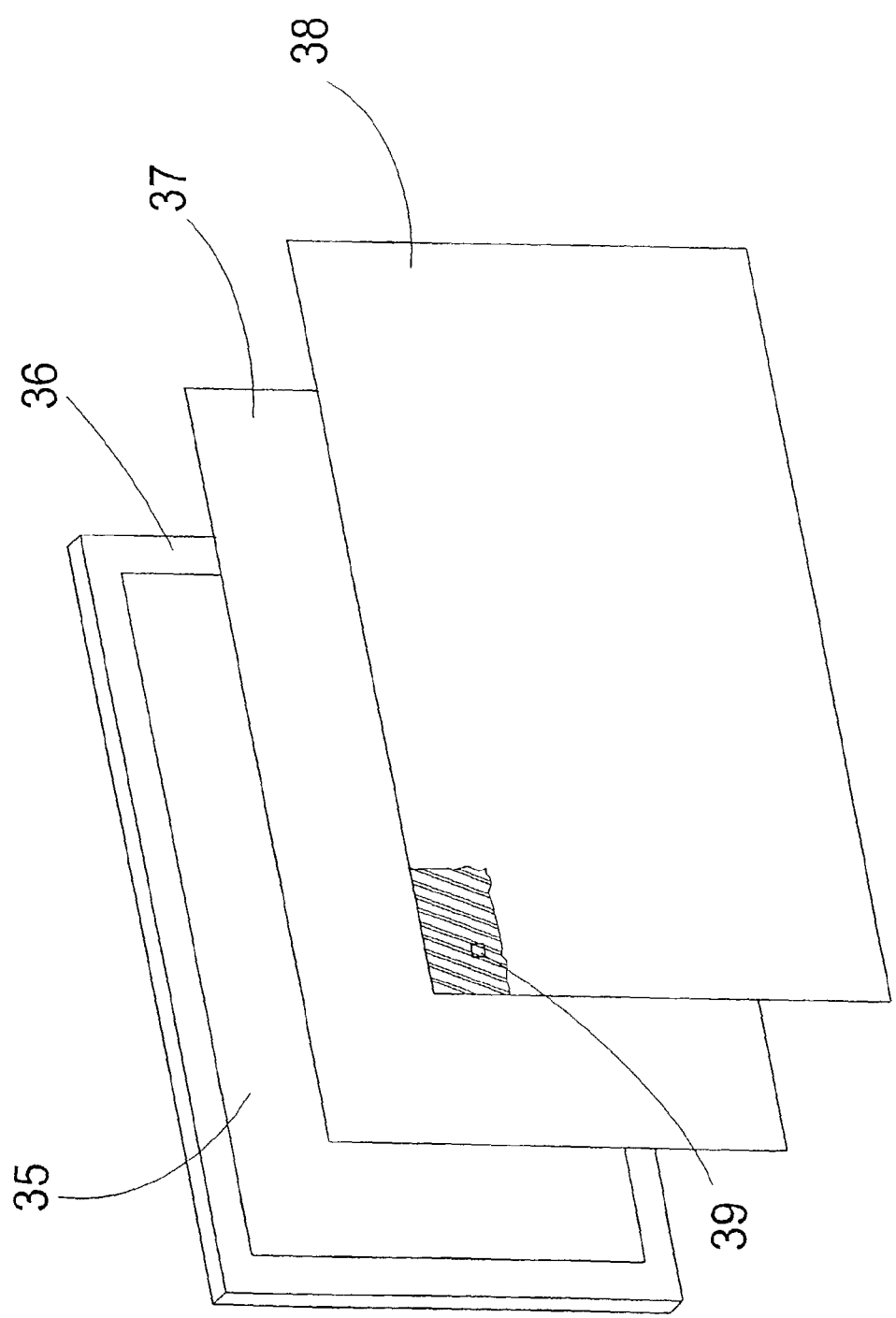
FIG. 51 shows a schematic view of the construction of an autostereoscopic image reproducing device for use in an arrangement according to the invention.

The carrier material 37 and the filter array 38 are shown separately in FIG. 51 for the sake of clarity, but carrier material 37 and filter array 38 are constructed, as a rule, as one unit.

The distance z between the filter array 38 and the raster (ij) of image elements $\alpha_{ij}$, i.e., the plasma display 35, measured in the viewing direction is determined for the embodiment example according to the following equation:

$$\frac{z}{s_p} = \frac{d_a}{p_d}, \tag{F7}$$

where $s_p$ represents the average horizontal distance between two image elements $\alpha_{ij}$, $p_d$ represents the average interpupillary distance with an observer, and $d_a$ represents a selectable observation distance which essentially corresponds to the average of all possible distances in the entire observation space between the filter array 38 and an observer or an observation position.

In the concrete case of an image reproducing device based on a Pioneer PDP-502MXE, $s_p$=286 μm taking into account the RGB-subpixel structure. Assuming $p_d$=65 mm and $d_a$=2000 mm, then z =8.8 mm.

A section of a possible structure of a filter array with n=40 views is shown in FIG. 52. A structure of this kind is very suitable, for example, in connection with a combination image according to FIG. 41. When producing the filter array 38, the raster (p,q) of the filter structure should preferably conform with respect to its physical horizontal or vertical dimensions essentially to the physical horizontal or vertical dimensions of the raster (ij), i.e., the horizontal dimension of a surface element of the raster (p,q) in this case is, for example, one fourth of the horizontal dimension of a surface element of the raster (ij) while the vertical dimension essentially conforms to the corresponding surface elements. As a result, the surface elements of the raster (ij) which are shown in FIG. 41, i.e., the image elements $\alpha_{ij}$ shown in FIG. 41 (see below), occupy the width of approximately four surface elements of the raster (p,q) (of the filter structure) in practice.

Accordingly, a surface element in the raster (p,q) of the filter structure is, for example, 71.5 μm wide and 808 μm high for the Pioneer PDP-502MXE plasma display. All opaque filter elements are preferably electrically conductive and are connected with one another in an electrically conducting manner.

Two examples of methods for the production of the at least partially conductive filter array 38 described above will now be described in more detail in the following.

In a first example for the production of a filter array 38 in which at least every tenth filter element 39 is electrically conductive, the method comprises the following two method steps:

preparation of a silk-screening mask using an electrically conductive paint, e.g., SPI Conductive Carbon Paint (manufactured by Structure Probe, Inc., USA), wherein at least every tenth filter element determined as non-transparent is produced by means of this conductive paint; and silk-screening of the filter structure on a transparent carrier material, e.g., PMMA or glass.

When other wavelength-selective filter elements are to be applied to the filter structure in addition to opaque filter elements, the filter array 38 which is generated on the carrier material 37 in this way can also run through additional silk-screening processes, wherein the filters of a determined wavelength transparency range can be applied each time.

A second example for producing the filter array 38 in which at least every tenth filter element 39 is electrically conductive comprises the following steps:

preparation of a printing mask using metallic particles, e.g., silver particles, wherein at least every tenth filter element 39 determined as non-transparent is produced by means of these particles;

coating a transparent carrier material, e.g., PMMA or glass, with a transparent adhesive (e.g., Acrifix 192 glue, produced by Röhm GmbH, Darmstadt);

printing the filter structure on the carrier material; and if necessary, exposure, e.g., UV exposure, of the coating for curing the glue.

In this case, the metallic particles are used essentially only for opaque filter elements.

This construction of the invention offers the advantage that common panes of glass or PMMA can be used instead of electrically conductive, transparent front panes for plasma displays. This also simplifies conversion of conventional plasma screens to 3D screens because a filter array need not be applied additionally to a special front pane in this case.

What is claimed is:

1. A method for three-dimensional display of a scene/object in which a plurality of individual image elements $\alpha_{ij}$ are made visible simultaneously in a raster of columns i and lines j, wherein the image elements $\alpha_{ij}$ show partial information from more than two views $A_k$ (k=1 . . . n) of the scene/object, and adjacent image elements $\alpha_{ij}$ radiate light of different wavelengths λ or wavelength regions Δλ, comprising the steps of:

predetermining propagation directions for the light radiated from the image elements $\alpha_{ij}$ which propagation directions depend on the wavelength λ or wavelength region Δλ of this light; and propagation directions within an observation space in which the observer(s) is or are situated intersecting in a plurality of intersection points, each of which corresponds to an observation position, so that, from each observation position, one eye of an observer optically perceives predominantly partial information of a first selection and the other eye optically perceives predominantly partial information of a second selection from views $A_k$ (k=1 . . . n).

2. The method according to claim 1, wherein the propagation directions are predetermined by one or more arrays comprising a plurality of individual wavelength filters $\beta_{pq}$ which are arranged in columns p and lines q and are disposed in front of and/or following the raster with image elements $\alpha_{ij}$ in the viewing direction, wherein an image element $\alpha_{ij}$ corresponds with a plurality of associated wavelength filters $\beta_{pq}$ or a wavelength filter $\beta_{pq}$ corresponds with a plurality of associated image elements $\alpha_{ij}$ such that the straight connecting lines between the surface center of a visible portion of the image element $\alpha_{ij}$ and the surface center of a visible portion of the wavelength filter element $\beta_{pq}$ corresponds to a propagation direction.

3. The method according to claim 1, wherein the correlation of partial information from the views $A_k$ (k=1 . . . n) with image elements $\alpha_{ij}$ of position i,j is carried out according to the following function:

$$k = i - c_{ij} \cdot j - n \cdot IntegerPart\left[\frac{i - c_{ij} \cdot j - 1}{n}\right],$$

where
is the index of an image element $\alpha_{ij}$ in a line of the raster,
j is the index of an image element $\alpha_{ij}$ in a column of the raster,
k is the continuous number of the view $A_k$ (k=1 . . . n) from which the partial information to be reproduced on a determined image element $\alpha_{ij}$ originates,
n is the total number of utilized views $A_k$ (k=1 . . . n),
$c_{ij}$ is a selectable coefficient matrix for combining and mixing on the raster the different partial information which originates from views $A_k$ (k=1 . . . n), and
IntegerPart represents a function for generating the greatest whole number not exceeding the argument in brackets.

4. The method according to claim 1, wherein the wavelength filters $\beta_{pq}$ are combined to form a mask image depending on their transparency wavelength or transparency wavelength region $\lambda_b$ according to the following function:

$$b = p - d_{pq} \cdot q - n_m \cdot IntegerPart\left[\frac{p - d_{pq} \cdot q - 1}{n_m}\right],$$

where
p represents the index of a wavelength filter $\beta_{pq}$ in a line of the array,
q represents the index of a wavelength filter element $\beta_{pq}$ in a column of the array,
b is a whole number which determines one of the provided transparency wavelengths/transparency wavelength regions $\lambda_b$ for a wavelength filter element $\beta_{pq}$ at position p,q and can have values between 1 and $b_{max}$,
$n_m$ is a whole number greater than zero which preferably corresponds to the total number n in views $A_k$ shown in the combination image,
$d_{pq}$ is a selectable mask coefficient matrix for varying the generation of a mask image, and
IntegerPart represents a function for generating the greatest whole number not exceeding the argument in brackets.

5. The method according to claim 1, wherein the distance z between the array of wavelength filters $\beta_{pq}$ and the raster of image elements $\alpha_{ij}$ measured in the viewing direction is determined according to the following equation:

$$\frac{z}{s_p} = \frac{d_a}{p_d},$$

where
$s_p$ represents the average horizontal distance between two wavelength filters $\beta_{pq}$ when the array with the wavelength filters $\beta_{pq}$ is arranged behind the raster of image elements $\alpha_{ij}$ in the viewing direction of the observer, or the average horizontal distance between two image elements $\alpha_{ij}$ when the raster of image elements $\alpha_{ij}$ is arranged behind the array with the wavelength filters $\beta_{pq}$ in the viewing direction of an observer,
$p_d$ represents the average interpupillary distance with an observer, and
$d_a$ represents a selectable observation distance which essentially corresponds to the average of all possible distances in the entire observation space between the raster of image elements $\alpha_{ij}$ and an observer or an observation position.

6. An arrangement for implementing a method according to claim 1, comprising:
a color LC display for reproducing image elements $\alpha_{ij}$ from a plurality of views $A_k$ (k=1 . . . n) of a scene/object; and
an array of a plurality of wavelength filters $\beta_{pq}$ which is arranged at a predetermined distance z in front of or after the color LC display with respect to the viewing direction of an observer;
said color LC display having separately controllable subpixels R,G,B which are arranged in columns i and lines j, wherein each subpixel R,G,B in column i and in line j corresponds to an image element $\alpha_{ij}$ and every image element $\alpha_{ij}$ corresponds to partial information of one of more than two views $A_k$ (k1 . . . n);
a control circuit to which the color LC display is coupled, said control circuit generating partial information on the subpixels R,G,B according to the following function:

$$k = i - c_{ij} \cdot j - n \cdot IntegerPart\left[\frac{i - c_{ij} \cdot j - 1}{n}\right],$$

where i is the index of an image element $\alpha_{ij}$ in a line of the raster; j is the index of an image element $\alpha_{ij}$ in a column of the raster; k is the continuous number of the view $A_k$ (k=1 . . . n) from which the partial information to be reproduced on a determined image element $\alpha_{ij}$ originates; n is the total number of utilized views $A_k$ (k=1 . . . n),
$c_{ij}$ is a selectable coefficient matrix for combining and mixing on the raster the different partial information which originates from views $A_k$ (k=1 . . . n); and
said wavelength filters $\beta_{pq}$ being positioned within the array in such a way that propagation directions are predetermined for the light proceeding from the subpixels R,G,B, which propagation directions intersect in observation positions from which predominantly partial information of a first selection of views $A_k$ (k=1 . . . n) can be perceived by one eye of one or more observers and predominantly partial information of a second selection from views $A_k$ (k=1 . . . n) can be perceived by the other eye of one or more observers.

7. The arrangement according to claim 6, wherein a color LC display is provided with subpixels R',G',B' as an array of wavelength filters $\beta_{pq}$ and the subpixels R',G',B' are controlled in columns p and lines q according to the following function:

$$b = p - d_{pq} \cdot q - n_m \cdot IntegerPart\left[\frac{p - d_{pq} \cdot q - 1}{n_m}\right],$$

where
p represents the index of a wavelength filter $\beta_{pq}$ in a line of the array, q represents the index of a wavelength filter element $\beta_{pq}$ in a column of the array, b is a whole number which determines one of the provided transparency wavelengths/transparency wavelength regions $\lambda_b$ for a wavelength filter element $\beta_{pq}$ at position p,q and can have values between 1 and $b_{max}$, $n_m$ is a whole number greater than zero which preferably corresponds to the total number n in views $A_k$ shown in the combined image, $d_{pq}$ is a selectable mask coefficient matrix for varying the generation of a mask image, and IntegerPart represents a function for generating the greatest whole number not exceeding the argument in brackets.

8. The arrangement according to claim 7, wherein the color LC display is coupled with a control circuit for changing the transparency of the subpixels R',G',B'.

9. The arrangement according to claim 7, wherein the color LC display with subpixels R,G,B and the color LC display with subpixels R',G',B' are followed in the viewing direction of an observer by a flat illumination source emitting white light.

10. The arrangement according to claim 6, wherein the array of wavelength filters $\beta_{pq}$ or the image-displaying color LC display with image elements $\alpha_{ij}$ and an associated flat illumination source are parts of a constructional unit, such as chosen from the group consisting of an electroluminescent display, an electron beam tube, a plasma display, a laser beam-illuminated display, an LED display, a field emission display, and a polymer-based display device.

11. The arrangement according to claim 6, wherein the partial surfaces occupied by the individual wavelength filters $\beta_{pq}$ in the array have a polygonal outline.

12. The arrangement according to claim 6, wherein the partial surfaces occupied by the individual wavelength filters $\beta_{pq}$ in the array have a square outline.

13. The arrangement according to claim 6, wherein the partial surfaces occupied by the individual wavelength filters $\beta_{pq}$ in the array have a rectangular outline.

14. The arrangement according to claim 6, wherein the color LC display with subpixels R,G,B and the array of wavelength filters $\beta_{pq}$ are combined to form a constructional unit, wherein the distance z between the color LC display and the array of wavelength filters $\beta_{pq}$ measured in the viewing direction is 1 mm to 10 mm.

15. The arrangement according to claim 14, wherein a lens, such as a Fresnel lens, is arranged in front of the constructional unit comprising the color LC display and the array of wavelength filters $\beta_{pq}$ in the viewing direction of an observer, so that a real or virtual imaging is formed for the observer depending on the construction of the lens.

16. The arrangement for selective three-dimensional or two-dimensional display according to claim 7, but outfitted with means for changing the transmission characteristics of the wavelength filters $\beta_{pq}$ in such a way that the wavelength filters $\beta_{pq}$, depending on control, are either constructed for purposes of three-dimensional display or are as transparent as possible in their entirety, i.e., transmit as much visible light as possible, for purposes of two-dimensional display.

17. The arrangement according to claim 16, wherein a control circuit is provided by which a selection of wavelength filters $\beta_{pq}$ or the wavelength filters hd $\beta_{pq}$ in their entirety are switchable selectively with respect to their transmission characteristics, so that either the entire display of the scene/object can be changed from three-dimensional to two-dimensional display or only selected view areas can be changed from three-dimensional to two-dimensional display.

18. The arrangement for implementing the method according to claim 1, comprising:

a device for reproducing an image array of a plurality of image elements which represent information from a plurality of views of the scene/object in predetermined correlation, wherein light is radiated from the individual image elements in different wavelength regions;

a filter arrangement which is arranged in front of or behind the image reproducing device in the viewing direction of an observer with a filter array comprising a plurality of filter elements including linear polarization filter elements and wavelength filter elements which transmit in determined wavelength regions, with a linear polarization filter and a controllable optical medium, such as in the form of liquid crystals, which is arranged between the filter array and the linear polarization filter and which, depending on its control, causes a rotation of the polarization direction of linearly polarized light passing through;

wherein the filter elements are arranged in such a way that propagation directions which are defined for the light radiated by the image reproducing device are predetermined in a first state of the optical medium in which the polarization direction caused by the optical medium and the polarization direction of the subsequent filter, i.e., the linear polarization filter elements of the filter array or of the linear polarization filter, intersect, so that predominantly information of a first group of views can be perceived at a plurality of first observation locations and predominantly information of a second group of views can be perceived at a plurality of second observation locations, each of which is located roughly at eye distance from an associated first observation location, wherein there is a plurality of such groups of views, and in a second state of the optical medium in which the polarization direction caused by the optical medium and the polarization direction of the subsequent filter, i.e., of the linear polarization filter elements of the filter array or of the linear polarization filter, essentially run parallel to one another, the filter arrangement has increased transparency compared with the first state.

19. The arrangement according to claim 18, wherein all linear polarization filter elements have the same polarization direction.

20. The arrangement according to claim 18, wherein the filter arrangement is arranged in front of the image reproducing device in the viewing direction of the image reproducing device, and a flat illumination source radiating white light is arranged behind the image reproducing device.

21. The arrangement for implementing the method according to claim 1, comprising:

a device for reproducing an image array having a plurality of image elements which represent information from a plurality of views of the scene/object in predetermined correlation, wherein light is radiated from the individual image elements in different wavelength regions;

a filter arrangement which is arranged on the image reproducing device in the viewing direction of an observer with a filter array comprising a plurality of wavelength filter elements which transmit in determined wavelength regions; and a diffusion screen which is arranged behind the image reproducing device and in front of the filter array in the viewing direction of an observer and which is switchable selectively between a transparent position and a scattering position;

wherein the wavelength filter elements are arranged in such a way that propagation directions which are defined for the light radiated by the image reproducing device are predetermined in the transparent position of the diffusion screen, so that predominantly information of a first group of views can be perceived at a plurality of first observation locations and predominantly information of a second group of views can be perceived at a plurality of second observation locations, each of which is located approximately at eye distance from an associated first observation position, and the structuring of the light passing through the filter array is substantially reduced in the scattering position of the diffusion screen relative to the first position.

22. The arrangement according to claim 21, wherein the filter array is constructed as a passive filter.

23. The arrangement according to claim 21, wherein the wavelength filter elements are transparent or opaque in at least one of the three color regions red, green or blue or in the entire spectrum of visible light.

24. An arrangement for implementing the method according to claim 1, comprising:

an image reproducing device, such as a color LC display for reproducing an image array having a plurality of image elements which represent information from a plurality of views of the scene/object in defined correlation, wherein light is radiated from the image elements in different wavelength regions;

a filter arrangement with at least two static filter arrays which are arranged in parallel one behind the other, which filter arrangement is arranged at a distance z in front of or following the image reproducing device considered in the viewing direction of an observer;

each filter array having a plurality of filter elements which pass light in determined wavelength regions and/or determined polarization directions;

an arrangement for displacing at least one of the filter arrays at right angles to the viewing direction from a first position relative to the second filter array into a second position relative to the second filter array; and said individual filter elements being arranged on the filter arrays in such a way that, in the first position, the filter arrangement predetermines propagation directions for the light emitted by the image reproducing device such that predominantly information of a first group of views is perceptible at a first observation location and predominantly information of a second group of views is perceptible at a second observation location at eye distance from the first observation location, and wherein there exists a plurality of such locations with different groups of the kind indicated above, and the filter arrangement has an increased transparency in the second position compared with the first position.

25. The arrangement according to claim 24, wherein the filter elements are constructed as passive wavelength filters and/or as passive linear polarization filter elements.

26. The arrangement according to claim 24, wherein the displacement device is constructed as a piezo-adjusting device.

27. The arrangement according to claim 24, wherein the filter arrangement comprises a plurality of wavelength filter arrays, each of which comprises exclusively wavelength filters which are opaque or transparent in the entire spectrum of visible light.

28. The arrangement according to claim 24, wherein the filter elements comprise exclusively wavelength filters which are transparent in two of the three color regions red, green or blue or in the entire spectrum of visible light.

29. The arrangement according to claim 27, wherein the filter elements comprise exclusively wavelength filters which are transparent in one of the three color regions red, green or blue or in the entire spectrum of visible light.

30. The arrangement for implementing the method according to claim 1 comprising:

an image reproducing device having a plurality of translucent image elements on which image information of a plurality of views of the scene/object can be displayed;

a wavelength filter array which follows the image reproducing device in the viewing direction of an observer and which comprises a plurality of filter elements which transmit light in predetermined wavelength regions;

an illumination device, wherein the scene/object can be perceived two-dimensionally or three-dimensionally depending on the illumination of the image elements and/or filter elements; and means being provided for switching between a plurality of different operating modes in which the illumination light reaches the observer either, for purposes of two-dimensional display, exclusively only through the image elements of the image reproducing device, but not through filter elements of the wavelength filter array or, for purposes of three-dimensional display, through at least a portion of the filter elements of the wavelength filter array and subsequently through an associated portion of the image elements of the image reproducing device.

31. The arrangement according to claim 30, wherein, in the viewing direction of the observer, a first flat illumination source between the image reproducing device and the wavelength filter array and, behind the wavelength filter array, a second flat illumination source are provided between the image reproducing device and the wavelength filter array, and both flat illumination sources are coupled with separately controllable on/off switches, and only the first flat illumination source is switched on in a first operating mode for two-dimensional display, and illumination light reaches the observer only through the image reproducing device but not through the wavelength filter array, and in a second operating mode for three-dimensional display only the second flat illumination source is switched on and illumination light always reaches the observer through the wavelength filter array and through the image reproducing device.

32. The arrangement according to claim 31, wherein a shutter comprising a plurality of individually controllable shutter elements is associated with the wavelength filter array and, depending on the quantity of controlled shutter elements, the path of the illumination light generated by the second flat illumination source is interrupted or opened through a larger or smaller quantity of filter elements, and in a first operating mode for purposes of two-dimensional display only the first flat illumination source is switched on and illumination light reaches the observer only through the image reproducing device, but not through the wavelength filter array, in a second operating mode, for purposes of three-dimensional display, only the second flat illumination source is switched on and the illumination light always reaches the observer through the wavelength filter array and the image reproducing device, and, in a third operating mode, both flat illumination sources are switched on and a predetermined quantity of shutter elements are controlled in such a way that the illumination light in areas of the controlled shutter elements reaches the observer through the filter elements and through the associated image elements, while the illumination light in areas of the shutter elements which are not controlled reaches the observer only through the image reproducing device, so that the scene/object can be perceived two-dimensionally when viewing the areas of the shutter elements that are not controlled, but can be perceived three-dimensionally when viewing the areas of the controlled shutter elements.

33. The arrangement according to claim 31, wherein the first flat illumination source is constructed as a plate-shaped light guide which is limited by two large surfaces which are located opposite one another, a first large surface facing the image reproducing device and the second large surface facing the wavelength filter array, and by circumferentially extending narrow surfaces, and the plate-shaped light guide is supplied by at least one light source whose radiation is coupled into the light guide through one of the narrow surfaces and is reflected back and forth partly due to total reflection at the two large surfaces and is emitted partly as useful light via the first large surface.

34. The arrangement according to claim 33, wherein the second large surface of the light guide is provided with a coating comprising particles which interferes with the total reflection and whose interference capacity over the extent of the second large surface is inhomogeneous between two limiting values, wherein the limiting values are dependent upon the density d of the coating and the density d is a measure of the average distance between particles per area unit.

35. The arrangement according to claim 34, wherein the interference capacity of the coating is increasingly strong as the distances $x_1$, $x_2$ from two narrow surfaces into which the light is coupled increase.

36. The arrangement according to claim 34, wherein the interference capacity of the coating is increasingly strong as the distance x from one narrow surface into which the light is coupled increases.

37. The arrangement according to claim 34, wherein a lacquer is applied to the outside of the second large surface as a coating, wherein the local lacquer density is equivalent to the interference capacity at this location.

38. The arrangement according to claim 31, wherein the wavelength filter array is provided on its side facing the image reproducing device with reflecting or scattering surface elements and there is at least one light source whose radiation is directed only to the side of the wavelength filter array with the reflecting or scattering surface elements in the first operating mode, and is directed only to the side of the wavelength filter array remote of the observer in the second operating mode.

39. The arrangement according to claim 38, wherein at least two independent light sources are provided, wherein, in the first operating mode, the radiation of one of these light sources is directed only to the side of the wavelength filter array which faces the observer and is provided with surface elements and, in the second operating mode, the radiation of another light source is directed exclusively to the side remote of the observer, these light sources are coupled with separately controllable on/off switches and/or separately controllable shutters are provided in the illumination beam paths of at least one of the light sources for interrupting or opening illumination beam path or only portions of the respective illumination beam paths.

40. The arrangement according to claim 38, wherein the filter elements of the wavelength filter array are constructed as static filters, and the surface elements are exclusively positioned on the opaque surface regions of the wavelength filter array.

41. The arrangement for implementing the method according to claim 1, wherein the transmission characteristics $\lambda_b$ for the filters $\beta_{pq}$ correspond to transmission factors, transparency wavelength regions or combinations thereof, wherein transmission factors are decisive for neutral filters for wavelength-independent attenuation of the light intensity and transparency wavelength regions for wavelength filters.

42. The arrangement according to claim 41, wherein wavelength-independent transmission factors of 0%, 25%, 50%, 75% and 100% and transparency wavelength regions corresponding to transparency in one of the three color regions red, green or blue are predetermined as transmission characteristics $\lambda_b$.

43. An arrangement for implementing the method according to claim 1, comprising:
a flat screen provided for image display; and
a filter array applied to a carrier material is arranged in front of the flat screen in the observation direction;
wherein at least every tenth filter element of the filter array comprises electrically conductive material.

44. The arrangement according to claim 43, wherein a transparent plastic foil is provided as carrier material, and the carrier material is located either only on one side of the material or on both sides of the material forming the filter elements.

45. An arrangement for implementing the method according to claim 1 for reproducing partial information from a plurality of views $A_k$ ($k \geq 4$), comprising:
a tracking device for detection of the eye position of a selected observer;
a computation device which actuates the displacement device as a function of the eye position of the selected observer which is determined by the tracking device;
wherein, in every position of a filter array, the propagation directions intersect within an observation space in a plurality of intersection points, each of which corresponds to an observation position, so that, from each observation position, one eye of an observer or observers optically perceives predominantly partial information of a first selection and the other eye optically perceives predominantly partial information of a second selection from views $A_{k\ (k=1\ \ldots\ n)}$, wherein particularly the selected observer sees almost exclusively the middle views of views $A_k$ (k=1 ... n) because of the position of the filter array which is adapted permanently to the eye position of the selected observer, and wherein, due to the use of n>3 views, the inertia of the displacement device is compensated in such a way that essentially at no time does the selected observer perceive an image with inverted depth.

46. The arrangement according to claim 45, wherein the filter array is constructed as an LC display, wherein, instead of a displacement device, the associated computation device which is provided for a displacement device controls the LC display depending on the signal of the tracking device.

47. A process for the production of a filter array for use in an arrangement for implementing the method according to claim 1, in which at least every tenth filter element comprises electrically conductive material, comprising the following steps:

preparing a silk-screening mask using an electrically conductive paint wherein at least every tenth filter element determined as non-transparent is produced by this conductive paint;

silk-screening of the filter structure on a transparent carrier material; and repetition of the steps indicated above, if required.

48. A process for the production of a filter array for use in an arrangement for implementing the method according to claim 1, in which at least every tenth filter element comprises electrically conductive material, comprising the following steps:

preparing a printing mask using metallic particles, wherein at least every tenth filter element determined as non-transparent is produced by these particles;

coating a transparent carrier material, with a transparent adhesive;

printing the filter structure on the carrier material; and if necessary, exposure, for curing the glue.

* * * * *